US011950290B2

United States Patent
Myung et al.

(10) Patent No.: US 11,950,290 B2
(45) Date of Patent: Apr. 2, 2024

(54) METHOD FOR TRANSMITTING RACH BY TERMINAL IN WIRELESS COMMUNICATION SYSTEM AND TERMINAL USING SAME METHOD

(71) Applicant: LG Electronics Inc., Seoul (KR)

(72) Inventors: Sechang Myung, Seoul (KR); Seonwook Kim, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 533 days.

(21) Appl. No.: 17/267,378

(22) PCT Filed: Aug. 9, 2019

(86) PCT No.: PCT/KR2019/010139
§ 371 (c)(1),
(2) Date: Feb. 9, 2021

(87) PCT Pub. No.: WO2020/032727
PCT Pub. Date: Feb. 13, 2020

(65) Prior Publication Data
US 2021/0298090 A1    Sep. 23, 2021

(30) Foreign Application Priority Data
Aug. 9, 2018  (KR) .......................... 10-2018-0092945

(51) Int. Cl.
*H04W 74/08* (2009.01)
*H04W 74/0833* (2024.01)

(52) U.S. Cl.
CPC .............................. *H04W 74/0833* (2013.01)

(58) Field of Classification Search
CPC ............ H04W 74/0833; H04W 16/14; H04W 56/0015; H04W 74/0808
See application file for complete search history.

(56) References Cited

U.S. PATENT DOCUMENTS

| 2017/0373914 A1 | 12/2017 | Harada et al. |
| 2018/0041295 A1* | 2/2018 | Zheng .................. H04B 17/382 |
| 2019/0182829 A1* | 6/2019 | Choi .................. H04W 72/0446 |

FOREIGN PATENT DOCUMENTS

| KR | 20160093573 | 8/2016 |
| KR | 20170093071 | 8/2017 |
| WO | WO2017155239 | 9/2017 |

OTHER PUBLICATIONS

R1-1807386 ("TxOP Frame Structure for NR unlicensed", May 20-May 25, 2018). (Year: 2018).*

(Continued)

*Primary Examiner* — Zhensheng Zhang
(74) *Attorney, Agent, or Firm* — Fish & Richardson P.C.

(57) ABSTRACT

A method for transmitting a random access channel (RACH) by a terminal in a wireless communication system is provided. The method comprises: receiving a synchronization signal block (SSB) from a base station; receiving a downlink signal from the base station; and when the reception of the downlink signal is finished, transmitting the RACH to the base station, wherein the SSB is periodically transmitted in every Nth fixed frame period (FFP), N is an integer equal to or greater than 1, and the starting time point for transmission of the SSB corresponds to a first time resource included in the every Nth FFP.

9 Claims, 38 Drawing Sheets

(56) References Cited

OTHER PUBLICATIONS

Convida Wireless, "Discussion on Procedures for LBT in NR-U," R1-1807230, 3GPP TSG-RAN WG1 Meeting #93, Busan, Korea, dated May 21-25, 2018, 3 pages.

* cited by examiner variable nodes

[Parity-check matrix]

[Protograph]

(a)

$$F = \begin{bmatrix} 1 & 0 \\ 1 & 1 \end{bmatrix}$$

(b)

METHOD FOR TRANSMITTING RACH BY TERMINAL IN WIRELESS COMMUNICATION SYSTEM AND TERMINAL USING SAME METHOD

CROSS-REFERENCE TO RELATED APPLICATIONS

This application is a National Stage application under 35 U.S.C. § 371 of International Application No. PCT/KR2019/010139, filed on Aug. 9, 2019, which claims the benefit of Korean Patent Application No. 10-2018-0092945 filed on Aug. 9, 2018. The disclosures of the prior applications are incorporated by reference in their entirety.

BACKGROUND OF THE DISCLOSURE

Field of the Disclosure

The present disclosure relates to wireless communication.

Related Art

As a larger number of communication devices require greater communication capacity than before, a requirement for efficient utilization of limited frequency bands becomes more and more important in the next-generation wireless communication system. Furthermore, cellular communication systems such as the LTE/NR system are considering using an unlicensed band such as the 2.4 GHz band mostly used for the conventional WiFi systems and unlicensed bands such as the 5 GHz and 60 GHz bands recently receiving attention for traffic offloading.

Since operating a wireless system in an unlicensed band basically assumes wireless transmission and reception through contention among communication nodes, each communication node is requested to confirm, before transmitting its signal by performing channel sensing, that other communication nodes are not transmitting a signal. For the sake of convenience, the aforementioned operation is referred to as Listen Before Talk (LBT) or Channel Access Procedure (CAP); particularly, the operation of checking whether another communication node is transmitting a signal is referred to as Carrier Sensing (CS), and a case where other communication nodes are not transmitting a signal is defined as being confirmed by Clear Channel Assessment (CCA).

Meanwhile, devices performing LBT may be divided into Frame Based Equipment (FBE) and Load Based Equipment (LBE) depending on their mechanism employed. More specifically, FBE refers to the device of which the transmit/receive structure has periodic timing that is the same as a fixed frame period, and LBE refers to the device of which the transmit/receive structure is not fixed on the time domain but is demand-driven.

A base station or a user equipment of the LTE/NR system also has to perform LBT to transmit a signal in an unlicensed band (for the sake of convenience, it is referred to as a U-band), and when the base station or the user equipment of the LTE/NR system transmits a signal, other communication nodes such as Wi-Fi nodes also have to perform LBT to avoid causing interference. At this time, different from the conventional LTE-LAA, as introduction of FBE-based LBT technique to the NR system is considered, a new technology is required for communication using the unlicensed bands.

SUMMARY

An object of the present disclosure is to provide a method for transmitting a Random Access Channel (RACH) performed by a UE in a wireless communication system and a UE using the method.

In one aspect, a method for transmitting a Random Access Channel (RACH) performed by a UE in a wireless communication system is provided. The method comprises receiving a Synchronization Signal Block (SSB) from a base station, receiving a downlink signal from the base station and after completing reception of the downlink signal, performing the RACH transmission to the base station, wherein the SSB is transmitted periodically on every N-th Fixed Frame Period (FFP), wherein the N is an integer larger than or equal to 1, and wherein a transmission start position of the SSB is a first time resource included in every N-th FFP.

The RACH transmission may be performed on an unlicensed band.

At least one of the SSB and the downlink signal may be transmitted on an unlicensed band.

The FFP may be determined by the base station.

A transmission period of the SSB may be determined by the base station.

A transmission period of the SSB may be the same as a measurement period related to cell measurement.

The cell measurement may be measurement of a serving cell or a neighboring cell.

Based on an uplink grant being included in the downlink signal, the UE may perform the RACH transmission.

The UE may perform the RACH transmission after receiving the uplink grant.

The uplink grant may be UE-group common downlink control information.

The RACH transmission may be performed only on a specific FFP to which the uplink grant is transmitted.

The FFP may include channel occupancy time and an idle period, and the idle period may include an observation slot.

The base station may transmit a paging-related signal to the UE periodically, and a transmission period of the paging-related signal may be the same as a transmission period of the SSB.

In another aspect, provided is a user equipment (UE), comprising a transceiver transmitting and receiving a radio signal and a processor operating by being combined with the transceiver, wherein the processor is configured to receive a Synchronization Signal Block (SSB) from a base station, receive a downlink signal from the base station and perform the RACH transmission to the base station after reception of the downlink signal is completed, wherein the SSB is transmitted periodically on every N-th Fixed Frame Period (FFP), wherein the N is an integer larger than or equal to 1, and wherein a transmission start position of the SSB is a first time resource included in every N-th FFP.

The UE may communicate with at least one of a mobile terminal, a network, and a self-driving vehicle other than the UE.

The present disclosure proposes a new unlicensed band-based communication method according to the introduction of an FBE-based LBT technique. Furthermore, communication operations may be performed more resource-efficiently according to the present disclosure.

DESCRIPTION OF EXEMPLARY EMBODIMENTS

Figure 1:
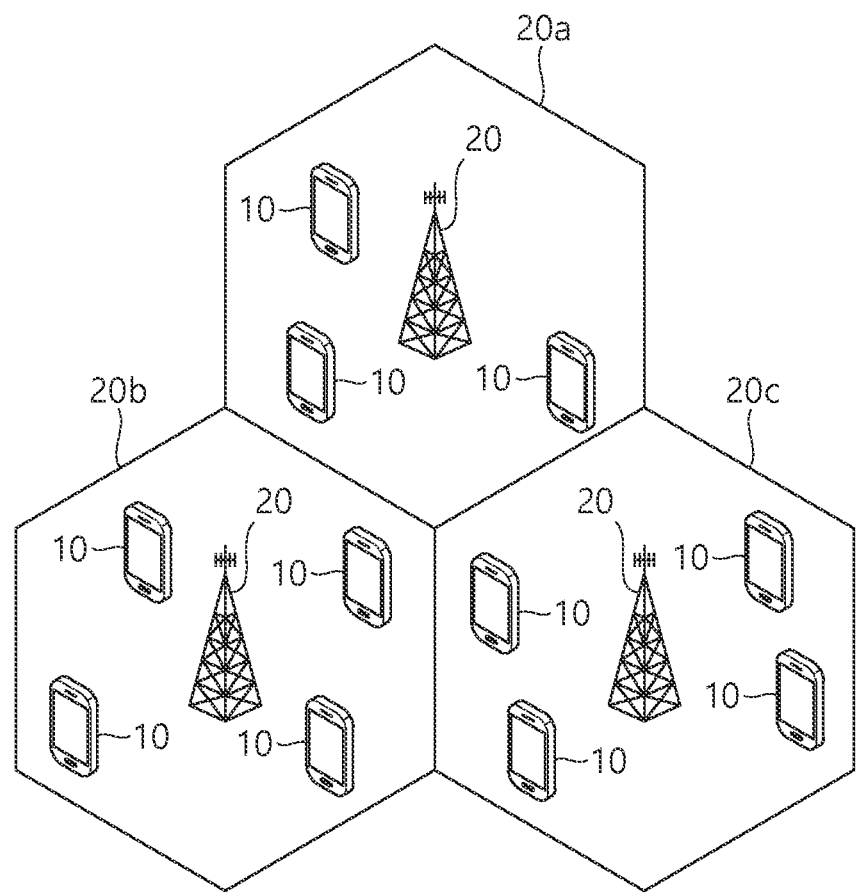
FIG. 1 shows a wireless communication system to which the present description may be applied.

FIG. 1 shows a wireless communication system to which the present description may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

Although not shown in FIG. 1, the EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

The conventional wireless communication system may be replaced or coexist with a system (or a new radio (NR) system) using a new radio access technology (new RAT). Hereinafter, the NR system will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present description for convenience.

Figure 2:
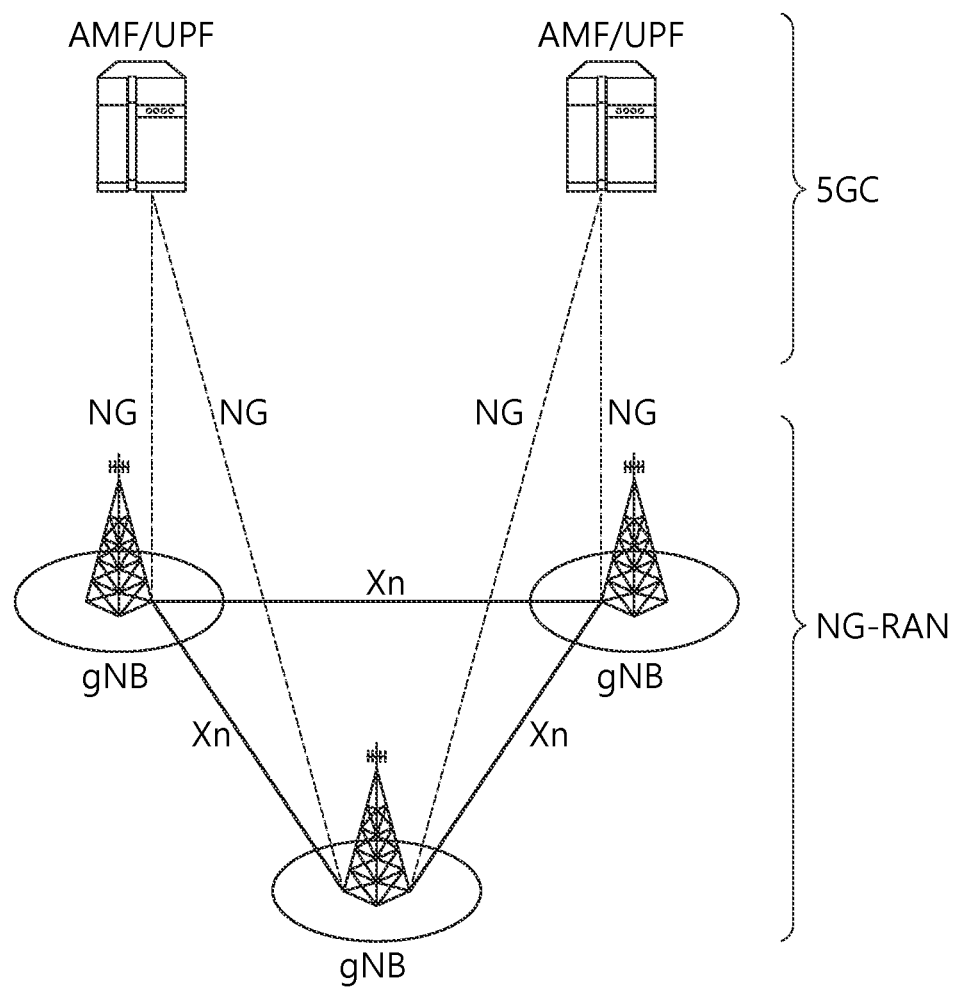
FIG. 2 illustrates a system structure of a next generation radio access network (NG-RAN) to which NR is applied.

FIG. 2 illustrates a system structure of a next generation radio access network (NG-RAN) to which NR is applied.

Figure 4:
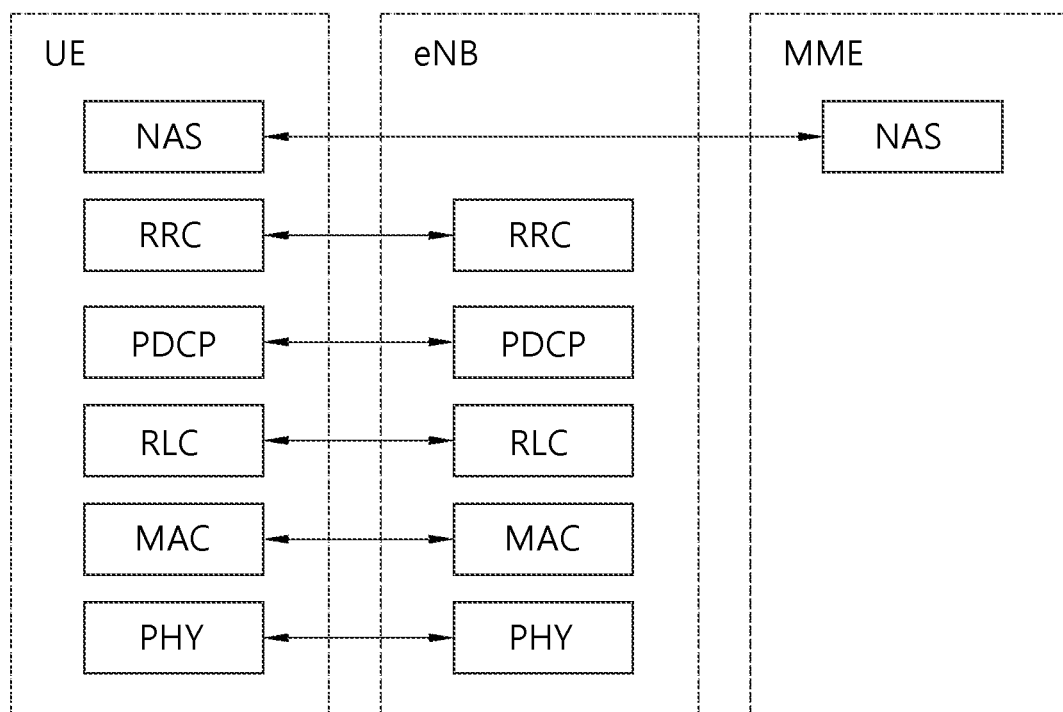
FIG. 4 is a diagram showing a wireless protocol architecture for a control plane.

Referring to FIG. 2, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

The gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like.

Figure 3:
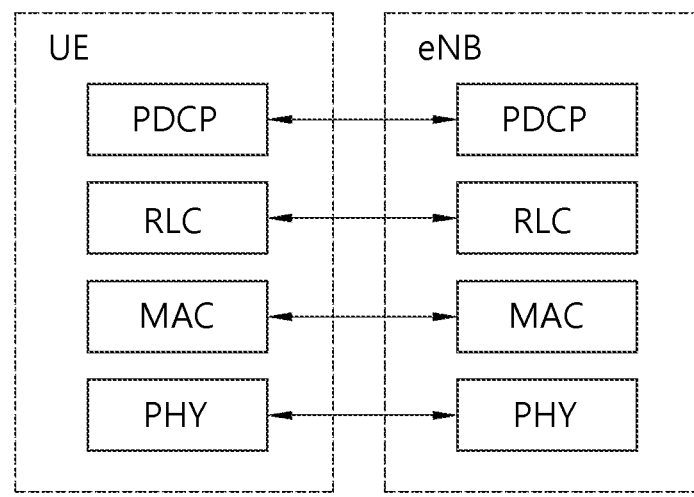
FIG. 3 is a diagram showing a wireless protocol architecture for a user plane.

FIG. 3 is a diagram showing a wireless protocol architecture for a user plane. FIG. 4 is a diagram showing a wireless protocol architecture for a control plane. The user plane is a protocol stack for user data transmission. The control plane is a protocol stack for control signal transmission.

Referring to FIGS. 3 and 4, a PHY layer provides an upper layer with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel A Transmission Time Interval (TTI) is a unit time for subframe transmission.

Figure 5:
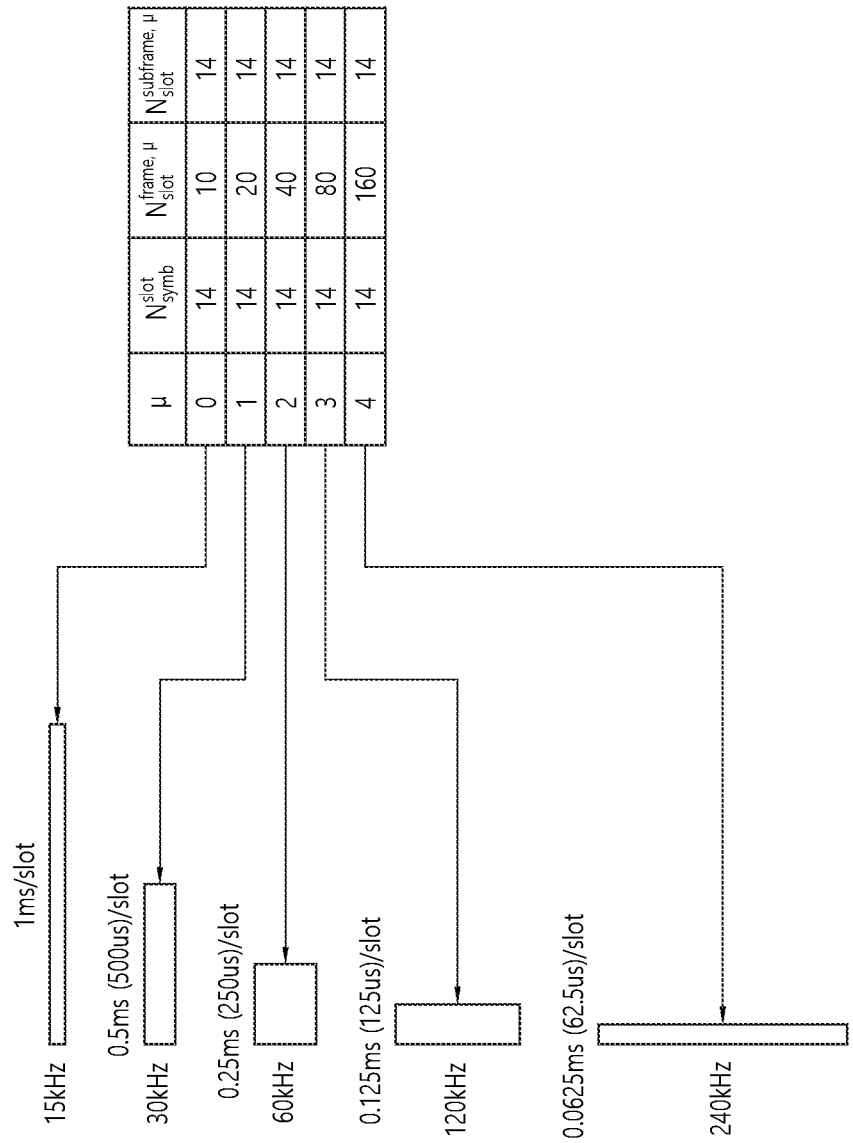
FIG. 5 illustrates an example of a frame structure that may be applied in NR.

FIG. 5 illustrates an example of a frame structure that may be applied in NR.

Referring to FIG. 5, a frame may be composed of 10 milliseconds (ms) and include 10 subframes each composed of 1 ms. Various fields of the time domain may be represented by a time unit of $T_c=1/(\Delta f_{max} \cdot N_f)$. Herein, $\Delta f_{max}$ may be equal to $480 \cdot 10^3$ Hz and $N_f$ may be equal to 4096.

A carrier may have one set of frames in the uplink, and one set of frames in the downlink. Transmission of the uplink frame I may be start prior to the start of the corresponding downlink frame I by $T_{TA}=(N_{TA}+N_{TA,offset})T_c$.

One or a plurality of slots may be included in a subframe according to subcarrier spacings.

The following table 1 illustrates a subcarrier spacing configuration μ.

TABLE 1

| μ | Δf = $2^μ \cdot 15$ [KHz] | Cyclic prefix |
|---|---|---|
| 0 | 15 | Normal |
| 1 | 30 | Normal |
| 2 | 60 | Normal Extended |
| 3 | 120 | Normal |
| 4 | 240 | Normal |

The following table 201 illustrates the number of slots in a frame ($N^{frame,μ}_{slot}$), the number of slots in a subframe ($N^{subframe,μ}_{slot}$), the number of symbols in a slot ($N^{slot}_{symb}$), and the like, according to subcarrier spacing configurations μ for normal cyclic prefix (CP). The following table 202 illustrates the number of slots in a frame ($N^{frame,μ}_{slot}$), the number of slots in a subframe ($N^{subframe,μ}_{slot}$), the number of symbols in a slot ($N^{slot}_{symb}$), and the like, according to subcarrier spacing configurations μ for extended cyclic prefix (CP).

TABLE 201

| μ | $N^{slot}_{symb}$ | $N^{frame,μ}_{slot}$ | $N^{subframe,μ}_{slot}$ |
|---|---|---|---|
| 0 | 14 | 10 | 1 |
| 1 | 14 | 20 | 2 |
| 2 | 14 | 40 | 4 |

TABLE 201-continued

| μ | $N^{slot}_{symb}$ | $N^{frame,μ}_{slot}$ | $N^{subframe,μ}_{slot}$ |
|---|---|---|---|
| 3 | 14 | 80 | 8 |
| 4 | 14 | 160 | 16 |

TABLE 202

| μ | $N^{slot}_{symb}$ | $N^{frame,μ}_{slot}$ | $N^{subframe,μ}_{slot}$ |
|---|---|---|---|
| 2 | 12 | 40 | 4 |

In FIG. 5, μ=0, 1, 2, 3, 4 is illustrated. The length and subcarrier spacing in the time domain of the slot may have an inverse relationship. For example, when μ=0, the length in the time domain of the slot may be 1 ms and the subcarrier interval may be 15 kHz, and when μ=1, the length in the time domain of the slot may be 0.5 ms and the subcarrier interval may be 30 kHz.

A plurality of orthogonal frequency division multiplexing (OFDM) symbols may be included in the slot. A plurality of OFDM symbols in a slot may be classified into downlink (indicated by D), flexible (indicated by X), and uplink (indicated by U). The format of the slot may be determined according to which of the OFDM symbols in the slot is composed of D, X, and U.

The following table shows an example of slot formats.

TABLE 3

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |

TABLE 3-continued

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | X | U | D | D | D | D | D | X | U |
| 47 | D | D | X | U | U | U | U | D | D | X | U | U | U | U |
| 48 | D | X | U | U | U | U | U | D | X | U | U | U | U | U |
| 49 | D | D | D | D | X | X | U | D | D | D | D | X | X | U |
| 50 | D | D | X | X | U | U | U | D | D | X | X | U | U | U |
| 51 | D | X | X | U | U | U | U | D | X | X | U | U | U | U |
| 52 | D | X | X | X | X | X | U | D | X | X | X | X | X | U |
| 53 | D | D | X | X | X | X | U | D | D | X | X | X | X | U |
| 54 | X | X | X | X | X | X | X | D | D | D | D | D | D | D |
| 55 | D | D | X | X | X | U | U | U | D | D | D | D | D | D |
| 56-255 | | | | | | | Reserved | | | | | | | |

The UE may be configured with a slot format by higher layer signals, DCI, or a combination of the higher layer signal and DCI.

The antenna port is defined such that a channel carrying a symbol on an antenna port can be inferred from a channel carrying another symbol on the same antenna port. The two antenna ports are said to be in a quasi co-located if the large-scale characteristics of a channel through which a symbol on one antenna port is transmitted can be inferred from a channel through which a symbol on another antenna port is transmitted. The large-scale characteristic may include at least one of delay spread, Doppler spread, Doppler shift, average gain, average delay, and spatial Rx parameters.

The resource grid may be defined to include a specific number of subcarriers and OFDM symbols for each neurology and carrier, and may start from a common resource block indicated by higher layer signaling.

A resource element (RE) is each element of a resource grid for setting an antenna port and a subcarrier spacing, and may correspond to a complex value.

A resource block (RB) may be defined as continuous subcarriers (e.g. 12) in the frequency domain. The reference resource block may be numbered from 0 to the top in the frequency domain. Subcarrier 0 of the reference resource block 0 is also indicated as 'reference point A', and is common to all subcarrier spacing configurations. In addition, it can be used as a common reference point for other resource block grids, and the reference point A can be obtained from a higher layer parameter.

The common resource block may be numbered in ascending order from 0 in the frequency domain to set the subcarrier spacing. The subcarrier 0 of the common resource block 0 for setting the subcarrier spacing may coincide with the 'reference point A'.

A physical resource block and a virtual resource block are defined in the carrier bandwidth part, and may be numbered from 0 in ascending order.

According to carrier aggregation, up to 15 secondary cells in addition to the primary cell can be aggregated and used. That is, up to 16 serving cells may be aggregated to the terminal.

A physical downlink control channel (PDCCH) may include one or more control channel elements (CCEs) as illustrated in the following table.

TABLE 4

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in a future wireless communication system, a new unit called a control resource set (CORESET) may be introduced. The terminal may receive the PDCCH in the CORESET.

Figure 6:
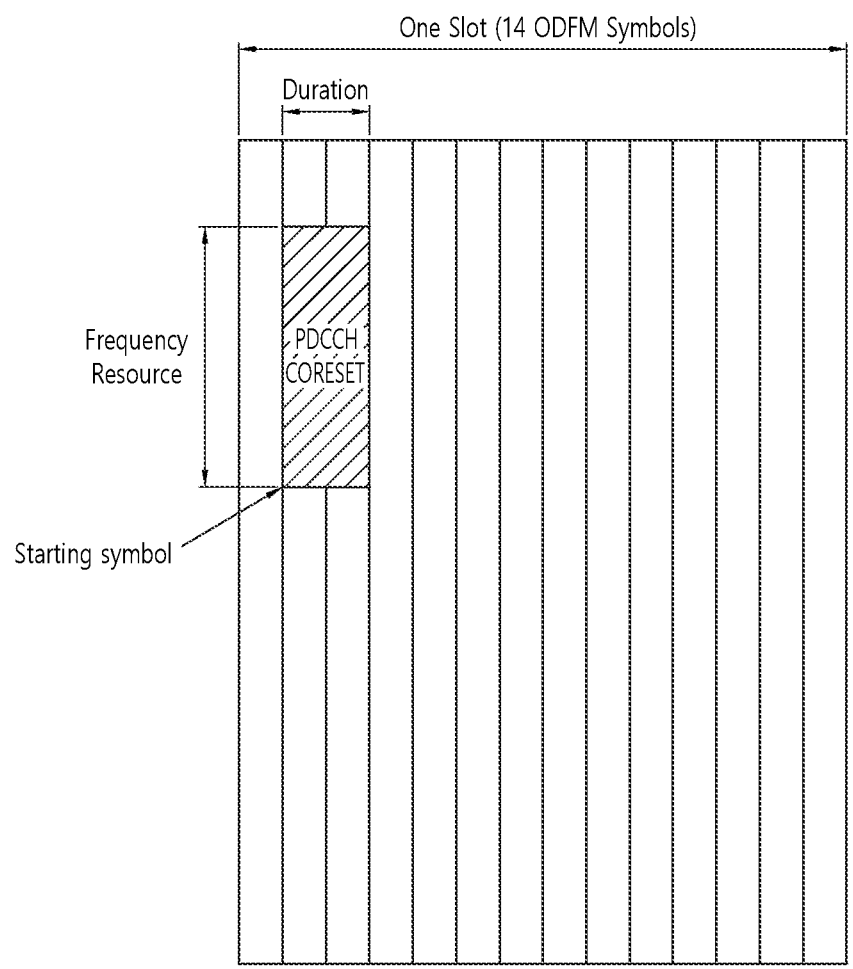
FIG. 6 illustrates CORESET.

FIG. 6 illustrates CORESET.

Referring to FIG. 6, the CORESET includes $N^{CORESET}_{RB}$ number of resource blocks in the frequency domain, and $N^{CORESET}_{symb} \in \{1, 2, 3\}$ (for example) number of symbols in the time domain. $N^{CORESET}_{RB}$ and $N^{CORESET}_{symb}$ may be provided by a base station via higher layer signaling. As illustrated in FIG. 6, a plurality of CCEs (or REGs) may be included in the CORESET. A plurality of CCEs (or REGs) may be included in a CORESET. Duration, starting symbol, and etc. of a CORESET may be configured or predetermined.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal/UE.

Figure 7:
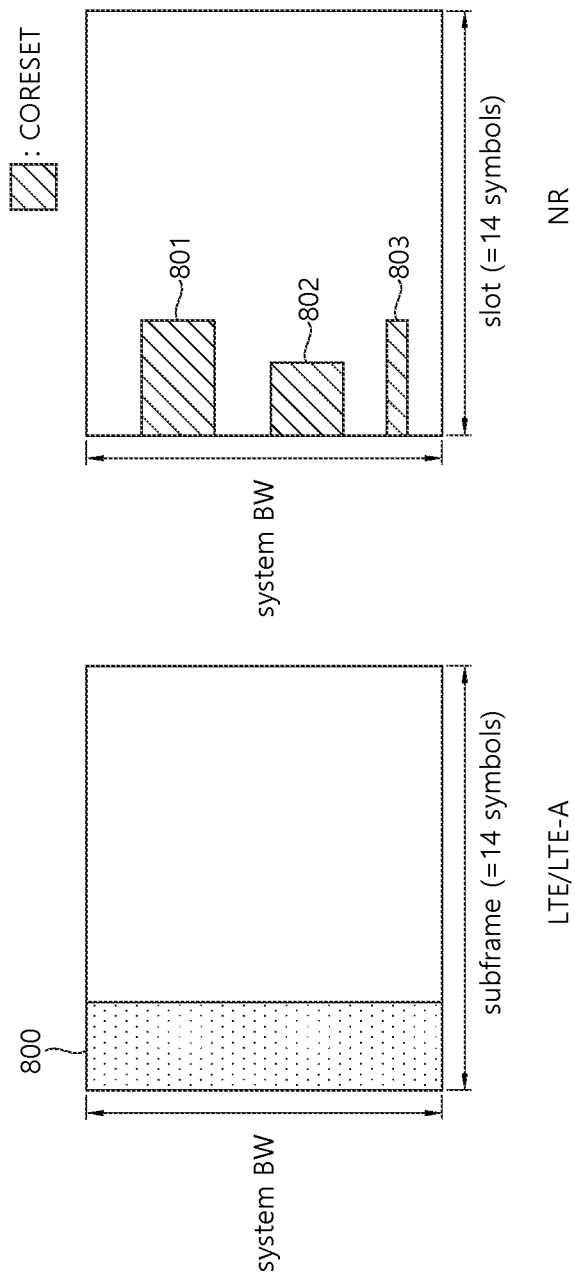
FIG. 7 is a diagram illustrating a difference between a related art control region and the CORESET in NR.

FIG. 7 is a diagram illustrating a difference between a related art control region and the CORESET in NR.

Referring to FIG. 7, a control region 800 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR, CORESET described above was introduced. CORESETs 801, 802, and 803 are radio resources for control information to be received by the terminal and may use only a portion, rather than the entirety of the system bandwidth. The BS may allocate the CORESET to each UE and may transmit control information through the allocated CORESET. For example, in FIG. 7, a first CORESET 801 may be allocated to UE 1, a second CORESET 802 may be allocated to UE 2, and a third CORESET 803 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Figure 8:
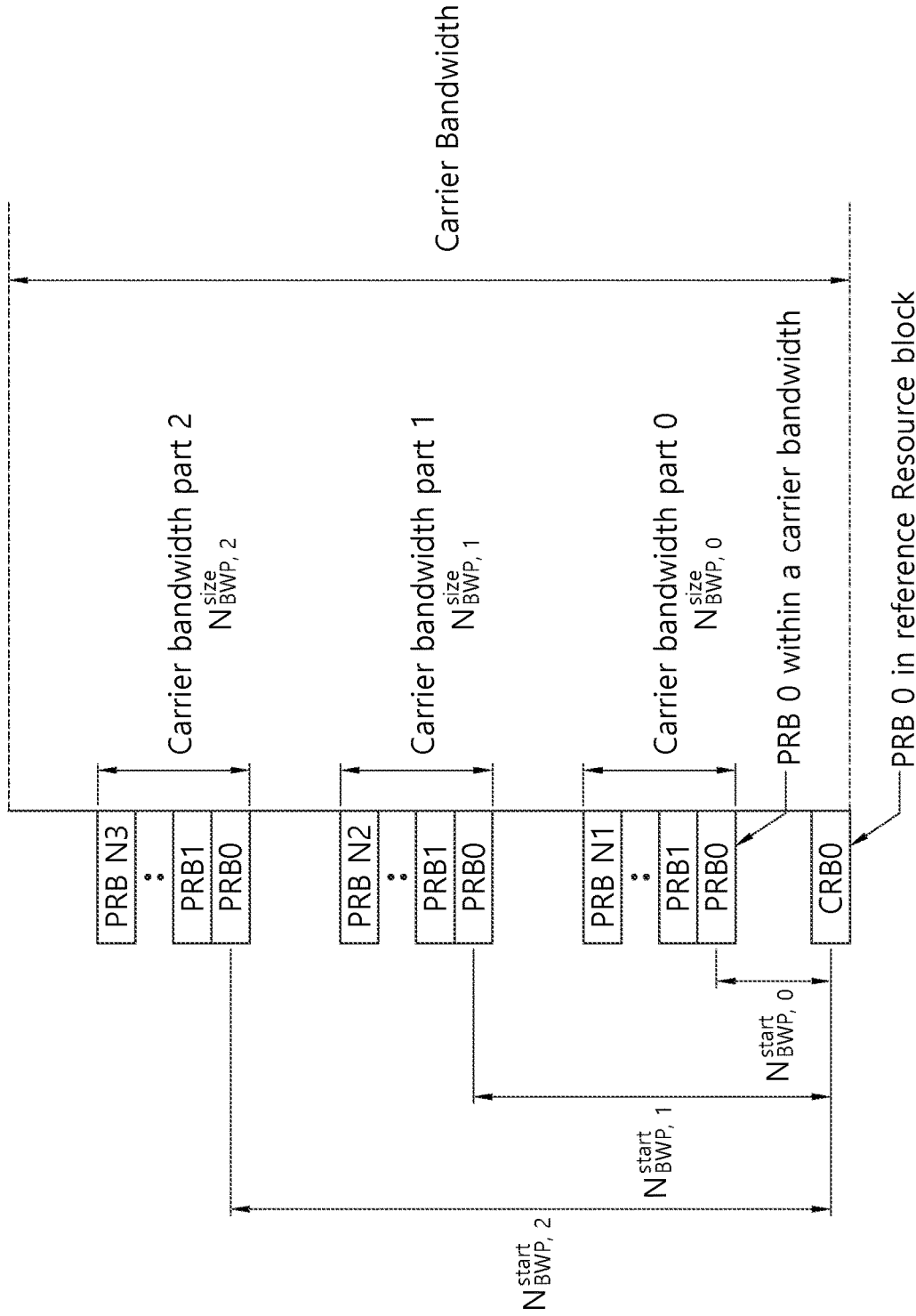
FIG. 8 illustrates a carrier bandwidth part which is newly introduced in NR.

FIG. 8 illustrates a carrier bandwidth part which is newly introduced in NR.

Referring to FIG. 8, the carrier bandwidth part may be simply abbreviated as bandwidth part (BWP). As described above, in a future wireless communication system, various numerology (e.g., various subcarrier spacings) may be supported for the same carrier. NR may define a common resource block (CRB) for a given numerology in a given carrier.

The bandwidth part is a set of consecutive physical resource blocks (PRBs) selected from consecutive subsets of common resource blocks (CRBs) for a given numerology in a given carrier.

As illustrated in FIG. 8, a common resource block may be determined according to numerology for which carrier band, for example, which subcarrier spacing is used. The common resource block may be indexed (starting from 0) from the lowest frequency of the carrier band, and a resource grid using a common resource block as a unit (this may be referred to as a common resource block resource grid) may be defined.

The bandwidth part may be indicated on the basis of the CRB having the lowest index (let's call it CRB 0). CRB 0 having the lowest index is also referred to as point A.

For example, in a given numerology of a given carrier, i-th BWP may be indicated by $N^{start}_{BWP,i}$ and $N^{size}_{BWP,i}$. $N^{start}_{BWP,i}$ may indicate a starting CRB of i-th BWP based on CRB 0, and $N^{size}_{BWP,i}$ may indicate a size (e.g., in a unit of PRB) of i-th BWP in a frequency domain. PRBs in each BWPS may be indexed from 0. The index of CRB in each BWP may be mapped to the index of the PRB. For example, the mapping may be performed as $n_{CRB} = n_{PRB} + N^{start}_{BWP,i}$.

The UE may be configured with up to four downlink bandwidth parts in the downlink, but only one downlink bandwidth part may be activated at a given point in time. The UE does not expect to receive PDSCH, PDCCH, CSI-RS, etc. outside of the active downlink bandwidth part among the downlink bandwidth parts. Each downlink bandwidth part may include at least one CORESET.

The UE may be configured with up to four uplink bandwidth parts in the uplink, but only one uplink bandwidth part may be activated at a given point in time. The UE does not transmit PUSCH, PUCCH, etc. outside of the active uplink bandwidth part of the uplink bandwidth parts.

NR operates in a broadband compared to a conventional system, but not all terminals may support such a broadband. The bandwidth part (BWP) may be said to be a feature that enables a terminal that cannot support the broadband to operate.

A terminal configured to operate in a bandwidth part (BWP) of a serving cell may be configured with a maximum of four bandwidth part (BWP) sets by a higher layer for the serving cell.

The initially activated DL BWP may be defined by the location and number of adjacent PRBs for the control resource set for the type 0-PDCCH common search space, subcarrier spacing, and CP. For operation in the primary cell, the UE may be provided with higher layer parameters for a random access procedure.

In the case of an unpaired spectrum operation, the UE may expect that the center frequency for the DL BWP is the same as the center frequency for the UL BWP.

In what follows, power saving will be described.

The battery life of a UE is an important factor of user experience that affects selection of a particular 5G handset and/or service. Since the NR system is capable of high-speed data transfer, user data is expected to increase explosively and to be provided over a very short time period.

Meanwhile, energy efficiency of a device is related to support for two aspects of efficient data transmission in the presence of a load and low energy consumption in the absence of data. Here, efficient data transmission in the presence of a load may be checked by average spectrum efficiency while low energy consumption in the absence of data may be estimated by a sleep ratio.

As power saving techniques for a UE, UE adaptation to traffic and power consumption pattern, adaption to the change of frequency/time, adaptation to antenna, adaptation to DRX configuration, adaptation to UE processing capability, adaptation for reduction of PDCCH monitoring/decoding, power saving signal/channel/procedure for triggering adaptation to UE power consumption, power consumption reduction in the RRM measurement, and so on may be considered.

Here, with respect to the adaptation to DRX configuration, a Downlink-Shared Channel (DL-SCH) characterized by support for UE DRX that enables UE power saving and a Paging Channel (PCH) (where a DRX period may be indicated by the network to the UE) characterized by support for UE DRX that enables UE power saving may be considered.

Also, with respect to the adaption to UE processing capability, the UE may report static UE wireless access capability at least when requested by the network. An gNB may request which UE capability has to be reported based on band information. If allowed by the network, the UE may transmit, to the gNB, a temporary capability limit request for signaling possibility of a limited use of part of the capability (for example, due to hardware sharing, interference, or overheating). Afterwards, the gNB may confirm or reject the request. The temporary capability limit has to be transparent to the 5GC. Static capabilities are mainly stored in the 5GC.

Also, with respect to the adaptation for reduction of PDCCH monitoring/decoding, the UE monitors a set of PDCCH candidates in the monitoring occasions configured within one or more configured CORESETs according to the corresponding search space configuration. A CORESET is composed of a set of PRBs having duration spanning 1 to 3 OFDM symbols. Resource Element Groups (REGs) and Control Channel Elements (CCEs), which are composed of resource units, are defined within a CORESET where each CCE is composed of one set of REGs. Control channels are formed by aggregation of CCEs. Different code rates for the control channels are implemented by aggregation of a different number of CCEs. Mapping between interleaved and non-interleaved CCEs and REGs is supported within the CORESET.

Also, with respect to the power saving signal/channel/procedure for triggering adaptation to UE power consumption, when Carrier Aggregation (CA) is configured, to realize reasonable UE battery consumption, an activation/deactivation mechanism of cells is supported. If a cell is deactivated, the UE does not have to receive the corresponding PDCCH or PDSCH, and the UE is made incapable of performing the corresponding uplink transmission and does not have to perform CQI measurement, either. On the contrary, if a cell is activated, the UE has to receive the PDCCH and PDSCH (when the UE is configured to monitor the PDCCH from the SCell) and is expected to perform CQI measurement. NG-RAN ensures that SCells mapped to the PUCCH SCell are deactivated before the PUCCH SCell is modified or removed.

Also, with respect to the power consumption reduction in the RRM measurement, if two types of measurement are available, RRM configuration may include an SSB about a reported cell(s) and beam measurement information related to a CSI-RS (about layer 3 mobility).

Also, if carrier aggregation is configured, RRM configuration may include a list of best cells at the respective frequencies available for measurement information. Also, RRM measurement information may include beam measurement about listed cells belonging to a target gNB.

In what follows, Discontinuous Reception (DRX), which is one of techniques that may be used to implement UE power saving, will be described.

A DRX-related UE procedure may be summarized as shown in Table 5.

TABLE 5

|  | Type of signals | UE procedure |
| --- | --- | --- |
| Step 1 | RRC signaling (MAC-CellGroupConfig) | Reception of DRX configuration information |
| Step 2 | MAC CE ((Long) DRX command MAC CE) | Reception of DRX command |
| Step 3 | — | PDCCH monitoring during on-duration of DRX period |

Figure 9:
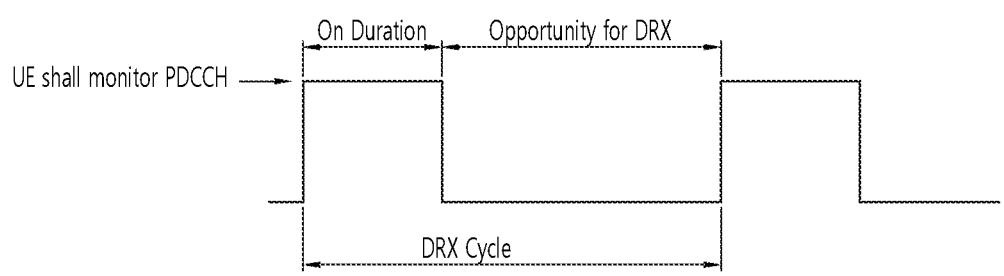
FIG. 9 illustrates a DRX period.

FIG. 9 illustrates a DRX period.

According to FIG. 9, the UE uses DRX in the RRC_IDLE and RRC_INACTIVE states to reduce power consumption. If DRX is set, the UE performs a DRX operation according to the DRX configuration information. The UE operating under the DRX scheme repeatedly turns on and off the reception operation.

For example, if DRX is set, the UE attempts reception of a downlink channel PDCCH only within a preconfigured time period but does not attempt reception of the PDCCH in the remaining time period. The time period during which the UE has to attempt PDCCH reception is defined as an on-duration period, where the on-duration period is defined once for each DRX period.

The UE may receive DRX configuration information from the gNB through RRC signaling and may perform a DRX operation through reception of a (long) DRX command MAC CE.

The DRX configuration information may be included in the MAC-CellGroupConfig. The MAC-CellGroupConfig, which is an IE, may be used for configuration of MAC parameters with respect to a cell group, which includes DRX.

The DRX command MAC CE or long DRX command MAC CE may be identified by the MAC PDU sub-header having the LCID, which may have a fixed size of 0 bits.

Table 6 below shows LCID values with respect to the DL-SCH.

TABLE 6

| Index | LCID values |
| --- | --- |
| 111011 | Long DRX Command |
| 111100 | DRX Command |

The PDCCH monitoring operation of the UE is controlled by DRX and Bandwidth Adaptation (BA). Meanwhile, if DRX is set, the UE doesn't have to continuously perform PDCCH monitoring. Meanwhile, DRX has the following characteristics.

On-duration: This is the period during which the UE waits to receive the next PDCCH after the UE wakes up. If the UE successfully decodes the PDCCH, the UE maintains the wake-up state and starts inactivity timer.

Inactivity timer: This is the period during which the UE waits for successful PDCCH decoding since the last successful PDCCH decoding and also the period during which the UE sleeps again when the UE fails the PDCCH decoding. The UE has to restart the inactivity timer after single successful decoding of the PDCCH with respect to the single, first transmission (in other words, it is not intended for retransmission).

Retransmission timer: This is the period during which retransmission is expected.

Period: Period specifies periodic repetitions of the on-duration and subsequent, available inactivity periods.

In what follows, DRX within the MAC layer will be described. The MAC entity below may represent a UE or a MAC entity of the UE.

The MAC entity may be configured by RRC having a DRX function that controls the PDCCH monitoring activity of a UE with respect to C-RNTI, CS-RNTI, TPC-PUCCH-RNTI, TPC-PUSCH-RNTI, and TPC-SRS-RNTI of the MAC entity. When the DRX operation is employed, the MAC entity has to monitor the PDCCH. In the RRC_CONNECTED state, if DRX is set, the MAC entity may monitor the PDCCH discontinuously by using the DRX operation. Otherwise, the MAC entity has to monitor the PDCCH continuously.

RRC controls the DRX operation by configuring parameters of the DRX configuration information.

If the DRX period is set, activity time includes the following time periods.

Time period during which drx-onDurationTimer or drx-InactivityTimer or drx-RetransmissionTimerDL or drx-RetransmissionTimerUL or ra-ContentionResolutionTimer is in operation; or Time period during which a scheduling request is transmitted on the PUCCH and pending; or Time period during which a PDCCH that indicates new transmission to the C-RNTI of the MAC entity is not received after successful reception of a random access response with respect to a random access preamble not selected by the MAC entity among contention-based random access preambles.

If DRX is set, the UE has to follow the procedure described below.

1> If a MAC PDU is transmitted from a configured uplink grant,

2> drx-HARQ-RTT-TimerUL with respect to the corresponding HARQ process is started immediately after the first reception of the corresponding PUSCH transmission;
2> drx-RetransmissionTimerUL with respect to the corresponding HARQ procedure is stopped.
1> If drx-HARQ-RTT-TimerDL expires:
2> If data of the corresponding HARQ procedure has not been successfully decoded:
3> drx-RetransmissionTimerDL with respect to the corresponding HARQ procedure is started.
1> If drx-HARQ-RTT-TimerUL expires:
2> drx-RetransmissionTimerUL with respect to the corresponding HARQ procedure is started.
1> If a DRX command MAC CE or (long) DRX command MAC CE is received:
2> drx-onDurationTimer is stopped;
2> drx-InactivityTimer is stopped.
1> If drx-Inactivity Timer expires or DRX command MAC CE is received:
2> If a short DRX period is set:
3> drx-ShortCycleTimer is started or restarted;
3> A short DRX period is used.
2> Otherwise:
3> A long DRX period is used.
1> If drx-ShortCycleTimer expires:
2> A long DRX period is used.
1> If a long DRX command MAC CE is received:
2> drx-ShortCycleTimer is stopped;
2> A long DRX period is used.
1> If a short DRX period is used and [(SFN*10)+ subframe number] modulo (drx-ShortCycle)=(drx-StartOffset) modulo (drx-ShortCycle); or
1> If a long DRX period is used and [(SFN*10)+subframe number] modulo (drx-LongCycle)=drx-StartOffset:
2> If drx-SlotOffset is set:
3> drx-onDurationTimer is started after drx-SlotOffset.
2> Otherwise:
3> drx-onDurationTimer is started.
1> If an MAC entity is within the activity time:
2> PDCCH is monitored;
2> If the PDCCH indicates DL transmission or DL allocation is configured:
3> drx-HARQ-RTT-TimerDL with respect to the corresponding HARQ procedure is started immediately after transmission of the corresponding PUCCH;
3> drx-RetransmissionTimerDL with respect to the corresponding HARQ procedure is stopped.
2> If PDCCH indicates UL transmission:
3> drx-HARQ-RTT-TimerUL with respect to the corresponding HARQ process is started immediately after the first reception of the corresponding PUSCH transmission;
3> drx-RetransmissionTimerUL with respect to the corresponding HARQ procedure is stopped.
2> If PDCCH indicates new transmission (UL or DL):
3> drx-InactivityTimer is started or restarted.
1> Otherwise (in other words, if it is not part of the activity time):
2> type-0-triggered SRS is not transmitted.
1> If CQI masking (cqi-Mask) is configured by the upper layer:
2> If drx-onDurationTimer does not operate:
3> Reporting of CSI is not performed on the PUCCH.
1> Otherwise:
2> If the MAC entity is not within the activity time:
3> Reporting of CSI is not performed on the PUCCH.

Irrespective of whether the MAC entity monitors the PDCCH or not, the MAC entity may transmit HARQ feedback and type-1-triggered SRS if the MAC entity is expected.

If the activity time is not a complete PDCCH occasion (namely, a case where activity time starts or expires in the middle of the PDCCH occasion), the MAC entity does not have to monitor the PDCCH.

In what follows, DRX for paging will be described.

The UE may use DRX in the RRC_IDLE and RRC_INACTIVE states to reduce power consumption. The UE may monitor one Paging Occasion (PO) for each DRX cycle, where one PO may comprise a plurality of time slots (for example, subframes or OFDM symbols) to which paging DCI may be transmitted. In a multi-beam operation, the UE may assume that the length of one PO corresponds to one period of beam sweeping, and the same paging message is repeated within all of the beams having a sweeping pattern. The paging message for paging initiated by the RAN is the same as that initiated by the CN.

One Paging Frame (PF) is one radio frame and may include one or a plurality of POs.

When receiving RAN paging, the UE initiates an RRC connection resume procedure. If the UE receives paging initiated by the CN while being in the RRC_INACTIVE state, the UE may transition to the RRC_IDLE state and inform of the transition.

In what follows, the SS/PBCH block will be described. Here, the SS/PBCH block may be a Synchronization Signal Block (SSB).

First, a time-frequency structure of the SS/PBCH block is described.

In the time domain, an SS/PBCH block is composed of 4 OFDM symbols numbered in the ascending order from 0 to 3 within the SS/PBCH block. Here, a PSS, an SSS, and a PBCH associated with a DMRS are mapped to the symbols as shown in the table below.

In the frequency domain, an SS/PBCH block is composed of 240 contiguous subcarriers numbered in the ascending order from 0 to 239 within the SS/PBCH block. k and l represent the frequency and time indexes within one SS/PBCH block, respectively. The UE may assume in the table below that complex-valued symbols corresponding to the resource elements indicated by 'Set to 0' are configured to be 0. In the table below, $v=N_{ID}^{cell}$ mod 4. $k_{SSB}$ is a subcarrier offset from the subcarrier 0 within the common resource block. $N_{CRB}^{SSB}$ to the subcarrier 0 of the SS/PBCH block, where 4 Least Significant Bits (LSBs) are given by the upper layer parameter ssb-SubcarrierOffset, and the Most Significant Bit (MSB) of $k_{SSB}$ with respect to the SS/PBCH block type A is given by $a_{\bar{A}+5}$ within a PBCH payload. If ssb-SubcarrierOffset is not provided, $k_{SSB}$ is derived by the frequency difference between Point A and the SS/PBCH block.

The UE may assume that complex-valued symbols corresponding to the resource elements which are part of the common resource block the whole or part of which overlaps the SS/PBCH and are not used for SS/PBCH transmission are configured to be 0 in the OFDM symbol when the SS/PBCH block is transmitted.

For the SS/PBCH block, the UE has to assume the following.

Antenna port p=4000 is used for PSS, SSS, and PBCH transmission.

The same cyclic prefix length and the same subcarrier spacing for the PSS, SSS, and PBCH.

For the SS/PBCH block type A, $\mu \in \{0,1\}$; for $k_{SSB}$, $k_{SSB} \in \{0, 1, 2, \ldots, 23\}$; and $N_{CRB}^{SSB}$ is expressed with a subcarrier spacing of 15 kHz.

For the SS/PBCH block type B, $\mu \in \{3, 4\}$; for $k_{SSB}$ expressed in terms of the subcarrier spacing given by the upper layer parameter subCarrierSpacingCommon, $k_{SSB} \in \{0, 1, 2, \ldots, 11\}$; and $N_{CRB}^{SSB}$ is expressed with a subcarrier spacing of 60 kHz.

The UE may assume that the SS/PBCH blocks transmitted with the same block index at the same center frequency position are Quasi Co-Located (QCLed) with respect to the Doppler spread, Doppler shift, average gain, average delay, delay spread, and spatial Rx parameters when applicable. The UE should not assume QCL for other SS/PBCH block transmissions.

Table 7 shows resources within the SS/PBCH block with respect to the PSS, SSS, PBCH, and DMRS for PBCH.

TABLE 7

| Channel or signal | OFDM symbol number l relative to the start of an SS/PBCH block | Subcarrier number k relative to the start of an SS/PBCH block |
| --- | --- | --- |
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v, 192 + v, 196 + v, . . . , 236 + v |

In what follows, mapping of a PSS within an SS/PBCH block will be described.

The UE has to assume that a sequence $d_{PSS}(0), d_{PSS}(126)$ of symbols comprising a primary synchronization signal is scaled by a factor $\beta_{PSS}$ to be compliant with PSS power allocation and k is mapped to the resource element $(k, l)_{p,\mu}$ in the ascending order. Here, k and l are given by the table above and represent the frequency and time indexes respectively in one SS/PBCH block.

In what follows, mapping of an SSS within an SS/PBCH block will be described.

The UE has to assume that a sequence $d_{SSS}(0), \ldots, d_{SSS}(126)$ of symbols comprising a secondary synchronization signal is scaled by a factor $\beta_{SSS}$ and k is mapped to the resource element $(k, l)_{p,\mu}$ in the ascending order. Here, k and l are given by the table above and represent the frequency and time indexes respectively in one SS/PBCH block.

In what follows, mapping of a PBCH and a DMRS within an SS/PBCH block will be described.

The UE has to assume that a sequence $d_{PBCH}(0), \ldots, d_{PBCH}(M_{symb}-1)$ of complex-valued symbols comprising a physical broadcast channel is scaled by a factor $\beta_{PBCH}$ to be compliant with PBCH power allocation and is mapped to the resource element $(k, l)_{p,\mu}$ satisfying the following criterion in an order starting from $d_{PBCH}(0)$.

This is not used for a PBCH demodulation reference signal.

Mapping to resource elements $(k, l)_{p,\mu}$ not reserved by the PBCH DMRS has to be performed in the increasing order of index k and then in the increasing order of index l. Here, k and l are the frequency and time indexes respectively in one SS/PBCH block and are given by the table above.

The UE has to assume that a sequence $r(0), \ldots, r(143)$ of complex-valued symbols comprising a demodulation reference signal with respect to an SS/PBCH block is scaled by a factor $\beta_{PBCH}^{DM-RS}$ to be compliant with PBCH power allocation and is mapped to the resource element $(k, l)_{p,\mu}$ in the increasing order of index k and then in the increasing order of index l. Here, k and l are given by the table above and represent the frequency and time indexes respectively in one SS/PBCH block.

Hereinafter, the present disclosure will be described.

As a larger number of communication devices require greater communication capacity than before, a requirement for efficient utilization of limited frequency bands becomes more and more important in the next-generation wireless communication system. Furthermore, cellular communication systems such as the LTE/NR system is considering using an unlicensed band such as the 2.4 GHz band mostly used for the conventional WiFi systems and unlicensed bands such as the 5 GHz and 60 GHz bands recently receiving attention for traffic offloading.

Since operating a wireless system in an unlicensed band basically assumes wireless transmission and reception through contention among communication nodes, each communication node is requested to confirm before transmitting its signal by performing channel sensing that other communication nodes are not transmitting a signal. For the sake of convenience, the aforementioned operation is referred to as Listen Before Talk (LBT) or Channel Access Procedure (CAP); particularly, the operation of checking whether another communication node is transmitting a signal is referred to as Carrier Sensing (CS), and a case where other communication nodes are not transmitting a signal is defined as being confirmed by Clear Channel Assessment (CCA). Meanwhile, in the present disclosure, devices performing LBT are divided into Frame Based Equipment (FBE) and Load Based Equipment (LBE) depending on their mechanism employed. More specifically, FBE refers to the device of which the transmit/receive structure has periodic timing that is the same as a fixed frame period, and LBE refers to the device of which the transmit/receive structure is not fixed on the time domain but is demand-driven. Also, each of the FBE and the LBE may be a UE or a base station.

A base station or a user equipment of the LTE/NR system also has to perform LBT to transmit a signal in an unlicensed band (for the sake of convenience, it is referred to as a U-band), and when the base station or the user equipment of the LTE/NR system transmits a signal, other communication nodes such as Wi-Fi nodes also have to perform LBT to avoid causing interference. As one example, in the WiFi standard (801.11ac), the CCA threshold is specified as −62 dBm for non-WiFi signals and −82 dBm for WiFi signals, which indicates, for example, that a Station (STA) or an Access Point (AP) does not transmit a signal so as to avoid causing interference when a signal other than a WiFi signal is received with a power of more than −62 dBm.

In the NR system, system information required for initial access, such as RACH configuration, may be transmitted via Remaining Minimum System Information (RMSI), and PDSCH, which is scheduled by PDCCH, carries the corresponding RMSI. Meanwhile, the time/frequency resource where a PDCCH scheduling the PDSCH carrying RMSI is located may be associated with a Synchronization Signal Block (SSB) index. More specifically, when the time/frequency resource (or CORESET) where the PDCCH may be located and the number of blind detections for each aggregation level are defined as a Search Space (SS) set, the SS set may be linked to the SSB index, and specific SS set information may be configured by PBCH for each SSB.

Figure 10:
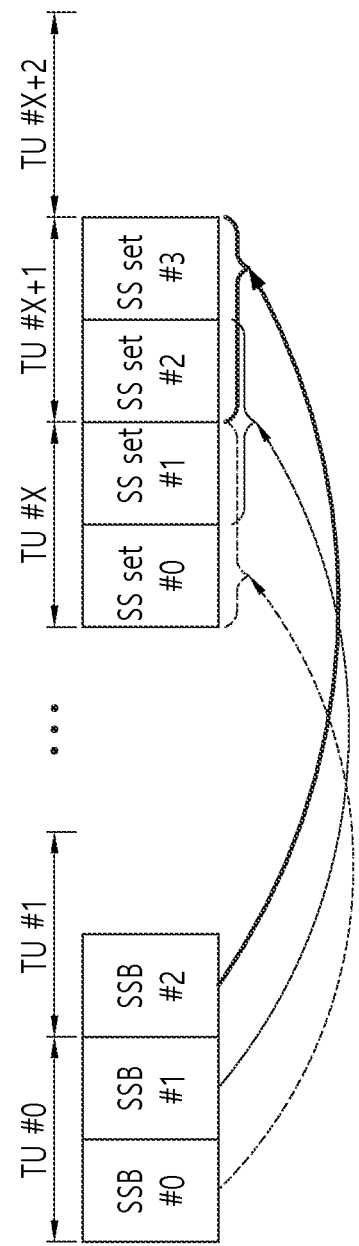
FIG. 10 illustrates one example of multiplexing among SSBs and SS sets in the time domain.

FIG. 10 illustrates one example of multiplexing among SSBs and SS sets in the time domain.

The method used for multiplexing among SSBs and SS sets may be Time Domain Multiplexing (TDM) or Frequency Domain Multiplexing (FDM). As one example, as shown in FIG. 10, SSBs and SS sets may be TDMed, where signaling is transmitted to indicate that Transmission Unit (TU) #X is linked to two SS sets #0/1 (or SS set #1/2 on TU #0/1 or SS set #2/3 on TU #1) through PBCH of the SSB index #0 (or SSB index #1 or SSB index #2), and a UE performs PDCCH monitoring on the two SS sets and receives RMSI through the PDSCH scheduled by the detected PDCCH.

For the sake of convenience, although the present disclosure is described with reference to the example of FIG. 10, one or more SS sets may be associated with one SSB index, and SS sets associated with different SSB indexes may be configured to or not to overlap with each other on the time axis. Depending on the cases, the whole (or part) of the SS set associated with an SSB transmitted on TU #0 may be transmitted on the same TU (or a TU preceding TU #0), one or more SSBs or SS sets may exist within one TU, or a TU may correspond to one or more slots.

An operating principle similar to the above may be applied between an SSB and a RACH occasion (RO). More specifically, an RO may be composed of one or more symbol regions and a plurality of resource blocks (RBs); mapping between an SSB and an RO may be one-to-one, one-to-many, many-to-one, or many-to-many; and the corresponding mapping method may be configured by the RACH configuration on the system information.

Frame Based Equipment (FBE) refers to a device operating at a periodic timing having the same period as a fixed frame period based on a transmit and receive structure. FBE should implement a channel access mechanism based on the Listen Before Talk (LBT) feature to support channel access in an unlicensed band channel. LBT refers to a mechanism of performing Clear Channel Assessment (CCA) before connecting to a channel and is performed in a single observation slot. Here, an observation slot refers to a time period during which transmission from a different Radio Local Area Network (RLAN) exists on an operating channel and may be at least 9 µs or more. A device initiating one or more transmissions is called an initiating UE/initiating device, or a responding UE/responding device otherwise. FBE may be referred to as an initiating device or a responding device or both.

In what follows, FBE will be described in more detail.

FBE should implement a channel access mechanism based on the Listen Before Talk (LBT) feature to detect existence of another RLAN transmission on an operating channel.

FBE refers to a device operating at a periodic timing having the same period as a fixed frame period based on a transmit and receive structure. The single observation slot should have duration not shorter than 9 µs.

In what follows, a channel access procedure for an initiating UE will be described.

An initiating UE (FBE) should implement a channel access mechanism compliant with the following requirements.

1) The fixed frame period supported by a device should be declared by the manufacturer. The range of the fixed frame period should be from 1 ms to 10 ms. Transmission may be initiated only at the start point of the fixed frame period. The device may change the fixed frame period but the change rate may not exceed once every 200 ms.

2) Right before transmission is started on the operating channel at the start point of the fixed frame period, an initiating device has to perform Clear Channel Assessment (CCA) check for a single observation slot. The operating channel should be considered occupied if the energy level of the operating channel exceeds the ED Threshold Level (TL) given by the requirement (6) below. If the initiating device discovers that the operating channel(s) are clear, transmission may be started immediately.

If the initiating device discovers that the operating channel is occupied, no transmission should be performed during the next fixed frame period. If this requirement is met, the FBE is allowed to continue short control signaling transmission on this channel.

For a device performing simultaneous transmission on a plurality of (adjacent or non-adjacent) operating channels, the device is allowed to continue transmission on different operating channels if no signal is detected on the different operating channels from a CCA check.

Channel Occupancy Time (COT) is defined as the total time for which the FBE may perform transmission on a given channel without reassessing availability of the channel.

If transmission gap does not exceed 16 µs, the device may perform multiple transmissions within the COT without performing additional CCA on the operating channel.

If the transmission gap exceeds 16 µs, and additional CCA does not detect RLAN transmission that exceeds a threshold defined in the requirement (6) below, the device may continue transmission. The additional CCA has to be performed within the transmission gap and within an observation slot right before transmission. All of the transmission gaps are counted as part of the COT.

3) An initiating device may authorize one or more associated responding devices to perform transmission on a current operating channel within a current COT. An authorized responding device has to follow the procedure described below.

4) The COT should not exceed 95% of the fixed frame period defined in the requirement (1) above, and since an idle period has to follow until the next fixed frame period is started, the idle period lasts at least 100 µs and amounts to at least 5% of the COT.

5) When a packet intended for a device is received correctly, the device may skip CCA and proceed immediately with transmission of management and control frames (for example, ACK and block ACK frames). A consecutive sequence of these transmissions by the device without involving new CCA should not exceed the maximum COT defined in the requirement (4) above.

6) The ED Threshold Level (TL) measured at the input of a receiver has to be proportional to the maximum transmit power $P_H$ according to an equation that specifies the maximum transmit power in terms of dBm Effective Isotropically Radiated Power (EIRP) when a 0 dBi receive antenna is employed.

When $P_H$ is less than or equal to 13 dBm, TL=−75 dBm/MHz; when $P_H$ exceeds 13 dBm and less than 23 dBm, TL=−85 dBm/MHz+(23 dBm−$P_H$); and when $P_H$ is greater than or equal to 23 dBm, TL=−85 dBm/MHz.

In what follows, a channel access procedure for a responding UE will be described.

The requirement (3) above describes a possibility that an initiating UE may authorize one or more associated responding UEs to perform transmission on a current operating channel within a current fixed frame period. The authorized responding UE has to follow the procedure described below.

1) A responding UE which has received a transmission grant from an associated initiating UE may proceed with transmission on a current operating channel.

a) If transmission is started at a maximum of $16\mu_s$ after a final transmission by the initiating UE which has provided a grant, a responding UE may proceed with the transmission without performing CCA.

b) A responding UE that does not start transmission within $16\mu_s$ after a final transmission from the initiating UE which has provided a grant has to perform CCA on the operating channel during a single observation slot within $25\mu_s$ which ends right after an allowed transmission time. If energy exceeding the ED TL defined in the requirement (6) above is detected, the responding UE proceeds with the step (3) described below. Otherwise, the responding UE proceeds with the step (2) described below.

2) A responding UE may perform transmission on a current operating channel during the remaining COT of a current fixed frame period. The responding UE may perform multiple transmissions, and the gap between transmissions should not exceed $16\mu_s$. When transmission due to the responding UE is completed, the responding UE has to proceed with the step (3).

As described above, according as whether to introduce FBE-based LBT to the NR system is considered, a method for performing LBT, different from the conventional methods, is required. Accordingly, the present disclosure proposes a method for configuring a CCA threshold value, the length of an observation slot, and a Contention Window Size (CWS) differently for each operator or RAT and configuring a channel access probability differently for a specific frame by setting a high priority to LBT. Also, the present disclosure proposes a method for configuring a transmission position and period within the frame of an SSB that has to be transmitted periodically, a method for transmitting RACH for initial access, and a method for AUL transmission and configuration that allows uplink transmission without involving a grant from a base station or an initiating device once a resource is pre-configured for a UE or a responding device and LBT is successfully performed.

In what follows, a method for setting a priority to LBT for each operator and/or RAT will be described.

[Proposed method #1] Method for setting a priority of channel access within a given frame structure by configuring LBT parameters such as a CCA threshold value, the length of an observation slot, and CWS differently for each operator or Radio Access Technology (RAT).

As one example, in the case of two different operators A and B, a probability of successful execution of LBT may be configured differently for each frame by giving high priority to the operator A for odd-numbered frames from consecutive periodic frames and giving high priority to the operator B for even-numbered frames from the consecutive periodic frames.

More specifically, a method for giving priority may be implemented by configuring a CCA threshold value, the length of an observation slot, and Contention Window Size (CWS) differently for each operator/RAT.

As one example, when it is desired to give a higher probability of accessing a channel to operator A than operator B at an odd-numbered fixed frame period, the CCA threshold value PA of the operator A may be configured to be higher than the CCA threshold value PB of the operator B. Then, when the energy value PM measured over an observation slot within the odd-numbered fixed frame period is such that PB<PM<PA, operator B determines that the channel is occupied since an energy value higher than the operator B's CCA threshold value is measured while operator A may take the measurement as successful LBT and start transmission.

However, the proposed method above may be applicable in a situation in which a fixed frame period is synchronized between devices through GPS or the like and thus, the devices are set to the absolute time.

In what follows, a method for configuring an SSB transmission position and period considering a frame period will be described.

[Proposed method #2] A method for configuring a transmission period and a frame period of an SSB to have a divisor relationship and transmitting the SSB by placing the SSB at the front of the frame; and a method for transmitting RACH by a UE (or a responding device) within a COT that a base station (or an initiating device) has obtained within a frame through LBT.

Since an SSB is in a fixed order and has to be transmitted periodically, it may be advantageous in terms of resource utilization to configure the SSB to be transmitted at the beginning of a frame period. As one example, if an SSB is configured to be placed in the middle of the frame period, a waste of resources may occur such that even when there is no data to be transmitted at a specific frame period, only for the purpose of transmitting the SSB, a reservation signal has to be transmitted up to the transmission position of the SSB at the corresponding frame period after execution of LBT.

To solve the problem above, if the frame period is configured to be a divisor of the SSB transmission period, resources may be utilized efficiently. As one example, when the SSB transmission period is 20 ms and the frame period is 8 ms, there occur cases in which the SSB has to be transmitted in the middle of a frame; therefore, if the frame period is set to 10 ms, which is a divisor of the SSB transmission period, the SSB may be transmitted periodically at the beginning of a frame.

Characteristically, the corresponding SSB transmission period may be a transmission period configured for the use of neighboring cell (and/or serving cell) measurement. Also, the corresponding method may be applied not only for SSB transmission but also for a downlink signal (for example, CSI-RS for measurement) configured to be used for measurement (for example, RRM and/or RLM and/or beam management) and transmitted periodically, and/or a broadcast downlink control/data channel (for example, system information or paging).

Furthermore, RACH transmission may be performed within the Channel Occupancy Time (COT) obtained by a base station or an initiating UE/initiating device after successful execution of LBT. As one example, when the base station or the initiating device succeeds in LBT at the N-th frame, data transmission may be performed within the COT, and an uplink (UL) grant (or cell-specific DCI or UE-group common DCI) may be transmitted to a UE or a responding device so that RACH may be transmitted by sharing the remaining COT.

Figure 11:
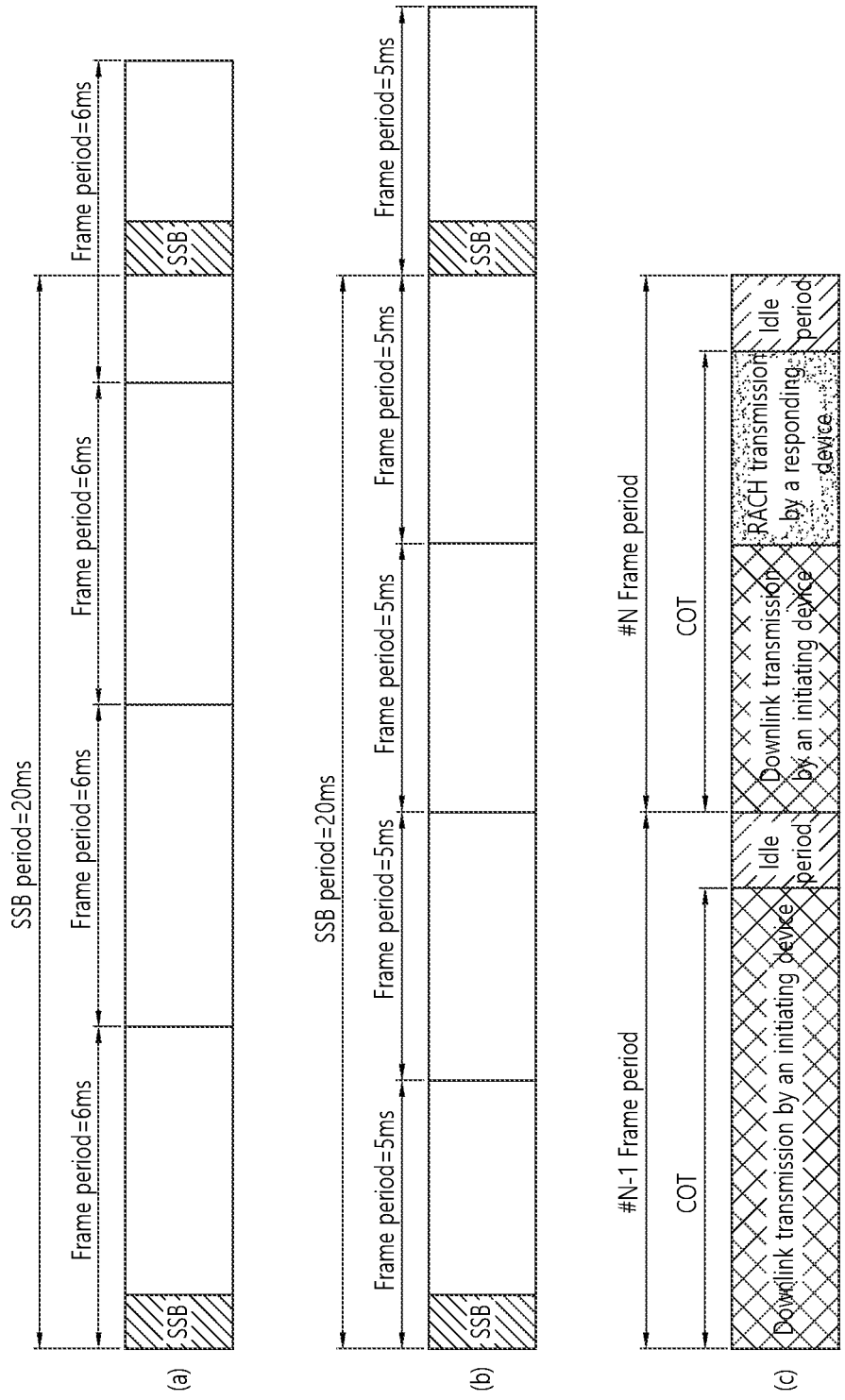
FIG. 11 illustrates one example of SSB transmission position according to a frame period when an SSB period is 10 ms.

FIG. 11 illustrates one example of SSB transmission position according to a frame period when an SSB period is 10 ms. More specifically, FIG. 11(*a*) shows a case in which the frame period is configured to be 6 ms and does not establish a divisor relationship with the SSB period, and FIG. 11(*b*) shows a case in which the frame period is configured to be 6 ms and establishes a divisor relationship with the SSB period. Also, FIG. 11(*c*) shows a case in which, after a base station performs LBT on an observation slot of the (N−1)-th frame period, the base station transmits RACH within the remaining COT after downlink transmission within the COT of the N-th frame period.

As shown in FIG. 11(*a*), when the frame period does not establish a divisor relationship with the SSB transmission period, there occur cases in which the SSB is placed in the middle of the frame period, but as shown in FIG. 11(*b*), when the frame period forms a divisor relationship with the SSB transmission period, the SSB may always be transmitted at the beginning of the frame period.

Meanwhile, as shown in FIG. 11(*b*), an SSB has to be transmitted at the beginning of the frame period. In other words, even when the frame period forms a divisor relationship with the SSB transmission period, if the start position of SSB transmission is in the middle of the frame period rather than the beginning of the frame period, the SSB may always be transmitted in the middle of the frame period. In this case, as described above, a waste of resources may occur such that even when there is no data to be transmitted at a specific frame period, only for the purpose of transmitting the SSB, a reservation signal has to be transmitted up to the transmission position of the SSB at the corresponding frame period after execution of LBT.

FIG. 11(*c*) illustrates an example in which downlink transmission of an initiating device and uplink transmission of a responding device are performed in one COT. As one example, when the initiating device succeeds in LBT within the (N−1)-th frame period (more specifically, over an observation slot within an idle period included in the frame period), the initiating device obtains COT within the N-th frame period. At this time, the initiating device may perform downlink transmission to the responding device.

Figure 12:
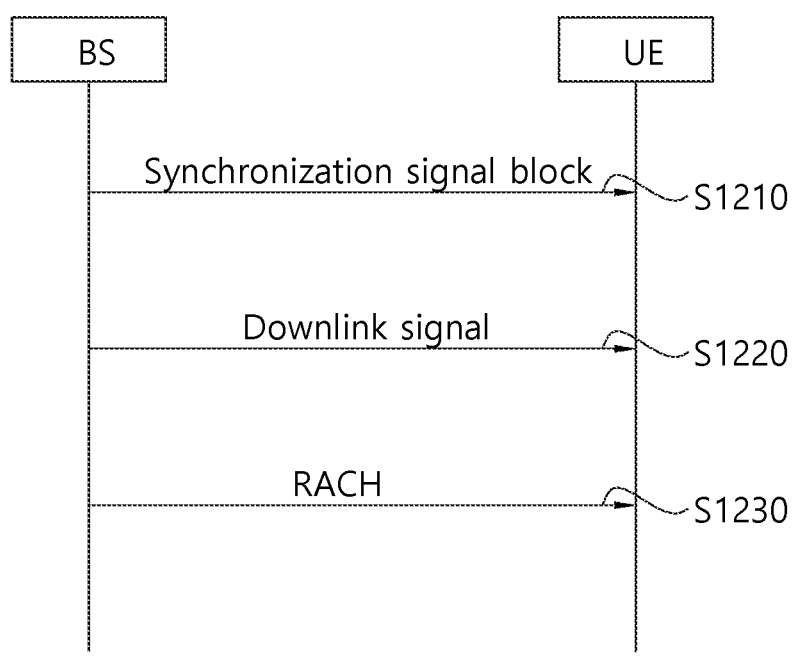
FIG. 12 is a flow diagram illustrating a method for transmitting a RACH by a UE according to one embodiment of the present disclosure.

FIG. 12 is a flow diagram illustrating a method for transmitting a RACH by a UE according to one embodiment of the present disclosure.

According to FIG. 12, a base station transmits a Synchronization Signal Block (SSB) to a UE S1210. Here, the SSB is transmitted periodically on every N-th Fixed Frame Period (FFP). Here, the N is an integer larger than or equal to 1. Here, a transmission start position of the SSB is a first time resource included in every N-th FFP. Here, the first time resource may be a first slot or symbol constituting the FFP.

Afterwards, the base station transmits a downlink signal to the UE S1220. Here, the downlink signal may be transmitted in one or more FFPs.

Afterwards, the UE performs RACH transmission to the base station after completing reception of the downlink signal S1230.

Figure 13:
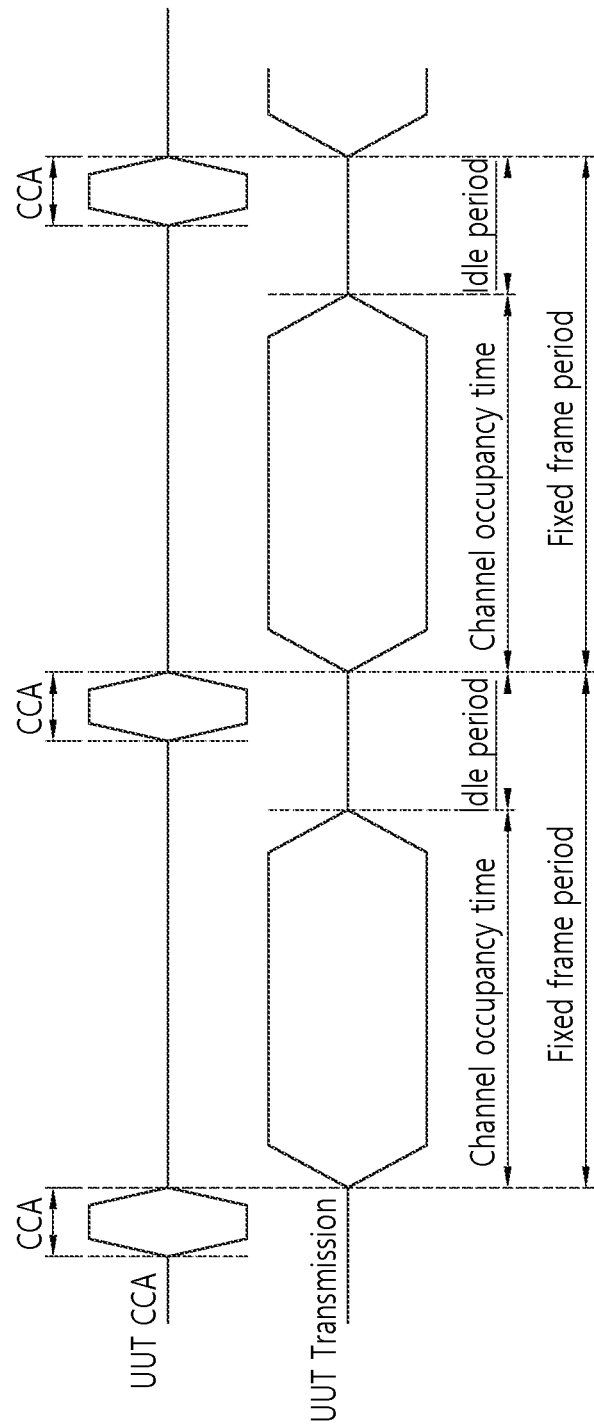
FIG. 13 illustrates one example of a fixed frame period.

FIG. 13 illustrates one example of a fixed frame period.

The structure of a fixed frame period that a communication device configures for a different communication device according to the present disclosure may be the same as shown in FIG. 13. As one example, the fixed frame period of FIG. 12 that a base station configures for a UE may be the same as shown in FIG. 13.

According to FIG. 13, a structure is shown, where a fixed frame period consisting of a Channel Occupancy Time (COT) occupying a predetermined time period and an idle period is repeated periodically. CCA is performed on an observation slot within the idle period. In FIG. 13, when CCA is performed on an observation slot within the idle period of the N-th fixed frame period and no other RLAN transmission is present on the operating channel, namely, when the energy value measured over the observation slot is smaller than a CCA threshold value, transmission may be started in the COT within the (N+1)-th fixed frame period.

Figure 14:
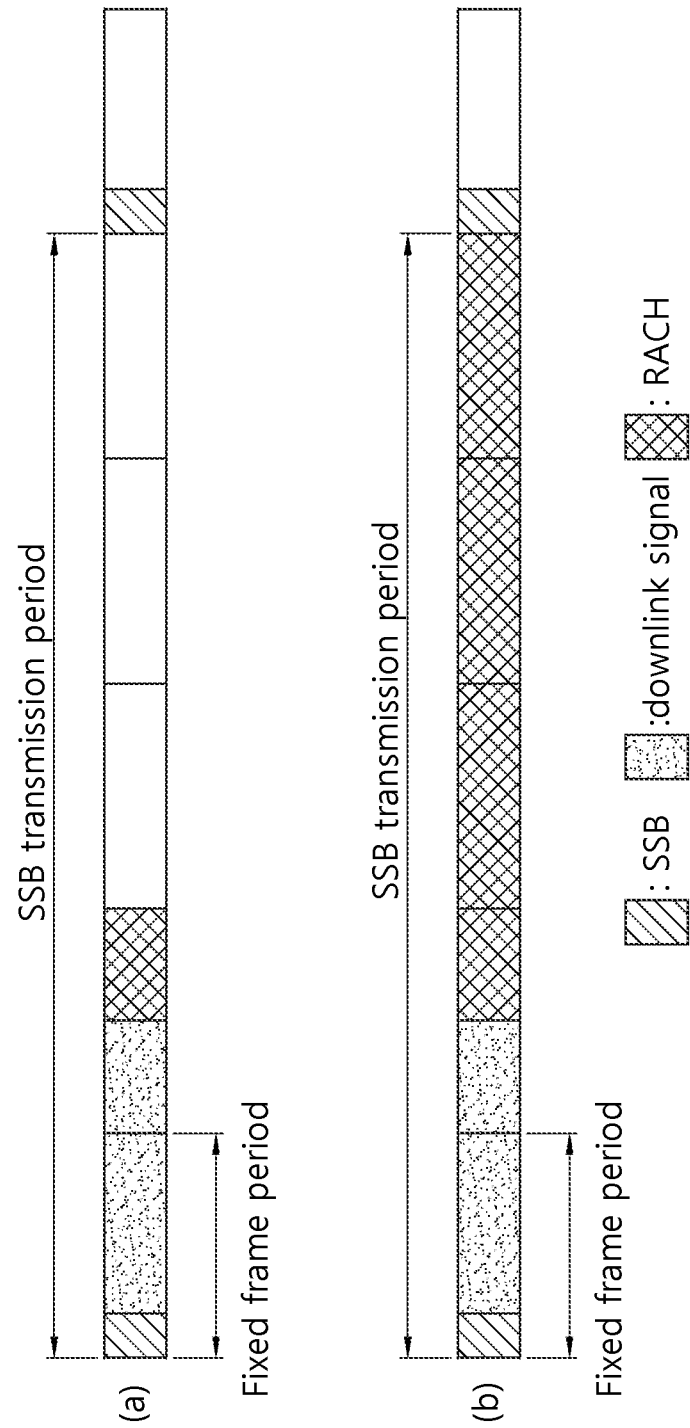
FIG. 14 illustrates examples to which a method for transmitting a RACH by a UE is applied according to one embodiment of the present disclosure.

FIG. 14 illustrates examples to which a method for transmitting a RACH by a UE is applied according to one embodiment of the present disclosure. More specifically, FIG. 14 assumes that the SSB transmission period is composed of 5 fixed frame periods. However, the present disclosure is not limited to the assumption.

According to FIGS. 14(*a*) and (*b*), a base station transmits an SSB to a UE periodically. Here, in the second fixed frame period in which transmission of a downlink signal by the base station is ended, the UE performs RACH transmission to the base station.

Here, according to FIG. 14(*a*), the UE is allowed to perform RACH transmission only in the second fixed frame period in which transmission of a downlink signal by the base station is ended. Over the third fixed frame period to the fifth fixed frame period, the base station or the UE may perform signal transmission separately.

According to FIG. 14(*b*), the UE may perform RACH transmission during the period spanning the second fixed frame period in which transmission of a downlink signal by the base station is ended to the fixed frame period before the next SSB transmission is performed.

Although not shown in FIG. 14, the RACH transmission may also be performed only when an uplink grant is included in the downlink signal. Here, the UE may perform the RACH transmission after receiving the uplink grant.

Furthermore, although not shown in FIG. 14, when FIG. 13 is considered, each of the SSB transmission, downlink signal transmission, and RACH transmission may be performed only during the channel occupancy time within a fixed frame period.

In what follows, a device to which the present disclosure may be applied will be described.

Figure 15:
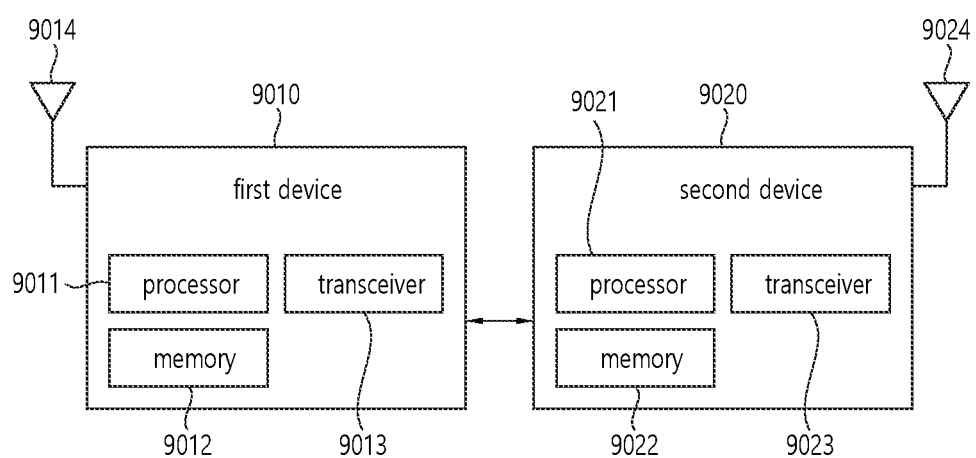
FIG. 15 illustrates a wireless communication device according to one embodiment of the present disclosure.

FIG. 15 illustrates a wireless communication device according to one embodiment of the present disclosure.

Referring to FIG. 15, a wireless communication device may comprise a first device 9010 and a second device 9020.

The first device 9010 may be a base station, a network node, a transmit UE, a receive UE, a wireless device, a wireless communication device, a vehicle, a vehicle with an autonomous navigation function, a connected car, an Unmanned Aerial Vehicle (UAV), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a fintech device (or financial device), a security device, a weather/environment device, a device related to 5G services or a device related to the fields of the 4th industrial revolution.

The second device 9020 may be a base station, a network node, a transmit UE, a receive UE, a wireless device, a wireless communication device, a vehicle, a vehicle with an autonomous navigation function, a connected car, an Unmanned Aerial Vehicle (UAV), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a fintech device (or financial device), a security device, a weather/environment device, a device related to 5G services or a device related to the fields of the 4th industrial revolution.

For example, a UE may include a mobile phone, a smart phone, a laptop computer, a digital broadcast terminal, a Personal Digital Assistant (PDA), a Portable Multimedia Player (PMP), a navigation terminal, a slate PC, a tablet PC, an ultrabook, and a wearable device (for example, a smart watch, a smart glass, or a Head Mounted Display (HMD)). The HMD may be a display device worn on the head. For example, the HMD may be used to implement VR, AR, or MR.

For example, a drone may be an unmanned flying vehicle whose flight is controlled by a wireless control signal. For example, a VR device may include a device implementing objects or background of a virtual world. For example, an AR device may include a device that implements an augmented world by connecting objects or background of the real world to the objects or background of a virtual world. For example, an MR device may include a device that implements a mixed world by merging objects and background of the real world with the objects or background of a virtual world. For example, a hologram device may include a device that implements 360-degree stereoscopic images by recording and reproducing stereoscopic information based on interference of light generated when two laser lights meet, which is called holography. For example, a public safety device may include an image relay device or an imaging device worn on the user's body. For example, an MTC device and an IoT device may be a device that does not require direct intervention or manipulation of a human. For example, MTC devices and IoT devices may include a smart meter, a vending machine, a thermometer, a smart light bulb, a door lock, or various types of sensors. For example, a medical device may be a device used for diagnosis, treatment, alleviation, prescription, or prevention of illness. For example, a medical device may be a device used to diagnose, treat, alleviate or correct injury or disorder. For example, a medical device may be a device used to examine, replace or modify a structure or a function. For example, a medical device may be device used to controlling pregnancy. For example, a medical device may include a device for treatment, a device for surgery, a device for (extracorporeal) diagnosis, a hearing aid or a device for medical procedure. For example, a security device may be a device installed to prevent a possible danger and maintain safety. For example, a security device may include a camera, CCTV, a recorder or a blackbox. For example, a fintech device may be a device that provides financial services such as mobile payment. For example, a fintech device may include a payment device or a Point Of Sales (POS) device. For example, a weather/environment device may include a device that monitors or predicts weather/environment.

The first device 9010 may include at least one or more processors such as the processor 9011, at least one or more memories such as the memory 9012, and at least one or more transceivers such as the transceiver 9013. The processor 9011 may perform the functions, procedures and/or methods described above. The processor 9011 may perform one or more protocols. For example, the processor 9011 may perform one or more layers of a wireless interface protocol. The memory 9012 may be connected to the processor 9011 and store various types of information and/or commands. The transceiver 9013 may be connected to the processor 9011 and controlled to transmit and receive a wireless signal.

The second device 9020 may include at least one or more processors such as the processor 9021, at least one or more memories such as the memory 9022, and at least one or more transceivers such as the transceiver 9023. The processor 9021 may perform the functions, procedures and/or methods described above. The processor 9021 may perform one or more protocols. For example, the processor 9021 may perform one or more layers of a wireless interface protocol. The memory 9022 may be connected to the processor 9021 and store various types of information and/or commands. The transceiver 9023 may be connected to the processor 9021 and controlled to transmit and receive a wireless signal.

The memory 9012 and/or the memory 9022 may be connected to the processor 9011 and/or the processor 9021 inside or outside of the respective processors or may be connected to another processor through various technologies such as wired or wireless connection.

The first device 9010 and/or the second device 9020 may have one or more antennas. For example, the antenna 9014 and/or the antenna 9024 may be configured to transmit and receive a wireless signal.

Figure 16:
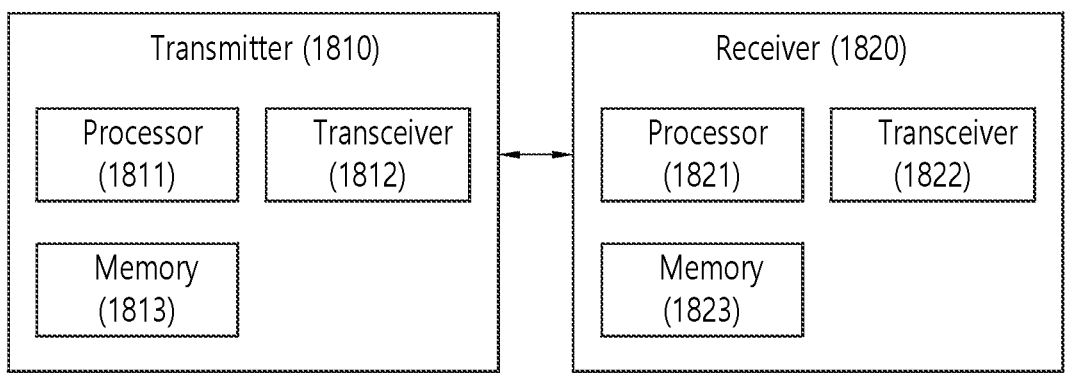
FIG. 16 is a block diagram showing components of a transmission device 1810 and a reception device 1820 which perform the present disclosure.

FIG. 16 is a block diagram showing components of a transmission device 1810 and a reception device 1820 which perform the present disclosure. Herein, each of the transmission device and the reception device may be a BS or a UE.

The transmission device 1810 and the reception device 1820 may respectively include transceivers 1812 and 1822 capable of transmitting or receiving radio signals carrying information and/or data, signals, messages, and the like, memories 1813 and 1823 storing various types of information related to communication in a wireless communication system, and processors 1811 and 1821 connected to components such as the transceivers 1812 and 1822 and the memories 1813 and 1823 and configured to control the memories 1813 and 1823 and/or the transceivers 1812 and 1822 such that the corresponding devices perform at least one of the aforementioned embodiments of the present disclosure. Herein, a transmitter/receiver may be called a transceiver.

The memories 1813 and 1823 may store programs for processing and control of the processors 1811 and 1821 and temporarily store input/output information. The memories 1813 and 1823 may be used as buffers.

The processors 1811 and 1821 generally control overall operations of various modules in the transmission device and the reception device. Particularly, the processors 1811 and 1821 may execute various control functions for performing the present disclosure. The processors 1811 and 1821 may also be called controllers, microcontrollers, microprocessors, microcomputers, and the like. The processors 1811 and 1821 may be implemented by hardware, firmware, software or a combination thereof. When the present disclosure is implemented using hardware, ASICs (application specific integrated circuits), DSPs (digital signal processors), DSPDs (digital signal processing devices), PLDs (programmable logic devices), FPGAs (field programmable gate arrays), or the like configured to perform the present disclosure may be included in the processors 1811 and 1821. Meanwhile, when the present disclosure is implemented using firmware or software, firmware or software may be configured to include modules, procedures, functions, or the like which perform functions or operations of the present disclosure, and the firmware or software configured to perform the present disclosure may be included in the processors 1811 and 1821 or stored in the memories 1813 and 1823 and driven by the processors 1811 and 1821.

The processor 1811 of the transmission device 1810 may perform predetermined coding and modulation on a signal and/or data which will be transmitted to the outside and then transmit the coded and modulated signal or data to the transceiver 1812. For example, the processor 1811 may generate a codeword by performing demultiplexing, channel coding, scrambling, and modulation on a data string to be transmitted. The codeword may include information equivalent to transport blocks that are data blocks provided by a MAC layer. One transport block (TB) may be coded into one codeword. Each codeword may be transmitted to the reception device through one or more layers. For frequency up-conversion, the transceiver 1812 may include an oscillator. The transceiver 1812 may include one or a plurality of transmission antennas.

A signal processing procedure of the reception device 1820 may be reverse to the signal processing procedure of the transmission device 1810. The transceiver 1822 of the reception device 1820 may receive radio signals transmitted from the transmission device 1810 under the control of the processor 1821. The transceiver 1822 may include one or a plurality of reception antennas. The transceiver 1822 may restore each signal received through the reception antenna to a baseband signal by performing frequency down-conversion. The transceiver 1822 may include an oscillator for frequency down-conversion. The processor 1821 may restore data intended to be transmitted by the transmission device 1810 by performing decoding and demodulation on radio signals received through the reception antenna.

The transceivers 1812 and 1822 may include one or a plurality of antennas. The antennas may serve to transmit signals processed by the transceivers 1812 and 1822 to the outside or receive external radio signals and transmit the radio signals to the transceivers 1812 and 1822 according to an embodiment under the control of the processors 1811 and 1821. The antennas may also be called antenna ports. Each antenna may correspond to one physical antenna or may be configured by a combination of two or more physical antennas. A signal transmitted from each antenna cannot be decomposed any more by the reception device 1820. A reference signal (RS) transmitted in association with an antenna defines the antenna from a perspective of the reception device 1820 and enables the reception device 1820 to perform channel estimation for the antenna irrespective of whether a channel is a single radio channel from a physical antenna or a composite channel from a plurality of physical antenna elements including the antenna. That is, an antenna may be defined such that a channel carrying symbols on the antenna can be derived from a channel carrying other symbols on the same antenna. A transceiver which supports a multi-input multi-output (MIMO) function for transmitting/receiving data using a plurality of antennas may be connected to two or more antennas.

Figure 17:
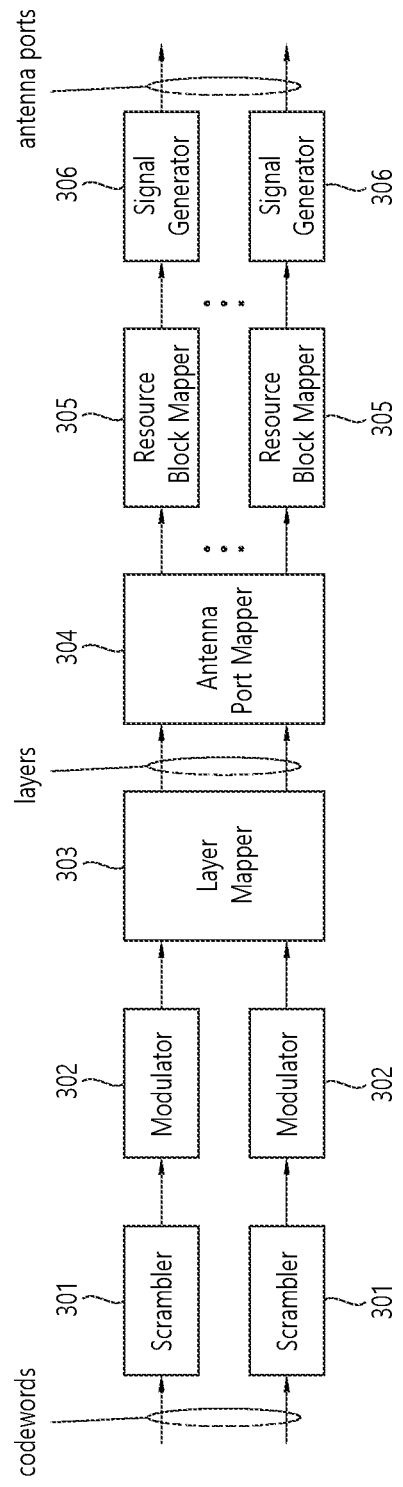
FIG. 17 shows an example of a signal processing module structure in the transmission device 1810.

FIG. 17 shows an example of a signal processing module structure in the transmission device 1810. Herein, signal processing may be performed by a processor of a BS/UE such as the processors 1811 and 1821 of FIG. 16.

Referring to FIG. 17, the transmission device 1810 in the UE or the BS may include a scrambler 301, a modulator 302, a layer mapper 303, an antenna port mapper 304, a resource block mapper 305 and a signal generator 306.

The transmission device 1810 may transmit one or more codewords. Coded bits in each codeword are scrambled by the scrambler 301 and transmitted on a physical channel. A codeword may also be referred to as a data string and may be equivalent to a transport block that is a data block provided by a MAC layer.

The scrambled bits are modulated into complex-valued modulation symbols by the modulator 302. The modulator 302 may modulate the scrambled bits according to a modulation scheme and arrange the scrambled bits as complex-valued symbols representing positions on a signal constellation. The modulation scheme is not limited, and m-phase shift keying (m-PSK) or m-quadrature amplitude modulation (m-QAM) may be used to module the coded data. The modulator may also be referred to as a modulation mapper.

The complex-valued modulation symbols may be mapped to one or more transport layers by the layer mapper 303. The complex-valued modulation symbols on the layers may be mapped by the antenna port mapper 304 for transmission on antenna ports.

The resource block mapper 305 may map complex-valued modulation symbols for respective antenna ports to appropriate resource elements in a virtual resource block allocated for transmission. The resource block mapper may map the virtual resource block to a physical resource block according to an appropriate mapping scheme. The resource block mapper 305 may allocate the complex-valued modulation symbols for the respective antenna ports to appropriate subcarriers and multiplex the same according to a user.

The signal generator 306 may modulate the complex-valued modulation symbols for the respective antenna ports, that is, antenna-specific symbols according to a specific modulation scheme, for example, orthogonal frequency division multiplexing (OFDM) to generate a complex-valued time domain OFDM symbol signal. The signal generator may perform inverse fast Fourier transform (IFFT) on the antenna-specific symbols, and a cyclic prefix (CP) may be inserted into time domain symbols on which IFFT has been performed. OFDM symbols are subjected to digital-to-analog conversion, frequency up-conversion, and the like and transmitted to a reception device through respective transmission antennas. The signal generator may include an IFFT module, a CP insertion device, a digital-to-analog converter (DAC), a frequency uplink converter, and the like.

Figure 18:
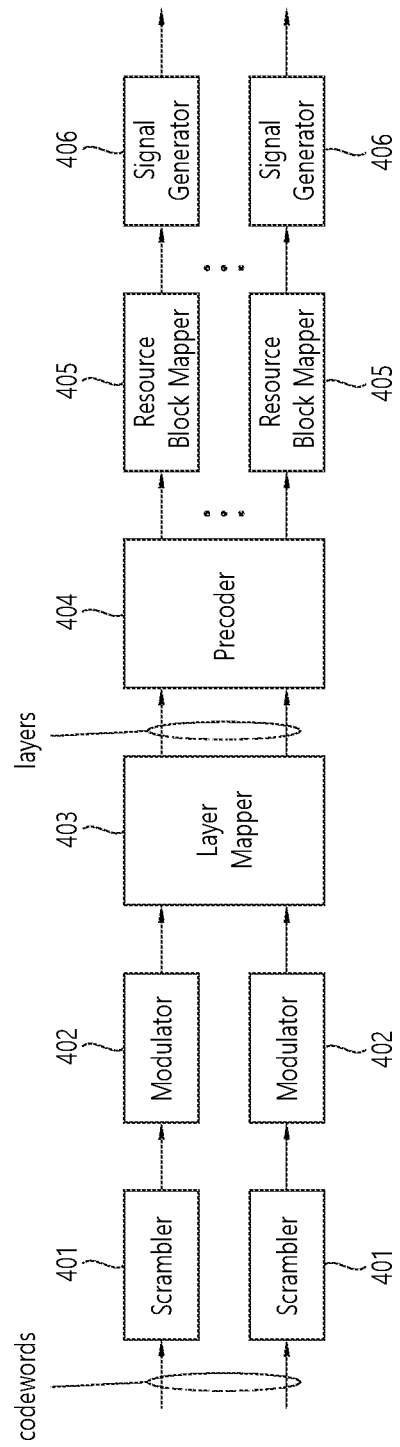
FIG. 18 shows another example of the signal processing module structure in the transmission device 1810.

FIG. 18 shows another example of the signal processing module structure in the transmission device 1810. Herein, signal processing may be performed by a processor of a UE/BS such as the processors 1811 and 1821 of FIG. 16.

Referring to FIG. 18, the transmission device 1810 in the UE or the BS may include a scrambler 401, a modulator 402, a layer mapper 403, a precoder 404, a resource block mapper 405, and a signal generator 406.

For a codeword, the transmission device 1810 may scramble coded bits in the codeword through the scrambler 401 and then transmit the scrambled bits through a physical channel.

The scrambled bits are modulated into complex-valued modulation symbols by the modulator 402. The modulator may modulate the scrambled bits according to a predetermined modulation scheme and arrange the scrambled bits as complex-valued symbols representing positions on a signal constellation. The modulation scheme is not limited, and pi/2-binary phase shift keying (pi/2-BPSK), m-phase shift keying (m-PSK) or m-quadrature amplitude modulation (m-QAM) may be used to modulate the coded data.

The complex-valued modulation symbols may be mapped to one or more transport layers by the layer mapper 403.

The complex-valued modulation symbols on the layers may be precoded by the precoder 404 for transmission through antenna ports. Herein, the precoder may perform precoding after performing transform precoding for the complex-valued modulation symbols. Alternatively, the precoder may perform precoding without performing transform precoding. The precoder 404 may process the complex-valued modulation symbols according to MIMO using multiple transmission antennas to output antenna-specific symbols and distribute the antenna-specific symbols to the corresponding resource block mapper 405. An output z of the precoder 404 may be obtained by multiplying output y of the layer mapper 403 by an N×M precoding matrix W. Herein, N is the number of antenna ports, and M is the number of layers.

The resource block mapper 405 maps complex-valued modulation symbols for respective antenna ports to appropriate resource elements in a virtual resource block allocated for transmission.

The resource block mapper 405 may allocate the complex-valued modulation symbols to appropriate subcarriers and multiplex the same according to a user.

The signal generator 406 may modulate the complex-valued modulation symbols according to a specific modulation scheme, for example, OFDM to generate a complex-valued time domain OFDM symbol signal. The signal generator 406 may perform inverse fast Fourier transform (IFFT) on the antenna-specific symbols, and a cyclic prefix (CP) may be inserted into time domain symbols on which IFFT has been performed. OFDM symbols are subjected to digital-to-analog conversion, frequency up-conversion, and the like and transmitted to a reception device through respective transmission antennas. The signal generator 406 may include an IFFT module, a CP insertion device, a digital-to-analog converter (DAC), a frequency uplink converter, and the like.

A signal processing procedure of a reception device 1820 may be reverse to the signal processing procedure of the transmission device. Specifically, the processor 1821 of the transmission device 10 decodes and modulates a radio signal received from the outside through antenna ports of the transceiver 1822. The reception device 1820 may include multiple reception antennas, and signals received through the reception antennas are restored into baseband signals and then restored into data strings intended to be transmitted by the transmission device 10 through multiplexing and MIMO demodulation. The reception device 1820 may include a signal restoration device for restoring a received signal into a baseband signal, a multiplexer for combining and multiplexing received signals, and a channel demodulator for demodulating multiplexed signal strings into corresponding codewords. The signal restoration device, the multiplexer, and the channel demodulator may be configured as an integrated module for executing functions thereof or as independent modules. More specifically, the signal restoration device may include an analog-to-digital converter (ADC) for converting an analog signal into a digital signal, a CP remover for removing a CP from the digital signal, an FFT module for applying fast Fourier transform (FFT) to the CP-removed signal to output frequency domain symbols, and a resource element demapper/equalizer for restoring the frequency domain symbols into antenna-specific symbols. The antenna-specific symbols are restored into a transport layer through the multiplexer, and the transport layer is restored into a codeword intended to be transmitted by the transmission device through the channel demodulator.

Figure 19:
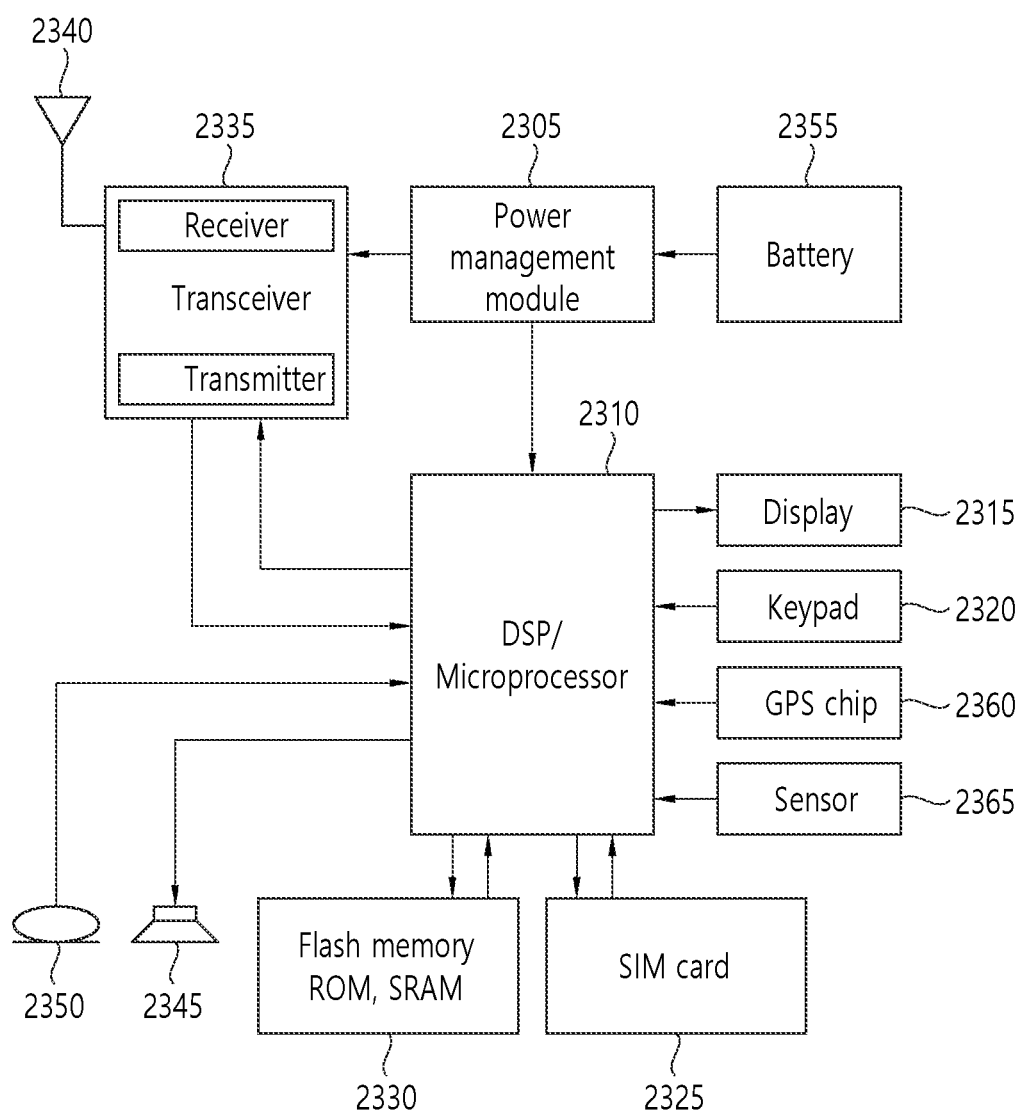
FIG. 19 shows an example of a wireless communication device according to an implementation example of the present disclosure.

FIG. 19 shows an example of a wireless communication device according to an implementation example of the present disclosure.

Referring to FIG. 19, the wireless communication device, for example, a UE may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345, and a microphone 2350. A plurality of antennas and a plurality of processors may be provided.

The processor 2310 may implement functions, procedures, and methods described in the present specification. The processor 2310 of FIG. 19 may be the processors 1811 and 1821 of FIG. 16.

The memory 2330 is connected to the processor 2310 and stores information related to operation of the processor. The memory may be located inside or outside the processor and connected to the processor through various techniques such as wired connection and wireless connection. The memory 2330 of FIG. 19 may be the memories 1813 and 1823 of FIG. 16.

A user may input various types of information such as telephone numbers using various techniques such as pressing buttons of the keypad 2320 and activating sound using the microphone 2350. The processor 2310 may receive user information, process the user information, and execute an appropriate function such as making a call using an input telephone number. In some scenarios, data may be retrieved from the SIM card 2325 or the memory 2330 in order to execute an appropriate function. In some scenarios, the processor 2310 may display various types of information and data on the display 2315 for user convenience.

The transceiver 2335 is connected to the processor 2310 and transmit/receive radio signals such as radio frequency (RF) signals. The processor may control the transceiver in order to start communication or transmit radio signals including various types of information or data such as audio communication data. The transceiver includes a transmitter and a receiver for transmitting and receiving radio signals. The antenna 2340 may facilitate transmission and reception of radio signals. In some implementation examples, when the transceiver receives a radio signal, the transceiver may forward and convert the signal into a baseband frequency for processing by the processor. The processed signal may be processed through various techniques such as conversion into audible or readable information such that it is output through the speaker 2345. The transceiver of FIG. 19 may be the transceivers 1812 and 1822 of FIG. 16.

Although not shown in FIG. 19, the UE may additionally include various components such as a camera and a universal serial bus (USB) port. For example, the camera may be connected to the processor 2310.

FIG. 19 is only one implementation example for the UE, and the implementation example is not limited thereto. It is not necessary for the UE to include all components of FIG. 19. That is, some components, for example, the keypad 2320, the GSP chip 2360, the sensor 2365, and the SIM card may not be essential components, and in this case, they may not be included in the UE.

Figure 20:
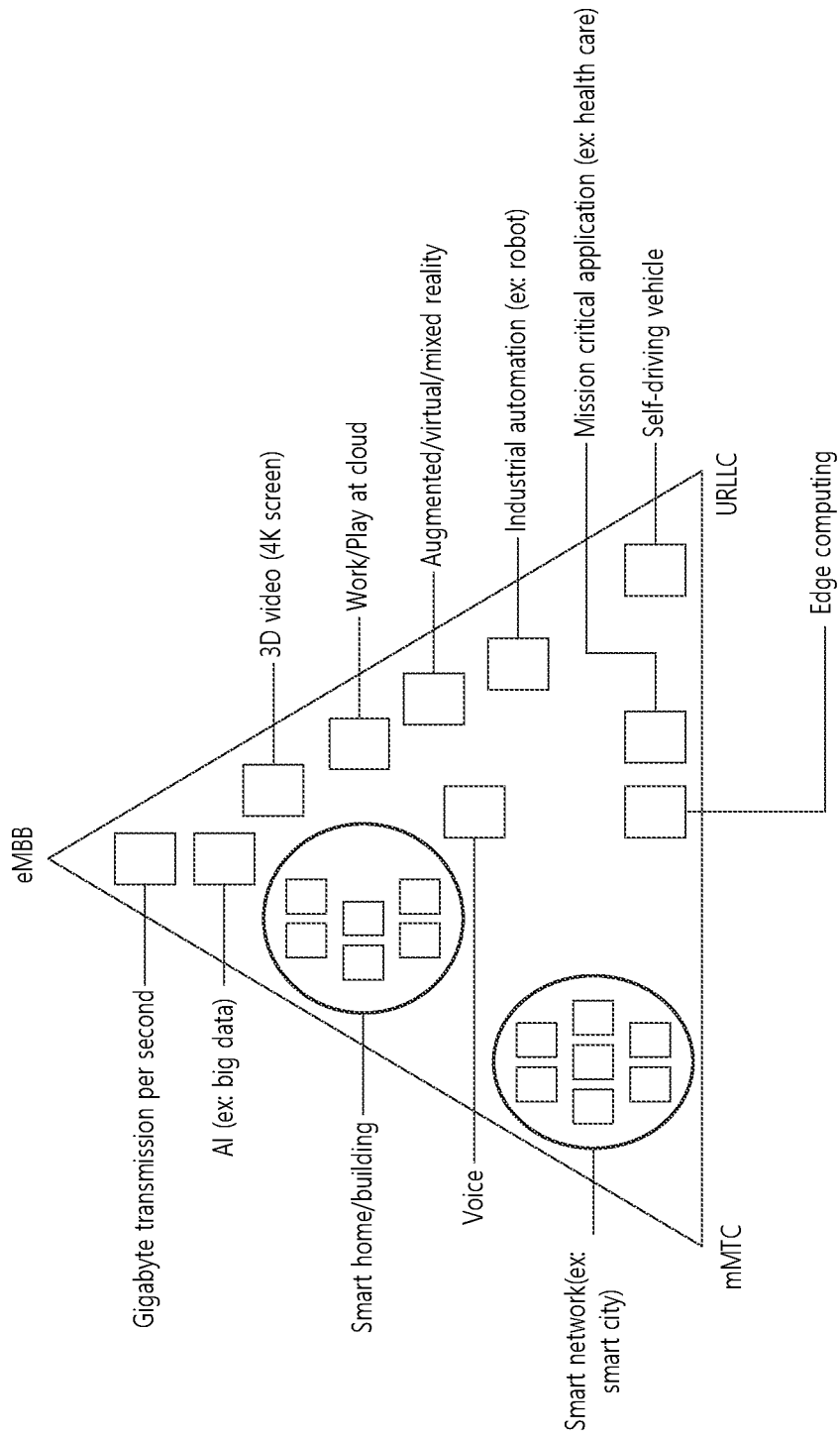
FIG. 20 shows examples of 5G usage scenarios to which the technical features of the present description can be applied.

FIG. 20 shows examples of 5G usage scenarios to which the technical features of the present description can be applied. The 5G usage scenarios shown in FIG. 20 are only exemplary, and the technical features of the present description can be applied to other 5G usage scenarios which are not shown in FIG. 20.

Referring to FIG. 20, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km$^2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 20 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 21:
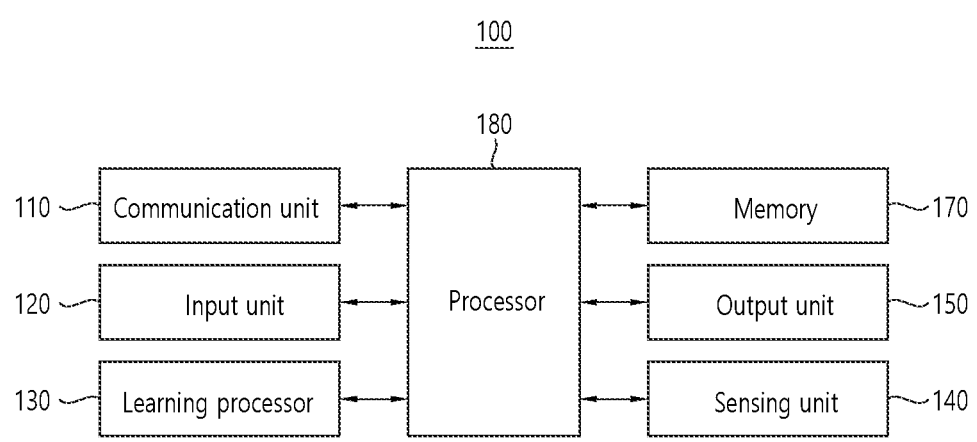
FIG. 21 shows an example of an AI device to which the technical features of the present disclosure can be applied.

FIG. 21 shows an example of an AI device to which the technical features of the present disclosure can be applied.

The AI device 100 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 21, the AI device 100 may include a communication part 110, an input part 120, a learning processor 130, a sensing part 140, an output part 150, a memory 170, and a processor 180.

The communication part 110 can transmit and/or receive data to and/or from external devices such as the AI devices 100a to 100e and the AI server 200 using wire and/or wireless communication technology. For example, the communication part 110 can transmit and/or receive sensor information, a user input, a learning model, and a control signal with external devices.

The communication technology used by the communication part 110 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 120 can acquire various kinds of data.

The input part 120 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information.

The input part 120 can acquire input data to be used when acquiring an output using learning data and a learning model for model learning. The input part 120 may obtain raw input data, in which case the processor 180 or the learning processor 130 may extract input features by preprocessing the input data.

The learning processor 130 may learn a model composed of an ANN using learning data. The learned ANN can be referred to as a learning model. The learning model can be used to infer result values for new input data rather than learning data, and the inferred values can be used as a basis for determining which actions to perform.

The learning processor 130 may perform AI processing together with the learning processor 240 of the AI server 200.

The learning processor 130 may include a memory integrated and/or implemented in the AI device 100. Alternatively, the learning processor 130 may be implemented using the memory 170, an external memory directly coupled to the AI device 100, and/or a memory maintained in an external device.

The sensing part 140 may acquire at least one of internal information of the AI device 100, environment information of the AI device 100, and/or the user information using various sensors.

The sensors included in the sensing part 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 150 may generate an output related to visual, auditory, tactile, etc.

The output part 150 may include a display unit for outputting visual information, a speaker for outputting auditory information, and/or a haptic module for outputting tactile information.

The memory 170 may store data that supports various functions of the AI device 100. For example, the memory 170 may store input data acquired by the input part 120, learning data, a learning model, a learning history, etc.

The processor 180 may determine at least one executable operation of the AI device 100 based on information determined and/or generated using a data analysis algorithm and/or a machine learning algorithm. The processor 180 may then control the components of the AI device 100 to perform the determined operation.

The processor 180 may request, retrieve, receive, and/or utilize data in the learning processor 130 and/or the memory 170, and may control the components of the AI device 100 to execute the predicted operation and/or the operation determined to be desirable among the at least one executable operation.

The processor 180 may generate a control signal for controlling the external device, and may transmit the generated control signal to the external device, when the external device needs to be linked to perform the determined operation.

The processor 180 may obtain the intention information for the user input and determine the user's requirements based on the obtained intention information.

The processor 180 may use at least one of a speech-to-text (STT) engine for converting speech input into a text string and/or a natural language processing (NLP) engine for acquiring intention information of a natural language, to obtain the intention information corresponding to the user input.

At least one of the STT engine and/or the NLP engine may be configured as an ANN, at least a part of which is learned according to a machine learning algorithm. At least one of the STT engine and/or the NLP engine may be learned by the learning processor 130 and/or learned by the learning processor 240 of the AI server 200, and/or learned by their distributed processing.

The processor 180 may collect history information including the operation contents of the AI device 100 and/or the user's feedback on the operation, etc. The processor 180 may store the collected history information in the memory 170 and/or the learning processor 130, and/or transmit to an external device such as the AI server 200. The collected history information can be used to update the learning model.

The processor 180 may control at least some of the components of AI device 100 to drive an application program stored in memory 170. Furthermore, the processor 180 may operate two or more of the components included in the AI device 100 in combination with each other for driving the application program.

Figure 22:
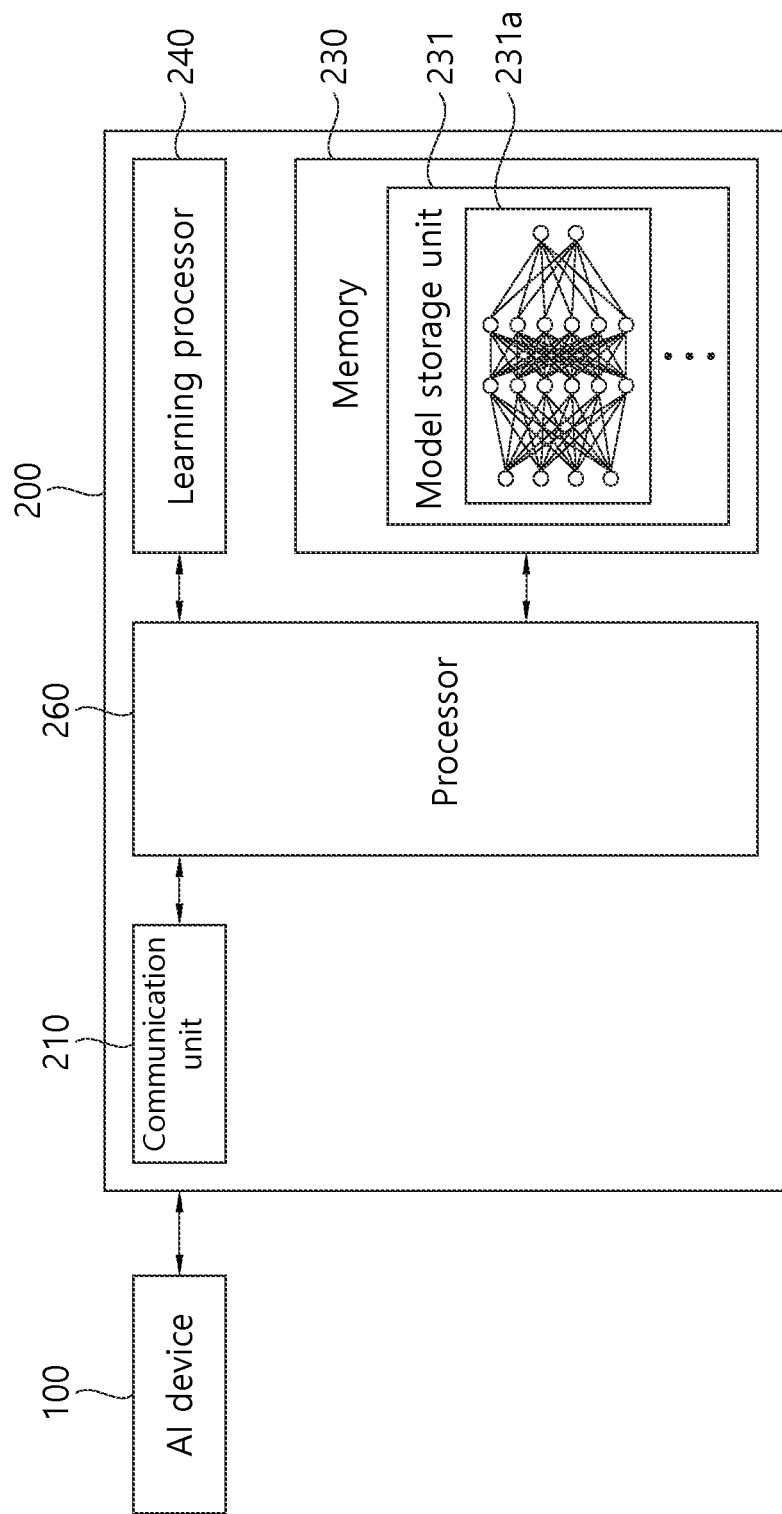
FIG. 22 illustrates an AI server 200 according to one embodiment of the present disclosure.

FIG. 22 illustrates an AI server 200 according to one embodiment of the present disclosure.

Referring to FIG. 22, the AI server 200 may refer to a device that trains an artificial neural network using a machine learning algorithm or using the trained artificial neural network. Here, the AI server 200 may be composed of a plurality of servers to perform distributed processing and defined as a 5G network. At this time, the AI server 200, being included as part of the AI device 100, may perform at least part of AI processing together.

The AI server 200 may include a communication unit 210, a memory 230, a learning processor 240, and a processor 260.

The communication unit 210 may transmit and receive data to and from an external device such as the AI device 100.

The memory 230 may include a model storing unit 231. The model storing unit 231 may store a model being trained through the learning processor 240 or a trained model (or an artificial neural network 231a).

The learning processor 240 may train the artificial neural network 231a using training data. A learning model may be used while being mounted on the AI server 200 of an artificial neural network or may be used by being mounted on an external device such as the AI device 100.

The learning model may be implemented by hardware, software or a combination of hardware and software. When the whole or part of the learning model is implemented by software, one or more instructions constituting the learning model may be stored in the memory 230.

The processor 260 may infer a resultant value with respect to new input data by using the learning model and generate a response or a control instruction based on the inferred resultant value.

Figure 23:
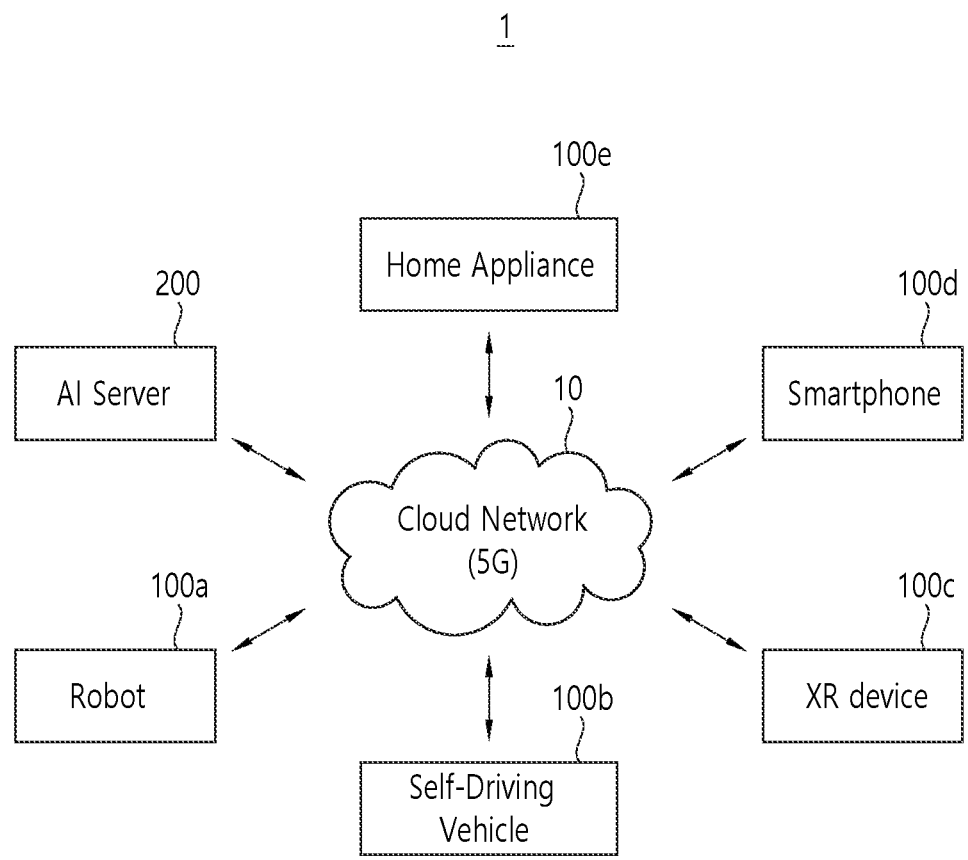
FIG. 23 shows an example of an AI system 1 to which the technical features of the present disclosure can be applied.

FIG. 23 shows an example of an AI system 1 to which the technical features of the present disclosure can be applied.

Referring to FIG. 23, in the AI system 1, at least one of an AI server 200, a robot 100a, an autonomous vehicle 100b, an XR device 100c, a smartphone 100d and/or a home appliance 100e is connected to a cloud network 10. The robot 100a, the autonomous vehicle 100b, the XR device 100c, the smartphone 100d, and/or the home appliance 100e to which the AI technology is applied may be referred to as AI devices 100a to 100e.

The cloud network 10 may refer to a network that forms part of a cloud computing infrastructure and/or resides in a cloud computing infrastructure. The cloud network 10 may be configured using a 3G network, a 4G or LTE network, and/or a 5G network.

That is, each of the devices 100a to 100e and 200 consisting the AI system 1 may be connected to each other through the cloud network 10. In particular, each of the devices 100a to 100e and 200 may communicate with each other through a base station, but may directly communicate with each other without using a base station.

The AI server 200 may include a server for performing AI processing and a server for performing operations on big data.

The AI server 200 is connected to at least one or more of AI devices constituting the AI system 1, i.e. the robot 100a, the autonomous vehicle 100b, the XR device 100c, the smartphone 100d and/or the home appliance 100e through the cloud network 10, and may assist at least some AI processing of the connected AI devices 100a to 100e.

The AI server 200 can learn the ANN according to the machine learning algorithm on behalf of the AI devices 100a to 100e, and can directly store the learning models and/or transmit them to the AI devices 100a to 100e.

The AI server 200 may receive the input data from the AI devices 100a to 100e, infer the result value with respect to the received input data using the learning model, generate a response and/or a control command based on the inferred result value, and transmit the generated data to the AI devices 100a to 100e.

Alternatively, the AI devices 100a to 100e may directly infer a result value for the input data using a learning model, and generate a response and/or a control command based on the inferred result value.

Various embodiments of the AI devices 100a to 100e to which the technical features of the present disclosure can be applied will be described. The AI devices 100a to 100e shown in FIG. 23 can be seen as specific embodiments of the AI device 100 shown in FIG. 21.

<AI+Robot>

The robot 100a may be implemented as a guide robot, a carrying robot, a cleaning robot, a wearable robot, an entertainment robot, a pet robot, an unmanned flying robot, etc., to which AI technology is applied.

The robot 100a may include a robot control module for controlling the operation, and the robot control module may refer to a software module and/or a chip implementing the software module.

The robot 100a may acquire the state information of the robot 100a using the sensor information acquired from various kinds of sensors and/or detect (recognize) the surrounding environment and/or the object, and/or generate map data, and/or determine a travel route and/or a travel plan, and/or determine a response to user interaction, and/or determine an operation.

The robot 100a can use the sensor information acquired from at least one sensor among the LIDAR, the radar, and/or the camera to determine the travel route and/or the travel plan.

The robot 100a can perform the above-described operations using a learning model composed of at least one ANN. For example, the robot 100a can recognize the surrounding environment and/or the object using the learning model, and can determine the operation using the recognized surrounding information and/or the object information. The learning model may be learned directly from the robot 100a and/or learned from an external device such as the AI server 200.

The robot 100a can directly generate a result using the learning model and perform an operation. The robot 100a may transmit sensor information to an external device such as the AI server 200 and may receive the generated result and perform an operation.

The robot 100a may determine the travel route and/or the travel plan using at least one of the map data, the object information detected from the sensor information and/or the object information acquired from the external device, and drive the robot 100a according to the determined travel route and/or travel plan by controlling the driving unit.

The map data may include object identification information on various objects arranged in a space in which the robot 100a moves. For example, the map data may include object identification information on fixed objects such as walls and doors, and/or on movable objects such as pots and desks. The object identification information may include a name, a type, a distance, and/or a position, etc.

The robot 100a can perform the operation and/or run by controlling the driving unit based on the control/interaction of the user. The robot 100*a* may acquire the intention information of the interaction due to the user's operation and/or voice utterance, determine the response based on the acquired intention information, and perform the operation.

<AI+Autonomous-Driving/Self-Driving>

The autonomous vehicle 100*b* may be implemented as a mobile robot, a vehicle, an unmanned aerial vehicle, etc., to which AI technology is applied.

The autonomous vehicle 100*b* may include an autonomous driving control module for controlling the autonomous driving function, and the autonomous driving control module may refer to a software module and/or a chip implementing the software module. The autonomous driving control module may be included in the autonomous vehicle 100*b* as a component of the autonomous vehicle 100*b*, but may be connected to the outside of the autonomous vehicle 100*b* with separate hardware.

The autonomous vehicle 100*b* may acquire the state information of the autonomous vehicle 100*b* using the sensor information acquired from various kinds of sensors and/or detect (recognize) the surrounding environment and/or the object, and/or generate map data, and/or determine a travel route and/or a travel plan, and/or determine an operation.

Like the robot 100*a*, the autonomous vehicle 100*b* can use the sensor information acquired from at least one sensor among the LIDAR, the radar, and/or the camera to determine the travel route and/or the travel plan.

In particular, the autonomous vehicle 100*b* can recognize an environment and/or an object for an area in which the field of view is obscured and/or over a certain distance by receiving sensor information from external devices, and/or receive the recognized information directly from external devices.

The autonomous vehicle 100*b* can perform the above-described operations using a learning model composed of at least one ANN. For example, the autonomous vehicle 100*b* can recognize the surrounding environment and/or the object using the learning model, and can determine the travel route using the recognized surrounding information and/or the object information. The learning model may be learned directly from the autonomous vehicle 100*b* and/or learned from an external device such as the AI server 200.

The autonomous vehicle 100*b* can directly generate a result using the learning model and perform an operation. The autonomous vehicle 100*b* may transmit sensor information to an external device such as the AI server 200 and may receive the generated result and perform an operation.

The autonomous vehicle 100*b* may determine the travel route and/or the travel plan using at least one of the map data, the object information detected from the sensor information and/or the object information acquired from the external device, and drive the autonomous vehicle 100*b* according to the determined travel route and/or travel plan by controlling the driving unit.

The map data may include object identification information on various objects arranged in a space (e.g. road) in which the autonomous vehicle 100*b* moves. For example, the map data may include object identification information on fixed objects such as street lamps, rocks, and buildings, and/or on movable objects such as vehicles and pedestrians. The object identification information may include a name, a type, a distance, and/or a position, etc.

The autonomous vehicle 100*b* can perform the operation and/or run by controlling the driving unit based on the control/interaction of the user. The autonomous vehicle 100*b* may acquire the intention information of the interaction due to the user's operation and/or voice utterance, determine the response based on the acquired intention information, and perform the operation.

<AI+XR>

The XR device 100*c* may be implemented as a HMD, a HUD, a TV, a mobile phone, a smartphone, a computer, a wearable device, a home appliance, a digital signage, a vehicle, a fixed robot, a mobile robot, etc., to which AI technology is applied.

The XR device 100*c* analyzes the three-dimensional point cloud data and/or image data acquired from various sensors and/or from an external device to generate position data and/or attribute data for the three-dimensional points, thereby obtaining information about the surrounding space and/or the real object, and outputting the rendered XR object. For example, the XR device 100*c* may output an XR object, which includes the additional information about the recognized object, by corresponding to the recognized object.

The XR device 100*c* can perform the above-described operations using a learning model composed of at least one ANN. For example, the XR device 100*c* can recognize a real object from three-dimensional point cloud data and/or image data using the learning model, and can provide information corresponding to the recognized real object. The learning model may be learned directly from the XR device 100*c* and/or learned from an external device such as the AI server 200.

The XR device 100*c* can directly generate a result using the learning model and perform an operation. The XR device 100*c* may transmit sensor information to an external device such as the AI server 200 and may receive the generated result and perform an operation.

<AI+Robot+Autonomous-Driving/Self-Driving>

The robot 100*a* may be implemented as a guide robot, a carrying robot, a cleaning robot, a wearable robot, an entertainment robot, a pet robot, an unmanned flying robot, etc., to which AI technology and autonomous-driving technology are applied.

The robot 100*a* to which the AI technology and the autonomous-driving technology are applied may mean the robot 100*a* having the autonomous-driving function itself and/or the robot 100*a* interacting with the autonomous vehicle 100*b*.

The robot 100*a* having an autonomous-driving function can collectively refer to devices that move by themselves in accordance with a given travel route and/or move by determining the traveling route by themselves without user's control.

The robot 100*a* having the autonomous-driving function and the autonomous vehicle 100*b* can use a common sensing method to determine at least one of the travel route and/or the travel plan. For example, the robot 100*a* having the autonomous-driving function and the autonomous vehicle 100*b* can determine at least one of the travel route and/or the travel plan using the information sensed through the LIDAR, the radar, and/or the camera.

The robot 100*a* interacting with the autonomous vehicle 100*b* may exist separately from the autonomous vehicle 100*b*. The robot 100*a* interacting with the autonomous vehicle 100*b* may be associated with the autonomous-driving function inside and/or outside the autonomous vehicle 100*b*, and/or may perform an operation associated with the user aboard the autonomous vehicle 100*b*.

The robot 100*a* interacting with the autonomous vehicle 100*b* may acquire the sensor information on behalf of the autonomous vehicle 100*b* and provide it to the autonomous vehicle 100b. The robot 100a interacting with the autonomous vehicle 100b may obtain the sensor information and generate the environment information and/or the object information to provide the autonomous vehicle 100b, thereby controlling and/or assisting the autonomous-driving function of the autonomous vehicle 100b.

The robot 100a interacting with the autonomous vehicle 100b may monitor the user boarding the autonomous vehicle 100b and/or may control the functions of the autonomous vehicle 100b through interaction with the user. For example, when it is determined that the driver is in a drowsy state, the robot 100a may activate the autonomous-driving function of the autonomous vehicle 100b and/or assist the control of the driving unit of the autonomous vehicle 100b. The function of the autonomous vehicle 100b controlled by the robot 100a may include not only an autonomous-driving function but also a function provided by a navigation system and/or an audio system provided in the autonomous vehicle 100b.

The robot 100a interacting with the autonomous vehicle 100b may provide information and/or assist the function to the autonomous vehicle 100b outside the autonomous vehicle 100b. For example, the robot 100a, such as a smart traffic light, may provide traffic information including signal information, etc., to the autonomous vehicle 100b. The robot 100a, such as an automatic electric charger of an electric vehicle, may interact with the autonomous vehicle 100b to connect the electric charger to the charging hole automatically.

<AI+Robot+XR>

The robot 100a may be implemented as a guide robot, a carrying robot, a cleaning robot, a wearable robot, an entertainment robot, a pet robot, an unmanned flying robot, a drone, etc., to which AI technology and XR technology are applied.

The robot 100a to which the XR technology is applied may refer to a robot that is subject to control/interaction in the XR image. In this case, the robot 100a may be separated from the XR device 100c and can be associated with each other.

When the robot 100a that is the subject to control/interaction in the XR image acquires the sensor information from the sensors including the camera, the robot 100a and/or the XR device 100c may generate an XR image based on the sensor information and the XR device 100c can output the generated XR image. The robot 100a can operate based on a control signal and/or a user's interaction input through the XR device 100c.

For example, the user can acknowledge the XR image corresponding to the viewpoint of the robot 100a remotely linked through the external device such as the XR device 100c, and can adjust the autonomous travel path of the robot 100a, control operation and/or driving, or check the information of neighboring objects, through interaction.

<AI+Autonomous-Driving/Self-Driving+XR>

The autonomous vehicle 100b may be implemented as a mobile robot, a vehicle, an unmanned aerial vehicle, etc., to which AI technology and XR technology are applied.

The autonomous driving vehicle 100b to which the XR technology is applied may mean an autonomous vehicle having means for providing an XR image and/or an autonomous vehicle that is subject to control/interaction in the XR image. Particularly, the autonomous vehicle 100b that is subject to control/interaction in the XR image may be separated from the XR device 100c and can be associated with each other.

The autonomous vehicle 100b having the means for providing the XR image can acquire the sensor information from the sensors including the camera and output the generated XR image based on the acquired sensor information. For example, the autonomous vehicle 100b may include an HUD to output an XR image, thereby providing a passenger with a real object and/or an XR object corresponding to an object in the screen.

At this time, when the XR object is output to the HUD, at least a part of the XR object may be output so as to overlap with the actual object that the passenger's gaze is directed to. On the other hand, when the XR object is output to the display provided in the autonomous vehicle 100b, at least a part of the XR object may be output so as to overlap with the object in the screen. For example, the autonomous vehicle 100b can output XR objects corresponding to objects such as a lane, another vehicle, a traffic light, a traffic sign, a two-wheeled vehicle, a pedestrian, a building, etc.

When the autonomous vehicle 100b that is the subject to control/interaction in the XR image acquires the sensor information from the sensors including the camera, the autonomous vehicle 100b and/or the XR device 100c may generate an XR image based on the sensor information and the XR device 100c can output the generated XR image. The autonomous vehicle 100b can operate based on a control signal and/or a user's interaction input through the XR device 100c.

In the following, a physical channel and a signal transmission procedure will be described.

Figure 24:
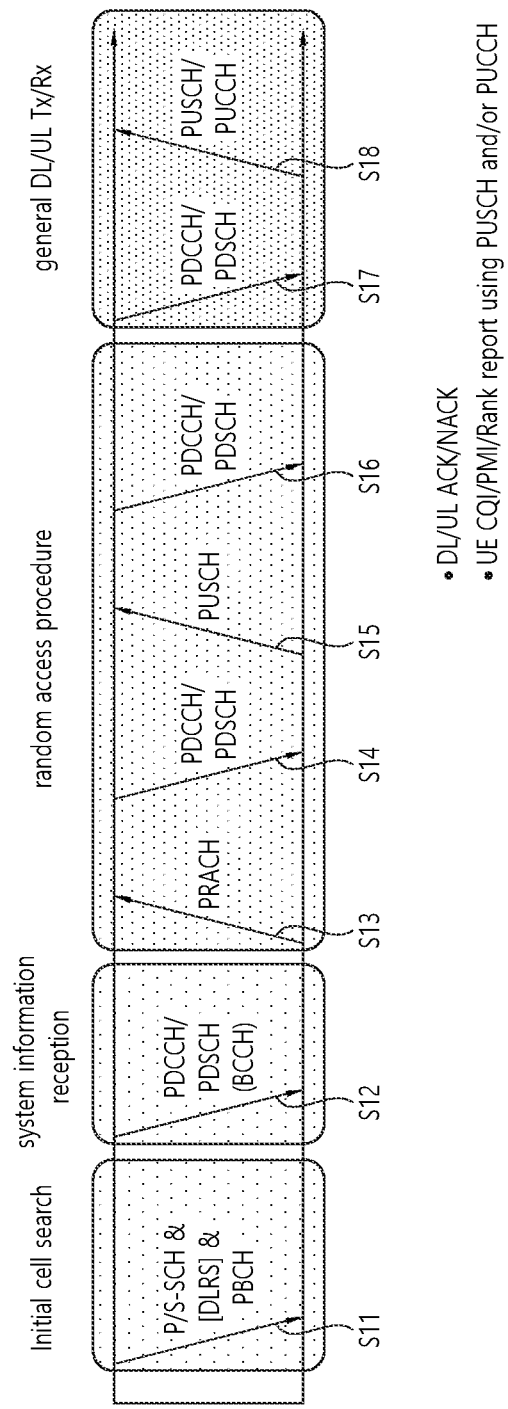
FIG. 24 illustrates physical channels used in the 3GPP system and a general signal transmission procedure.

FIG. 24 illustrates physical channels used in the 3GPP system and a general signal transmission procedure.

In a wireless communication system, a UE receives information from a base station through downlink (DL) transmission, and the UE transmits information to the base station trough uplink (UL) transmission. The information transmitted and received between the base station and the UE includes data and various types of control information, and depending on the type/use of information transmitted and received between the base station and the UE, various physical channels are employed.

The UE, which is powered on again from a state in which the power is off or which newly enters a cell, may perform an initial cell search operation such as synchronizing with the base station S11. To this end, the UE may receive a Primary Synchronization Channel (PSCH) and a Secondary Synchronization Channel (SSCH) from the base station to synchronize with the base station and obtain information such as cell identity (ID). Also, the UE may receive a Physical Broadcast Channel (PBCH) from the base station to obtain broadcast information within the cell. Also, the UE may receive a Downlink Reference Signal (DL RS) in the initial cell search phase to check the downlink channel status.

After completing the initial cell search operation, the UE may receive a Physical Downlink Control Channel (PDCCH) and a Physical Downlink Shared Channel (PDSCH) corresponding thereto to obtain more specific system information S12.

Afterwards, the UE may perform a random access procedure to complete access to the base station S13-S16. More specifically, the UE may transmit an preamble through a Physical Random Access Channel (PRACH) S13 and receive a Random Access Response (RAR) to the preamble through the PDSCH corresponding to the PDCCH S14. Next, the UE may transmit a Physical Uplink Shared Channel (PUSCH) using scheduling information within the RAR S15 and perform a contention resolution procedure on the PDCCH and the PDSCH corresponding thereto S16.

The UE which has performed the procedure above may perform PDCCH/PDSCH reception S17 and PUSCH/Physical Uplink Control Channel (PUCCH) transmission S18 as a general uplink/downlink signal transmission procedure. The control information transmitted to the base station by the UE is called Uplink Control Information (UCI). The UCI may include Hybrid Automatic Repeat and reQuest Acknowledgement/Negative-ACK (HARQ ACK/NACK), a Scheduling Request (SR), and Channel State Information (CSI). The CSI includes a Channel Quality Indicator (CQI), a Precoding Matrix Indicator (PMI), and a Rank Indication (RI). The UCI is usually transmitted through the PUCCH but may be transmitted through the PUSCH when both of control information and data have to be transmitted simultaneously. Also, according to the request/instruction from a network, the UE may transmit the UCI aperiodically through the PUSCH.

In what follows, cell search will be described.

Cell search is a procedure in which a UE obtains time and frequency synchronization to a cell and detects a physical layer cell ID of the cell. To perform the cell search, the UE receives a Primary Synchronization Signal (PSS) and a Secondary Synchronization Signal (SSS).

The cell search procedure for a UE may be summarized as shown in Table 8.

TABLE 8

| | Signal type | Operation |
|---|---|---|
| Step 1 | PSS | Obtain SS/PBCH block (SSB) symbol timing Search cell ID group for cell ID (3 hypothesis) |
| Step 2 | SSS | Detect cell ID group (336 hypothesis) |
| Step 3 | PBCH DMRS | SSB index and half-frame index (detect slot and frame boundary) |
| Step 4 | PBCH | Time information (80 ms, SFN, SSB index, HF) Configure RMSI CORESET/search space |
| Step 5 | PDCCH and PDSCH | Cell access information |

Figure 25:
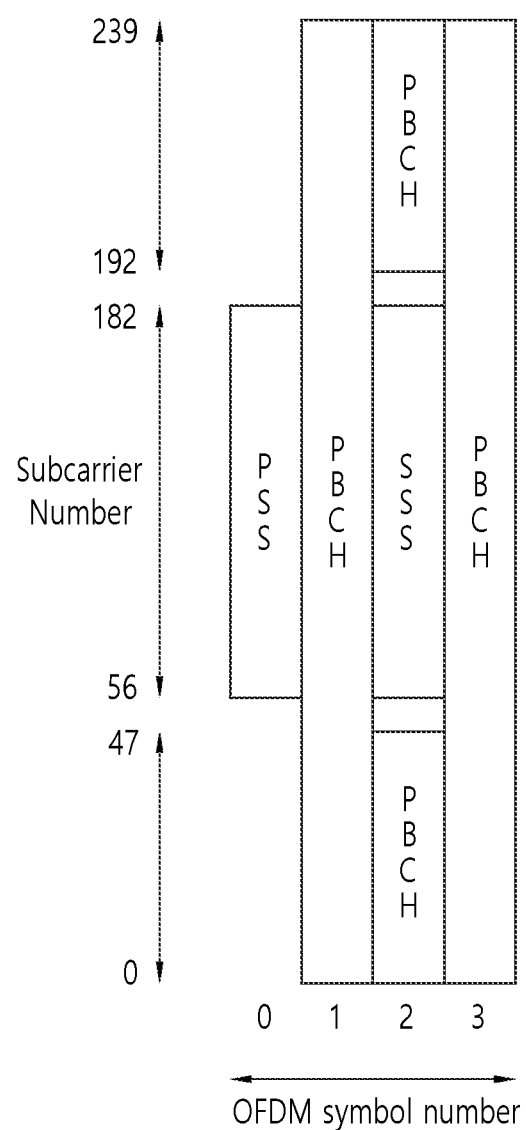
FIG. 25 illustrates a synchronization signal and PBCH (SS/PBCH) block.

FIG. 25 illustrates a synchronization signal and PBCH (SS/PBCH) block.

According to FIG. 25, an SS/PBCH block consists of a PSS and an SSS, each of which occupies one symbol and 127 subcarriers, and PBCHs occupying 3 OFDM symbols and 240 subcarriers, where one of the PBCHs has an unused region left for the SSS in the middle thereof. The periodicity of the SS/PBCH block may be configured by the network, and the time position at which the SS/PBCH block may be transmitted is determined by subcarrier spacing.

Polar coding is used for the PBCH. Unless the network configures a UE to assume a different subcarrier spacing, the UE may assume a band-specific subcarrier spacing for the SS/PBCH block.

PBCH symbols carry their frequency-multiplexed DMRS. QPSK modulation is used for the PBCH.

1008 unique physical layer cell IDs are given by Eq. 1 below.

$$N_{ID}^{cell}=3N_{ID}^{(1)}+N_{ID}^{(2)} \quad \text{[Eq. 1]}$$

In Eq. 5, $N_{ID}^{(1)} \in \{0, 1, \ldots, 335\}$ and $N_{ID}^{(2)} \in \{0, 1, 2\}$.

Meanwhile, a PSS sequence $d_{PSS}(n)$ for PSS is defined by Eq. 2 as follows.

$$d_{PSS}(n)=1-2x(m)$$

$$m=(n+43N_{ID}^{(2)}) \mod 127 \quad \text{[Eq. 2]}$$

$0 \le n < 127$

In Eq. 2, $(x(i+7)=(x(i+4)+x(0) \mod 2$ and $[x(6) \ x(5) \ x(4) \ x(3) \ x(2) \ x(1) \ x(0)] = [1 \ 1 \ 1 \ 0 \ 1 \ 1 \ 0]$.

The sequence may be mapped to the physical resources shown in FIG. 25.

Meanwhile, an SSS sequence $d_{SSS}(n)$ for SSS is defined by Eq. 3 as follows.

$$d_{SSS}(n) = [1 - 2x_0((n + m_0) \mod 127)][1 - 2x_1((n + m_1) \mod 127)] \quad \text{[Eq. 3]}$$

$$m_0 = 15 \left\lfloor \frac{N_{ID}^{(1)}}{112} \right\rfloor + 5N_{ID}^{(2)}$$

$$m_1 = N_{ID}^{(1)} \mod 112$$

$0 \le n < 127$

In Eq. 3, $x_0(i+7)=(x_0(i+4)+x_0(i)) \mod 2$, $x_1(i+7)=(x_1(i+1)+x_1(i)) \mod 2$, $[x_0(6) \ x_0(5) \ x_0(4) \ x_0(3) \ x_0(2) \ x_0(1) \ x_0(0)] = [0 \ 0 \ 0 \ 0 \ 0 \ 0 \ 1]$, and $[x_1(6) \ x_1(5) \ x_1(4) \ x_1(3) \ x_1(2) \ x_1(1) \ x_1(0)] = [0 \ 0 \ 0 \ 0 \ 0 \ 0 \ 1]$.

The sequence above may be mapped to the physical resources shown in FIG. 25.

For a half frame having SS/PBCH blocks, first symbol indexes for candidate SS/PBCH blocks may be determined by subcarrier spacing of the SS/PBCH blocks described later.

Case A—subcarrier spacing 15 kHz: The first symbols of candidate SS/PBCH blocks have an index of {2, 8}+14*n. For subcarrier frequencies below or equal to 3 GHz, n=0, 1. For subcarrier frequencies above 3 GHz and below or equal to 6 GHz, n=0, 1, 2, 3.

Case B—subcarrier spacing 30 kHz: The first symbols of candidate SS/PBCH blocks have an index of {4, 8, 16, 20}+28*n. For subcarrier frequencies below or equal to 3 GHz, n=0. For subcarrier frequencies above 3 GHz and below or equal to 6 GHz, n=0, 1.

Case C—subcarrier spacing 30 kHz: The first symbols of candidate SS/PBCH blocks have an index of {2, 8}+14*n. For subcarrier frequencies below or equal to 3 GHz, n=0, 1. For subcarrier frequencies above 3 GHz and below or equal to 6 GHz, n=0, 1, 2, 3.

Case D—subcarrier spacing 120 kHz: The first symbols of candidate SS/PBCH blocks have an index of {4, 8, 16, 20}+28*n. For subcarrier frequencies above 6 GHz, n=0, 1, 2, 3, 5, 6, 7, 8, 10, 11, 12, 13, 15, 16, 17, 18.

Case E—subcarrier spacing 240 kHz: The first symbols of candidate SS/PBCH blocks have an index of {8, 12, 16, 20, 32, 36, 40, 44}+56*n. For subcarrier frequencies above 6 GHz, n=0, 1, 2, 3, 5, 6, 7, 8.

The candidate SS/PBCH blocks within the half-block may be indexed on the time axis in an ascending order starting from 0 to L−1. From one-to-one mapping to the index of a DM-RS sequence transmitted within the PBCH, the UE has to determine 2 LSBs of the SS/PBCH block index for each half-frame when L=4 and 3 LSBs when L>4. When L=64, the UE has to determine 3 MSBs of the SS/PBCH block index for each half-frame according to the PBCH payload bits $\bar{a}_{\bar{A}+5}$, $\bar{a}_{\bar{A}+6}$, and $\bar{a}_{\bar{A}+7}$.

The indexes of SS/PBCH blocks in which the UE is unable to receive other signals or channels within REs overlapping the REs corresponding to the SS/PBCH blocks may be configured for the UE by the upper layer parameter 'SSB-transmitted-SIB1'. Also, the indexes of SS/PBCH blocks for each serving cell, in which the UE is unable to receive other signals or channels within REs overlapping the REs corresponding to the SS/PBCH blocks may be configured by the upper layer parameter 'SSB-transmitted'. Configuration by 'SSB-transmitted' may have a higher priority than configuration by 'SSB-transmitted-SIB1'. The UE may be configured with a periodicity of the half-frame for reception of SS/PBCH blocks for each serving cell by the upper layer parameter 'SSB-periodicityServingCell'. If the UE is not configured with a periodicity of the half-frame for reception of SS/PBCH blocks, the UE may assume a periodicity of the half-frame. The UE may assume that the periodicity is the same for all of SS/PBCH blocks within a serving cell.

Figure 26:
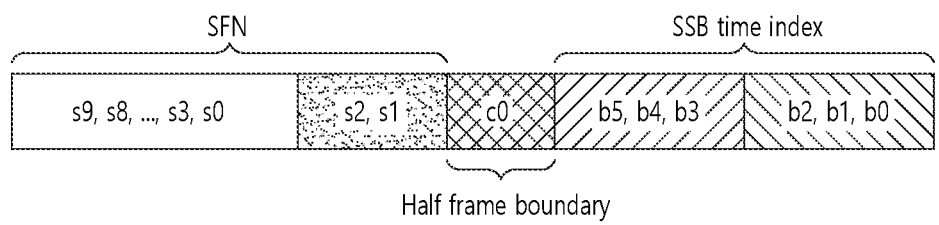
FIG. 26 illustrates a method for obtaining timing information by a UE.

FIG. 26 illustrates a method for obtaining timing information by a UE.

First, the UE may obtain 6-bit SFN information through MasterinformationBlock (MIB) received within PBCH. Also, the UE may obtain 4-bit SFN information within a PBCH transport block.

Secondly, the UE may obtain a 1-bit half-frame indicator as part of a PBCH payload. Below 3 GHz, the half-frame indicator may be signaled implicitly as part of a PBCH DMRS when $L_{max}=4$.

Lastly, the UE may obtain an SS/PBCH block index by the DMRS sequence and the PBCH payload. In other words, the UE may obtain 3-bit LSBs of the SS block index by the DMRS sequence during a period of 5 ms. Also, (above 6 GHz) 3-bit MSBs of timing information are carried explicitly within the PBCH payload.

In the initial cell selection step, the UE may assume that a half-frame having SS/PBCH blocks is generated with a periodicity of 2 frames. If an SS/PBCH block is detected, and $k_{SSB} \leq 23$ for FR1 and $k_{SSB} \leq 11$ for FR2, the UE determines that there exists a set of control resources for Type0-PDCCH common search space. If $k_{SSB} > 23$ for FR1 and $k_{SSB} > 11$ for FR2, the UE determines that a set of control resources for the Type0-PDCCH common search space does not exist.

For a serving cell to which no SS/PBCH block is transmitted, the UE obtains time and frequency synchronization to the serving cell based on the reception of SS/PBCH blocks on the PCell or PSCell of a cell group for the serving cell.

In what follows, acquisition of System Information (SI) is described.

The System Information (SI) is divided into MasterInformatoinBlock (MIB) and a plurality of SystemInformation-Blocks (SIBs), where The MIB is always transmitted on the BCH with a periodicity of 80 ms and repetitions made within 80 ms, and it includes parameters needed to acquire SystemInformationBlockType1 (SIB1) from the cell;

SIB1 is transmitted on the DL-SCH with a periodicity and repetitions. SIB1 includes information about availability and scheduling (for example, periodicity and SI-window size) of other SIBs. Also, SIB1 indicates whether they (namely, other SIBS) are provided via periodic broadcast basis or only on-demand basis. If other SIBs are provided on-demand, SIB1 includes information required for the UE to perform an SI request;

SIBs other than the SIB1 are carried by SystemInformation (SI) messages transmitted on the DL-SCH. Each SI message is transmitted within periodically occurring time domain windows (which are referred to as SI-windows);

For PSCell and SCells, RAN provides the required SI by dedicated signaling. Nevertheless, the UE has to acquire the MIB of the PSCell to get SFN timing (which may be different from MCG) of the SCG. When relevant SI for SCell is changed, RAN releases and adds the concerned SCell. For PSCell, SI may only be changed only through reconfiguration with Sync.

Figure 27:
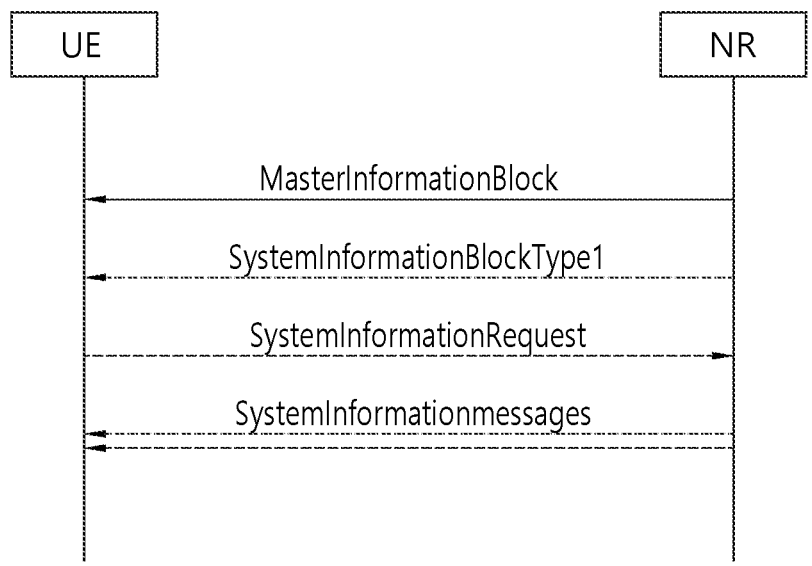
FIG. 27 illustrates one example of a system information acquisition procedure of a UE.

FIG. 27 illustrates one example of a system information acquisition procedure of a UE.

According to FIG. 27, the UE may receive MIB from the network and then may receive SIB 1. Afterwards, the UE may transmit a system information request to the network and receive a SystemInformation message from the network in response to the request.

The UE may apply the system information acquisition procedure to acquire Access Stratum (AS) and Non-Access Stratum (NAS) information.

The UE in RRC_IDLE and RRC_INACTIVE state has to ensure having a valid version of (at least) the MIB, SIB1, and SystemInformationBlockTypeX (depending on the support of a concerned RAT for UE controlled mobility).

The UE in the RRC_CONNECTED state has to ensure having a valid version of the MIB, SIB1, and SystemInformationBlockTypeX (depending on the mobility support for a concerned RAT).

The UE has to store relevant SI acquired from a currently camped/serving cell. A version of the SI that the UE has acquired and stored remains valid only for a certain time period. The UE may use such a stored version of the SI, for example, after cell re-selection, upon return from out of coverage or after SI change indication.

In what follows, Random Access (RA) will be described.

A random access procedure for a UE may be summarized as shown in Table 9.

TABLE 9

|  | Signal type | Operation/Acquired information |
| --- | --- | --- |
| Step 1 | PRACH preamble of uplink | Acquisition of initial beam<br>Random election of RA-preamble ID |
| Step 2 | Random access response on DL-SCH | Timing array information<br>RA-preamble ID<br>Initial uplink grant, temporary C-RNTI |
| Step 3 | Uplink transmission on UL-SCH | RRC connection request<br>UE identity |
| Step 4 | Contention resolution of downlink | C-RNTI on PDCCH for initial access<br>C-RNTI on PDCCH for UE in the RRC CONNECTED state |

Figure 28:
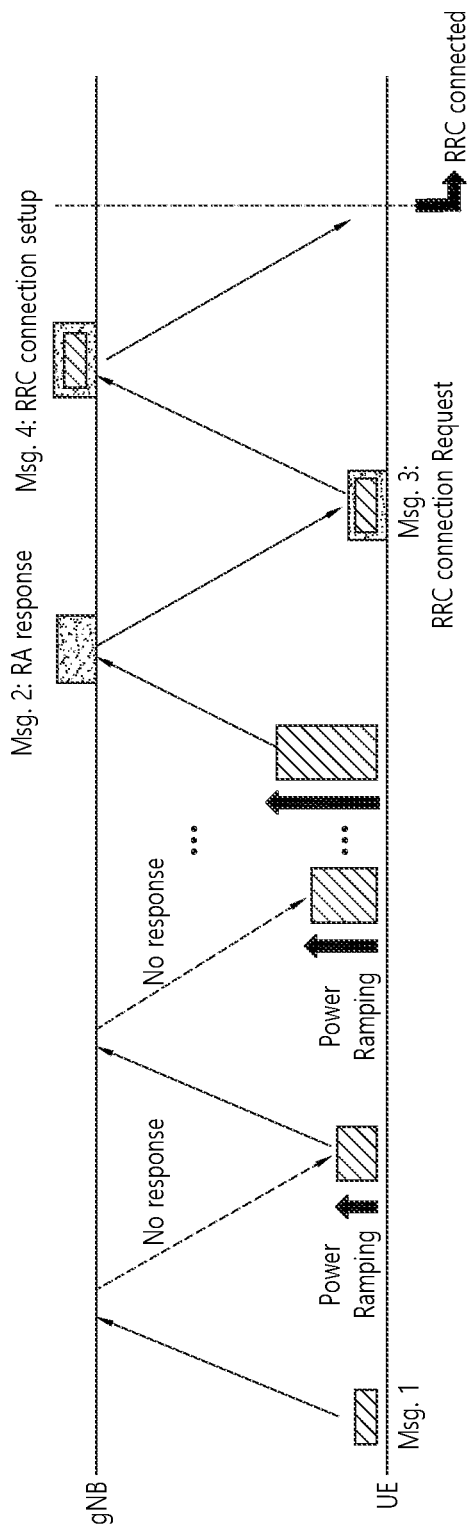
FIG. 28 illustrates a random access procedure.

FIG. 28 illustrates a random access procedure.

Referring to FIG. 28, first, a UE may transmit a PRACH preamble via uplink transmission as message 1 (Msg 1) of the random access procedure.

A random access preamble sequence having two different lengths may be supported. A long sequence of length 839 is applied to the subcarrier spacing of 1.25 kHz and 5 kHz, and a short sequence of length 139 is applied to the subcarrier spacing of 15, 30, 60, and 120 kHz. A long sequence supports an unrestricted set and a restricted set of type A and type B while a short sequence may support only the unrestricted set.

A plurality of RACH preambles may be defined by one or more RACH OFDM symbols, different Cyclic Prefix (CP), and guard time. Configuration of PRACH preamble to be used may be provided to the UE as system information.

When there is no response to Msg 1, the UE may re-transmit a PRACH preamble power-ramped within a specified number of times. The UE calculates PRACH transmission power for retransmission of the preamble based on the most recent estimated path loss and a power ramping counter. If the UE performs beam switching, the power ramping counter does not change.

Figure 29:
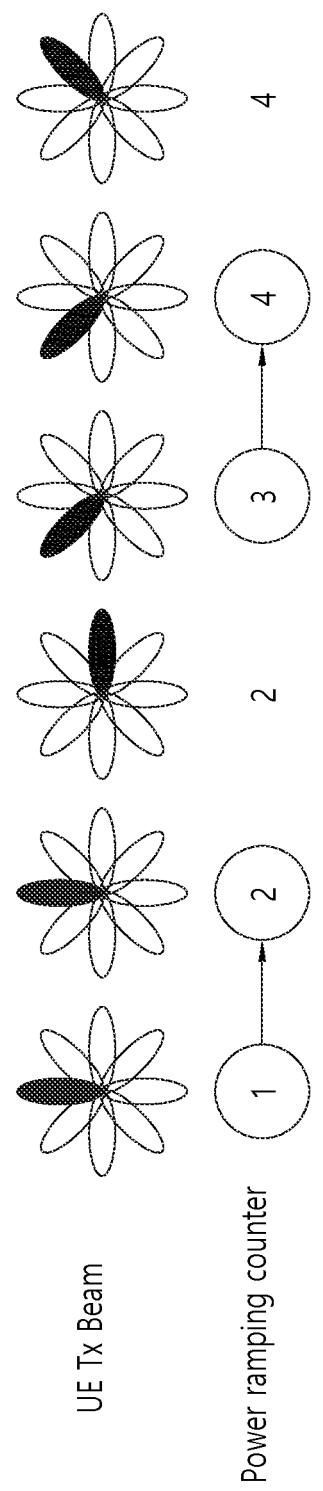
FIG. 29 illustrates a power ramping counter.

FIG. 29 illustrates a power ramping counter.

The UE may perform power ramping for retransmission of a random access preamble based on the power ramping counter. As described above, the power ramping counter does not change when the UE performs beam switching at the time of PRACH retransmission.

According to FIG. 29, when the UE retransmits a random access preamble for the same beam, such as when the power ramping counter increases from 1 to 2 and 3 to 4, the UE increases the power ramping counter by 1. However, when the beam is changed, the power ramping counter may not change at the time of PRACH retransmission.

Figure 30:
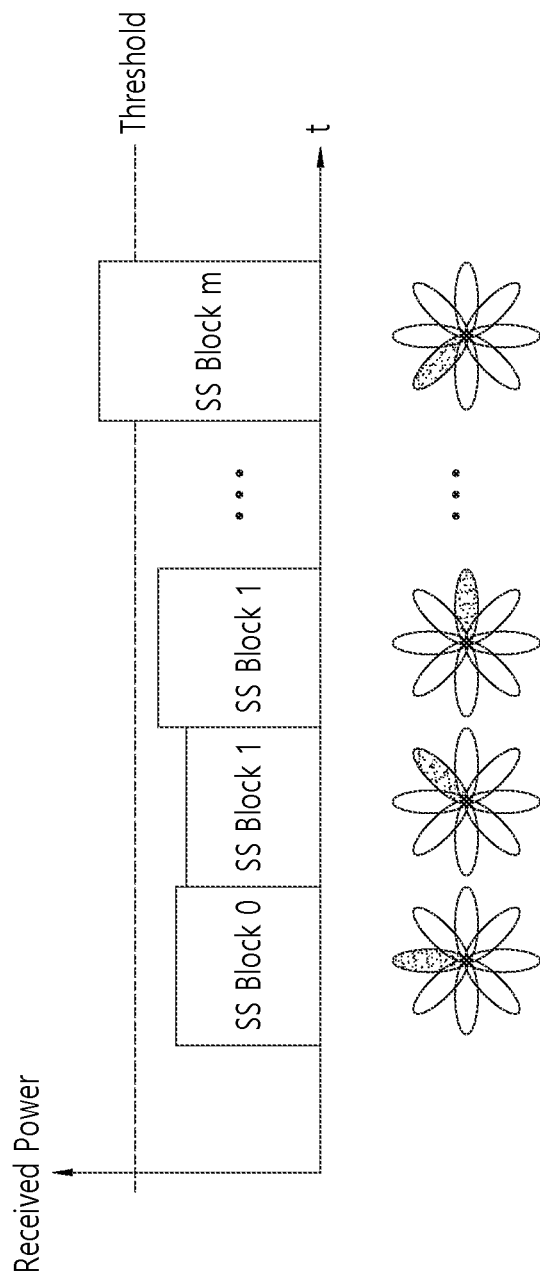
FIG. 30 illustrates a threshold of an SS block in the RACH resource relationship.

FIG. 30 illustrates a threshold of an SS block in the RACH resource relationship.

The system information may inform the UE of the relationship between SS blocks and RACH resources. The threshold of an SS block in the RACH resource relationship may be based on the RSRP and network configuration. Transmission and retransmission of the RACH preamble may be based on the SS block satisfying the threshold. Therefore, in the example of FIG. 30, since SS block m exceeds the threshold of receive power, the RACH preamble is transmitted or retransmitted based on the SS block m.

Afterwards, when the UE receives a random access response on the DL-SCH, the DL-SCH may provide timing array information, an RA-preamble ID, an initial uplink grant, and temporary C-RNTI.

Based on the information, the UE may perform uplink transmission on the UL-SCH as message 3 (Msg3) of the random access procedure. Msg3 may include an RRC connection request and a UE identity.

As a response to the uplink transmission, the network may transmit Msg4 that may be treated as a contention resolution message via downlink transmission. By receiving Msg4, the UE may enter the RRC connection state.

In what follows, the random access procedure will be described in more detail.

Before starting a physical random access procedure, layer 1 has to receive a set of SS/PBCH block indexes from the upper layer and provide a set of corresponding RSRP measurements to the upper layer.

Before starting the physical random access procedure, layer 1 has to receive the following information from the upper layer:

Configuration of PRACH transmit parameter (PRACH preamble format, time resources, and frequency resources for PRACH transmission) and Parameter for determination of a root sequence and a cyclic shift (index of a logical root sequence table, cyclic shift (NCS), and set type (unrestricted set, restricted set A or restricted set B)) within the PRACH preamble sequence set for the parameter.

From the physical layer perspective, the L1 random access procedure includes transmission of random access preamble (Msg1) in a PRACH, Random Access Response (RAR) message (Msg2) with a PDCCH/PDSCH, and when applicable, Msg3 PUSCH; and transmission of PDSCH for contention resolution.

If the random access procedure is started by a PDCCH order to the UE, random access preamble transmission may have a subcarrier spacing which is the same as the subcarrier spacing of random access preamble transmission initiated by the upper layer.

When the UE is configured with two uplink subcarriers for a serving cell and the UE detects the PDCCH order, the UE may use a UL/SUL indicator field value from the detected PDCCH order to determine the uplink subcarrier for the corresponding random access preamble transmission.

In what follows, the random access preamble will be described in more detail.

In the random access preamble transmission step, the physical random access procedure may be triggered by an upper layer, a PDCCH order, or a request for PRACH transmission. Configuration of PRACH transmission by the upper layer may include the following:

Configuration about PRACH transmission; and

Preamble index, preamble subcarrier spacing, $P_{PRACH,target}$, corresponding RA-RNTI, and PRACH resource.

The preamble may be transmitted according to a selected PRACH format having transmission power $P_{PRACH,b,f,c(i)}$ on the indicated PRACH resource.

A plurality of SS/PBCH blocks related to one PRACH occasion may be provided to the UE by the upper layer parameter SSB-perRACH-Occasion. If SSB-perRACH-Occasion is smaller than 1, one SS/PBCH block may be mapped to contiguous PRACH occasions of 1/SSB-per-RACH-Occasion. A plurality of preambles are provided to the UE for each SS/PBCH by the upper layer parameter cb-preamblePerSSB, and the UE may determine a multiple of SSB-perRACH-Occasion and the value of cb-preamblePerSSB as the total number of preambles for each PRACH and SSB.

The SS/PBCH block index may be mapped to the PRACH occasions according to the following order:

First, an ascending order of a preamble index within a single PRACH occasion,

Second, an ascending order of frequency resource index with respect to frequency multiplexed PRACH occasions, Third, an ascending order of time resource index with respect to time multiplexed PRACH occasions within the PRACH slot, and Fourth, an ascending order of index with respect to PRACH slots.

The period that starts from frame 0, at which SS/PBCH blocks are mapped to PRACH occasions, is the minimum value of the PRACH configuration periods {1, 2, 4}, which is larger than or equal to $[N_{Tx}^{SSB}/N_{PRACHperiod}^{SSB}]$; here, the UE obtains $N_{Tx}^{SSB}$ by the upper layer parameter SSB-transmitted-SIB1, and $N_{PRACHperiod}^{SSB}$ represents the number of SS/PBCH blocks that may be mapped to one PRACH configuration period.

If the random access procedure is started by the PDCCH order and is requested by the upper layer, the UE has to transmit the PRACH within the first available PRACH occasion, where the time difference between the last symbol at which the PDCCH order is received and the first symbol of PRACH transmission is larger than or equal to $N_{T,2}$+ $\Delta_{BWPSwitching}+\Delta_{Delay}$ msec. Here, $N_{T,2}$ represents duration of $N_2$ symbols corresponding to PUSCH preparation time with respect to PUSCH processing capability 1, $\Delta_{BWPSwitching}$ is a predefined value, and $\Delta_{Delay}>0$.

In what follows, a random access response will be described in more detail.

In response to the PRACH transmission, the UE may attempt to detect a PDCCH having the corresponding RA-RNTI during a window controlled by the upper layer. The window may start from the first symbol of the earliest control resource set configured for the UE with respect to the Type 1-PDCCH common search space comprising at least $[(\Delta \cdot N_{slot}^{subframe,\mu} \cdot N_{symb}^{slot}) T_{sf}]$ symbols after the last symbol of preamble sequence transmission. The length of the window as expressed in terms of the number of slots may be provided by the upper layer parameter rar-WindowLength based on the subcarrier spacing with respect to the Type0-PDCCH common search space.

If the UE detects a PDCCH having the corresponding RA-RNTI and the corresponding PDSCH including a DL-SCH transmission block within the window, the UE may transmit the transmission block to the upper layer. The upper layer may parse the transmission block with respect to the Random Access Preamble Identity (RAPID) related to the PRACH transmission. If the upper layer identifies RAPID within an RAR message(s) of the DL-SCH transmission block, the upper layer may indicate an uplink grant to the physical layer. This may be referred to as a Random Access Response (RAR) uplink grant in the physical layer. If the upper layer fails to identify the RAPID related to the PRACH transmission, the upper layer may instruct the physical layer to transmit the PRACH. The minimum time difference between the last symbol at which the PDSCH is received and the first symbol of the PRACH transmission is the same as $N_{T,1}+\Delta_{new}+0.5$, where $N_{T,1}$ represents the duration of $N_{T,1}$ symbols corresponding to the PDSCH reception time with respect to the PDSCH processing capability 1 when an additional PDSCH DM-RS is configured, and $\Delta_{new} \geq 0$.

For a detected SS/PBCH block or a received CSI-RS, the UE may have to receive the corresponding PDSCH including a PDCCH having the corresponding RA-RNTI and a DL-SCH transmission block having the same DM-RS antenna port Quasi Co-Location (QCL) characteristics. If the UE attempts to detect a PDCCH having the corresponding RA-RNTI as a response to PRACH transmission initiated by the PDCCH order, the UE may assume that the PDCCH and PDCCH order have the same DM-RS antenna port QCL characteristics.

The RAR uplink grant schedules PUSCH transmission of the UE (Msg3 PUSCH). Configuration of the RAR uplink grant, which starts from the MSG and ends at the LSB, may be given as shown in Table 10. Table 10 shows the size of a random access response grant configuration field.

TABLE 10

| RAR grant field | Number of bits |
|---|---|
| Frequency hopping flag resource | 1 |
| Msg3 PUSCH frequency resource allocation | 14 |
| Msg3 PUSCH time resource allocation | 4 |
| MCS | 4 |
| TPC command for Msg3 PUSCH | 3 |
| CSI request | 1 |
| Reserved bits | 3 |

Msg3 PUSCH frequency resource allocation is related to uplink resource allocation type 1. In the case of frequency hopping, based on the indication of the frequency hopping flag field, the first or first two bits $N_{UL,hop}$ of the Msg3 PUSCH frequency resource allocation field may be used as hopping information bits.

MCS may be determined by the first 16 indexes of the MCS index table applicable to the PUSCH.

The TPC command $\delta_{msg2,b,f,c}$ may be used for power configuration of the Msg3 PUSCH and may be interpreted according to Table 11 below.

TABLE 11

| TPC Command | Value [dB] |
|---|---|
| 0 | −6 |
| 1 | −4 |
| 2 | 2 |
| 3 | 0 |
| 4 | 2 |
| 5 | 4 |
| 6 | 6 |
| 7 | 8 |

In a non-contention based random access procedure, the CSI request field is interpreted to determine whether a non-periodic CSI report is included in the corresponding PUSCH transmission. In the contention-based random access procedure, the CSI request field may be reserved.

As long as the UE does not configure the subcarrier spacing, the UE receives a subsequent PDSCH by using the subcarrier spacing that is the same as PDSCH reception that provides an RAR message.

If the UE does not detect a PDCCH having the corresponding RA-RNTI within a window and the corresponding DL-SCH transmission block, the UE performs a random access response reception failure procedure.

In what follows, the Msg3 PUSCH transmission will be described in more detail.

With respect to Msg3 PUSCH transmission, the upper layer parameter msg3-tp indicates whether the UE has to apply a transform precoding for the Msg3 PUSCH transmission. If the UE applies a transform precoding for Msg3 PUSCH transmission employing frequency hopping, the frequency offset for the second hop may be given as shown in Table 11. Table 11 illustrates a frequency offset of the second hop with respect to the Msg3 PUSCH transmission employing frequency hopping.

TABLE 12

| Number of PRBs in initial active UL BWP | Value of $N_{UL,hop}$ Hopping Bits | Frequency offset for 2nd hop |
|---|---|---|
| $N_{BWP}^{size} < 50$ | 0 | $N_{BWP}^{size}/2$ size |
|  | 1 | $N_{BWP}^{size}/4$ size |
| $N_{BWP}^{size} \geq 50$ | 00 | $N_{BWP}^{size}/2$ size |
|  | 01 | $N_{BWP}^{size}/4$ size |
|  | 10 | $-N_{BWP}^{size}/4$ size |
|  | 11 | Reserved |

The subcarrier spacing for Msg3 PUSCH transmission may be provided by the upper layer parameter msg3-scs. The UE has to transmit the PRACH and Msg3 PUSCH on the same uplink carrier of the same serving cell. The uplink BWP for the Msg3 PUSCH transmission may be indicated by SystemInformationBlockType1.

When the PDSCH and PUSCH have the same subcarrier spacing, the minimum time difference between the last symbol at which the PDSCH carrying the RAR is received and the first symbol of the corresponding Msg3 PUSCH transmission scheduled by the RAR within the PDSCH with respect to the UE may be the same as $N_{T,1}+N_{T,2} N_{TA,max}+0.5$ msec. Here, $N_{T,1}$ represents the duration of $N_1$ symbols corresponding to the PDSCH reception with respect to the PDSCH processing capability 1 when an additional PDSCH DM-RS is configured, $N_{T,2}$ represents the duration of $N_2$ symbols corresponding to the PUSCH preparation time with respect to the PUSCH processing capability 1, and $N_{TA,max}$ represents the maximum timing adjustment value that may be provided by the TA command field within the RAR.

In what follows, contention resolution will be described in more detail.

If the UE fails to receive C-RNTI, the UE attempts to detect a PDCCH having the corresponding TC-RNTI that schedules a PDSCH including UE contention resolution identity in response to the Msg3 PUSCH transmission. In response to the reception of the PDSCH having the UE contention resolution identity, the UE transmits HARQ-ACK information within the PUCCH. The minimum time difference between the last symbol at which the PDSCH is received and the first symbol of the corresponding HARQ-ACK transmission is $N_{T,1}+0.5$ msec. $N_{T,1}$ represents the duration of $N_1$ symbols corresponding to the PDSCH reception with respect to the PDSCH processing capability 1 when an additional PDSCH DM-RS is configured.

In what follows, a channel coding scheme will be described.

A channel coding scheme according to one embodiment of the present disclosure may include a Low Density Parity Check (LDPC) coding scheme mostly for data and a polar coding scheme for control information.

The network/UE may perform the LDPC coding for a PDSCH/PUSCH having a support for two base graphs (BGs). Here, BG1 may be related to mother code rate 1/3, and BG2 may be related to mother code rate 1/5.

For coding of control information, various coding schemes such as repetition coding, simplex coding, and Reed-Muller coding may be supported. The polar coding scheme may be applied to the case where the control information has a length longer than 11 bits. For downlink transmission, the mother code size may be 512, and the mother code size for uplink transmission may be 1024. The coding schemes for uplink control information may be summarized as shown in the table below.

TABLE 13

| Uplink Control Information size including CRC, if present | Channel code |
|---|---|
| 1 | Repetition code |
| 2 | Simplex code |
| 3-11 | Reed Muller code |
| >11 | Polar code |

The polar coding scheme may be used for a PBCH. This coding scheme may be the same as used for the case of a PDCCH. In what follows, LDPC coding structure will be described.

Hereinafter, LDPC coding structure will be described.

An LDPC code is a (n, k) linear block code defined by the null-space of a (n−k)×n sparse parity check matrix H.

The LDPC code that may be applied to one embodiment of the present disclosure may be expressed as follows.

$$Hx^T = 0 \quad \text{[Eq. 4]}$$

$$Hx^T = \begin{bmatrix} 1 & 1 & 1 & 0 & 0 \\ 1 & 0 & 0 & 1 & 1 \\ 1 & 1 & 0 & 0 & 0 \\ 0 & 1 & 1 & 1 & 0 \end{bmatrix} \begin{bmatrix} x1 \\ x2 \\ x3 \\ x4 \\ x5 \end{bmatrix} = 0$$

Figure 31:
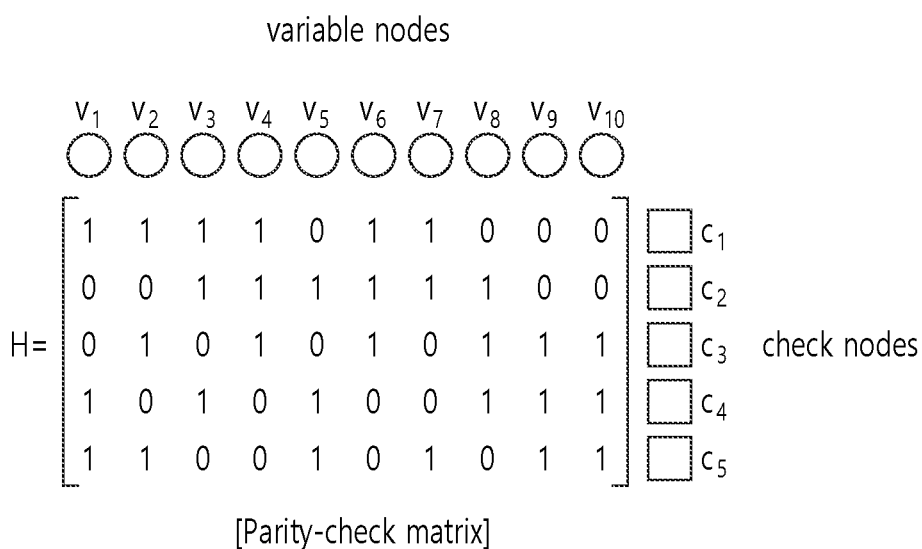
FIG. 31 illustrates a parity check matrix expressed by a protograph.
Figure 31:
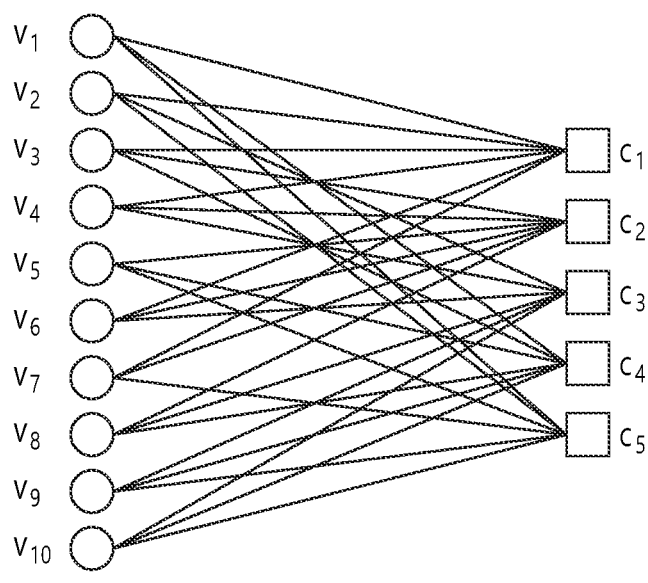

FIG. 31 illustrates a parity check matrix expressed by a protograph.

More specifically, FIG. 31 shows a parity check matrix about the association relationship between variable nodes and check nodes, which is expressed by a protograph.

As one example, according to FIG. 31, variable nodes having an association relationship with the check node $c_1$ are $v_1, v_2, v_3, v_4, v_6, v_7$, and check nodes having an association relationship with the variable node $v_8$ are $c_2, c_3, c_4$.

Figure 32:
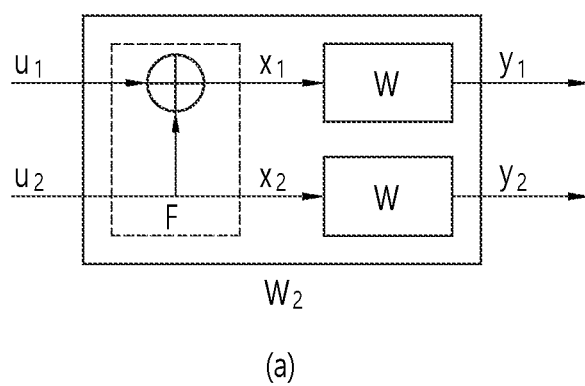
FIG. 32 illustrates one example of an encoder structure for the polar code.

FIG. 32 illustrates one example of an encoder structure for the polar code. More specifically, FIG. 32(a) shows one example of a base module of the polar code, and FIG. 32(b) shows a base matrix.

The polar code is known as the code capable of obtaining channel capacity in the Binary-input Discrete Memoryless Channel (B-DMC). In other words, if the size N of a code block increases indefinitely, channel capacity may be obtained.

Figure 33:
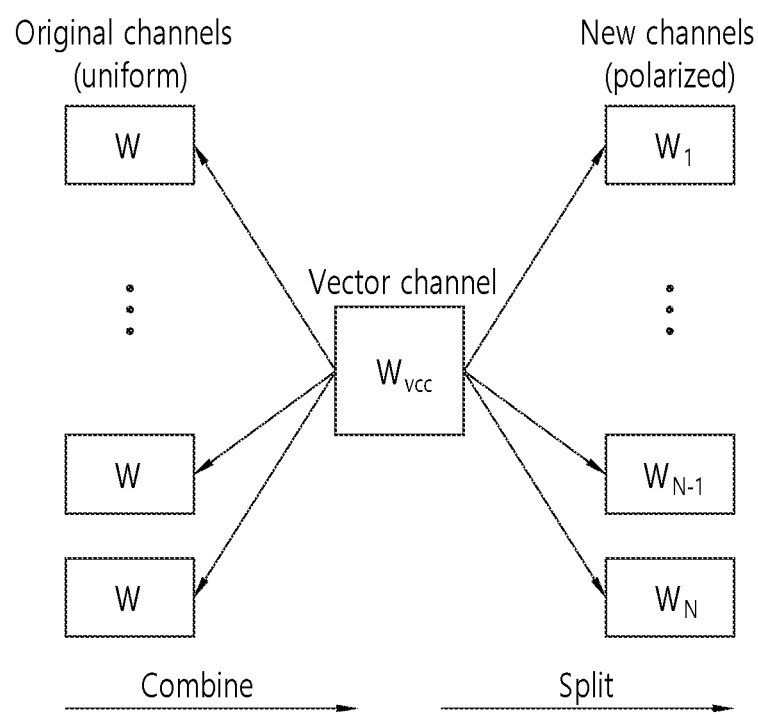
FIG. 33 illustrates one example of an encoder operation based on the polar code.

FIG. 33 illustrates one example of an encoder operation based on the polar code.

Referring to FIG. 33, the encoder based on the polar code may perform channel combining and channel division. More specifically, the encoder based on the polar code may combine existing channels into one vector channel or divide one vector channel into a plurality of new channels. As one example, the existing channels before being combined into one vector channel may be uniform, and a plurality of new channels split from one vector channel may be polarized.

Meanwhile, the DRX described above may be extended as follows.

<Discontinuous Reception>

Discontinuous Reception (DRX) refers to an operation mode in which a UE reduces battery consumption to receive a downlink channel in a discontinuous manner. In other words, a UE configured for DRX may reduce power consumption by receiving a DL signal discontinuously.

A DRX operation is performed within a DRX cycle representing a time interval in which On Duration is repeated periodically. A DRX cycle includes On Duration and Sleep Duration (or an occasion of DRX). On Duration refers to a time interval in which a UE monitors a PDCCH to receive the PDCCH.

DRX may be performed in the Radio Resource Control (RRC) IDLE state (or mode), RRC_INACTIVE state (or mode) or RRC_CONNECTED state (or mode). In the RRC_IDLE state and RRC_INACTIVE state, DRX may be used to receive a paging signal discontinuously.

- RRC_IDLE state: The state in which a radio connection (RRC connection) is not established between a base station and a UE.
- RRC_INACTIVE state: The state in which, although a radio connection (RRC connection) has been established between the base station and the UE, the radio connection is deactivated.
- RRC_CONNECTED state: The state in which a radio connection (RRC connection) is established between the base station and the UE.

DRX may be basically divided into idle mode DRX, Connected DRX (C-DRX), and extended DRX.

DRX applied in the IDLE state may be referred to as idle mode DRX, and DRX applied in the CONNECTED state may be referred to as Connected mode DRX (C-DRX).

Extended/Enhanced DRX (eDRX) is a mechanism that may extend the cycle of the idle mode DRX and C-DRX and may be mostly used for (passive) IoT applications. In the idle mode DRX, whether to allow eDRX may be configured based on system information (for example, SIB1). SIB1 may include an eDRX-allowed parameter. The eDRX-allowed parameter represents whether extended DRX is allowed in the idle mode.

<Idle Mode DRX>

In the idle mode, the UE may use DRX to reduce power consumption. One paging occasion (PO) is a subframe in which Paging-Radio Network Temporary Identifier (P-RNTI) may be transmitted on a Physical Downlink Control Channel (PDCCH) or an MTC PDCCH (MPDCCH) or a Narrowband PDCCH (NPDCCH) (addressing a paging message for NB-IoT).

In the P-RNTI transmitted on the MPDCCH, PO may represent a starting subframe of MPDCCH repetitions. In the case of P-RNTI transmitted on the NPDCCH, when a subframe determined by PO is not a valid NB-IoT downlink subframe, PO may represent a starting subframe of NPDCCH repetitions. Therefore, the first valid NB-IoT downlink subframe after PO is the starting subframe of NPDCCH repetitions.

One Paging Frame (PF) is one radio frame, which may contain one or a plurality of POs. When DRX is used, the UE only needs to monitor one PO per DRX cycle. One Paging Narrowband (PNB) is one narrowband, on which the UE performs reception of a paging message. PF, PO, and PNB are determined based on the DRX parameters provided in System Information.

Figure 34:
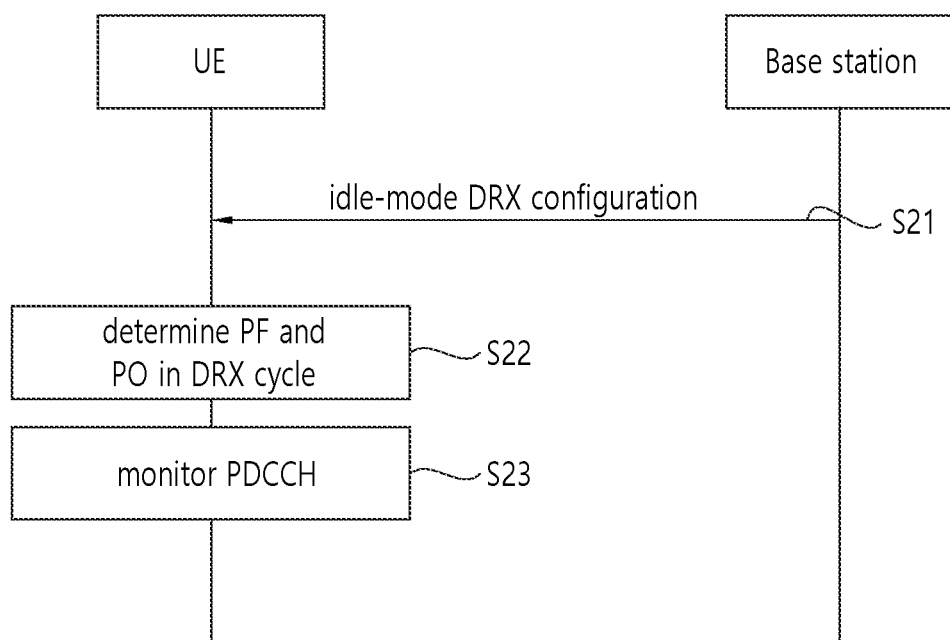
FIG. 34 is a flow diagram illustrating one example in which an idle mode DRX operation is performed.

FIG. 34 is a flow diagram illustrating one example in which an idle mode DRX operation is performed.

According to FIG. 34, the UE may receive idle mode DRX configuration information from a base station through upper layer signaling (for example, system information) S11.

The UE may determine the Paging Frame (PF) and Paging Occasion (PO) to monitor a PDCCH in a paging DRX cycle based on the idle mode DRX configuration information S12. In this case, the DRX cycle may include On Duration and Sleep Duration (or an occasion of DRX).

The UE may monitor the PDCCH at the PO of a determined PF 513. In this case, for example, the UE monitors only one subframe (PO) per paging DRX cycle. Also, if the UE receives a PDCCH scrambled by P-RNTI during the On Duration (namely, when paging is detected), the UE may transition to the connected mode and transmit and receive data to and from the base station.

Figure 35:
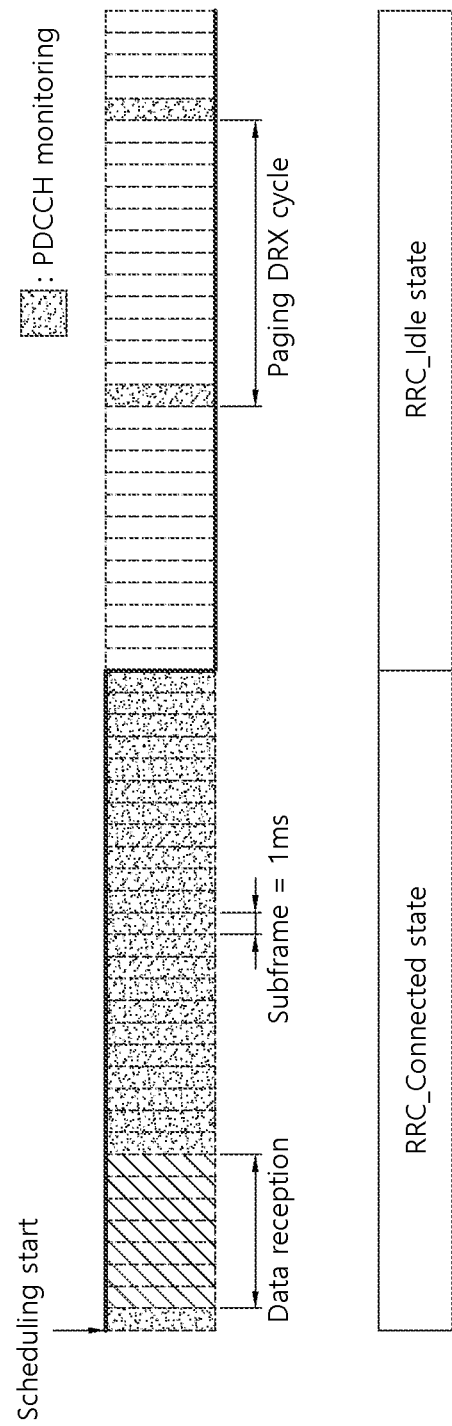
FIG. 35 illustrates one example of an idle mode DRX operation.

FIG. 35 illustrates one example of an idle mode DRX operation.

According to FIG. 35, when there exists traffic directed toward the UE in the RRC_IDLE state (hereinafter, referred to as 'idle state'), paging is generated with respect to the corresponding UE. The UE may wake up periodically (namely, every (paging) DRX periods) to monitor a PDCCH. In the absence of paging, the UE may transition to the connected state, receive data, and enter the sleep mode again if there exists no data.

<Connected Mode DRX (C-DRX)>

C-DRX refers to DRX applied in the RRC connected state. The DRX cycle for C-DRX may be composed of a short DRX cycle and/or a long DRX cycle. Here, a short DRX cycle may be selected optionally.

When C-DRX is configured, the UE may perform PDCCH monitoring with respect to On Duration. If a PDCCH is successfully detected during PDCCH monitoring, the UE operates (or runs) an inactive timer and maintain the timer in the awake state. On the other hand, if a PDCCH is not detected successfully during PDCCH monitoring, the UE may enter the sleep state after the On Duration expires.

When C-DRX is configured, a PDCCH reception occasion (for example, a slot having PDCCH search space) may be configured to be discontinuous based on the C-DRX configuration. On the other hand, if C-DRX is not configured, the PDCCH reception occasion (for example, a slot having PDCCH search space) may be configured to be continuous according to the present disclosure.

Meanwhile, PDCCH monitoring may be limited to a time interval configured in terms of a measurement gap regardless of the C-DRX configuration.

Figure 36:
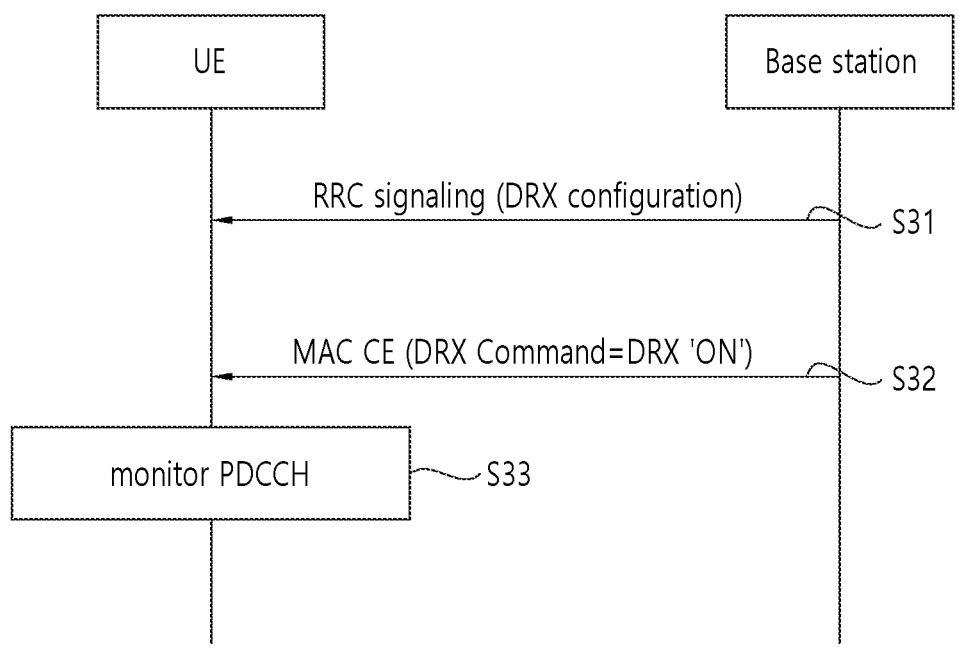
FIG. 36 is a flow diagram illustrating one example of a method for performing a C-DRX operation.

FIG. 36 is a flow diagram illustrating one example of a method for performing a C-DRX operation.

The UE may receive RRC signaling (for example, MAC-MainConfig IE) including DRX configuration information from a base station S21.

Here, DRX configuration information may include the following information.

- onDurationTimer: The number of PDCCH subframes to be monitored continuously from the starting position of a DRX cycle.
- drx-InactivityTimer: The number of PDCCH subframes to be monitored continuously when the UE decodes a PDCCH having scheduling information.
- drx-RetransmissionTimer: The number of PDCCH subframes to be monitored continuously when HARQ retransmission is expected.
- longDRX-Cycle: The period during which On Duration is generated.
- drxStartOffset: The subframe number at which a DRX cycle is started.
- drxShortCycleTimer: The short DRX cycle number
- shortDRX-Cycle: A DRX cycle operating as many times as the number of drxShortCycleTimers when the Drx-InactivityTimer expires.

Also, when DRX 'ON' is configured by the DRX command of the MAC Command Element (CE) S22, the UE monitors the PDCCH with respect to the On Duration of the DRX cycle based on the DRX configuration S23.

Figure 37:
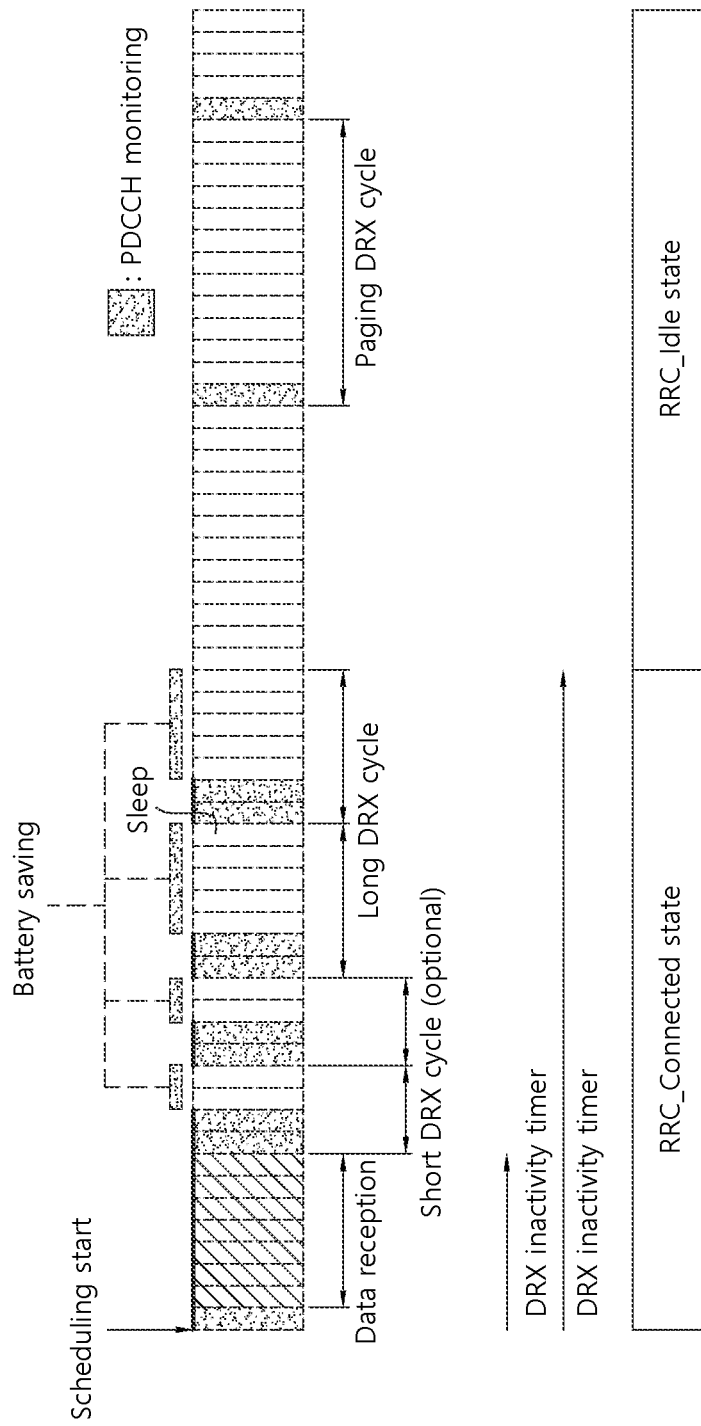
FIG. 37 illustrates an example of a C-DRX operation.

FIG. 37 illustrates an example of a C-DRX operation.

If the UE receives scheduling information (for example, a DL grant) in the RRC_CONNECTED state (in what follows, referred to as connected state), the UE may execute the DRX inactive timer and the RRC inactive timer.

When the DRX inactive timer expires, the DRX mode may be started. The UE may wake up from the DRX cycle and monitor the PDCCH for a predetermined time period (on the duration timer).

In this case, when short DRX is configured and the UE starts the DRX mode, the UE first starts with a short DRX cycle and after the short DRX cycle is completed, starts a long DRX cycle. Here, the long DRX cycle may correspond to a multiple of the short DRX cycle. Moreover, during the short DRX cycle, the UE may wake up more often. After the RRC inactive timer expires, the UE may transition to the IDLE state and perform the IDLE mode DRX operation.

<IA/RA+DRX Operation>

Figure 38:
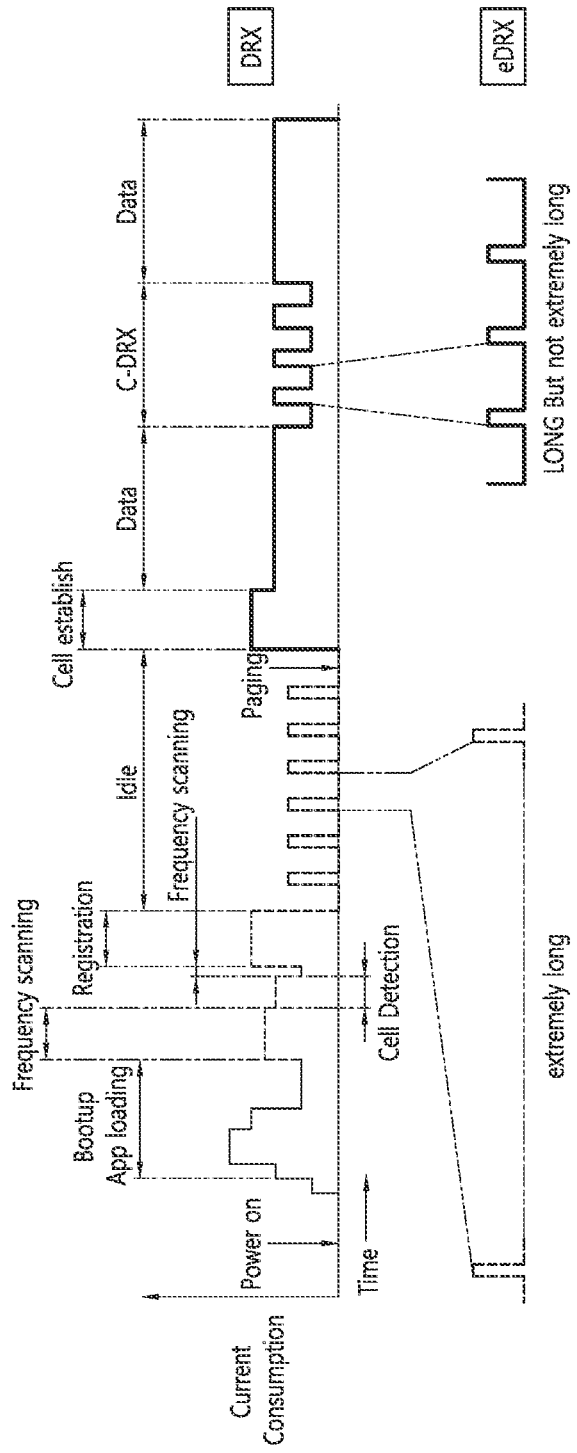
FIG. 38 illustrates an example of power consumption according to the state of a UE.

FIG. 38 illustrates an example of power consumption according to the state of a UE.

According to FIG. 38, after the UE is powered up, the UE performs boot-up for application loading, an initial access/random access procedure for downlink and uplink synchronization with a base station, and a registration procedure for a network. FIG. 38 shows an amount of current (or an amount of power) consumed while each procedure is carried out.

If transmission power of the UE is high, current consumption of the UE may be increased. Also, when the UE does not have traffic to be transmitted thereto or to a base station, the UE transitions to the idle mode to reduce power consumption and performs the idle mode DRX operation.

Meanwhile, if paging (for example, a call) occurs during the idle mode DRX operation, the UE may transition to the connected mode from the idle mode through a cell establishment procedure and transmit and receive data to and from the base station.

Also, when there is no data received from or transmitted to the base station in the connected mode or for a specific time period of a configured timing, the UE may perform the connected mode DRX (C-DRX).

Also, when the UE is configured with extended DRX (eDRX) through upper layer signaling (for example, system information), the UE may perform an eDRX operation in the idle mode or connected mode.

What is claimed is:

1. A method for transmitting a signal on a Random Access Channel (RACH) performed by a user equipment (UE) in a wireless communication system, the method comprising:
receiving a Synchronization Signal Block (SSB) and a paging-related signal from a base station;
receiving a downlink signal including an uplink grant in a specific Fixed Frame Period (FFP) among a plurality of FFPs from the base station; and
transmitting, to the base station, the signal on the RACH based on the uplink grant after completing reception of the downlink signal,
wherein the specific FFP comprises a channel occupancy time and an idle period,
wherein both the SSB and the paging-related signal are received periodically on every N-th FFP among the plurality of FFPs, wherein the N is an integer larger than or equal to 1,
wherein a reception start position of the SSB is a first time resource included in every N-th FFP, and
wherein the transmission of the signal on the RACH is performed only in the channel occupancy time of the specific FFP among the plurality of FFPs.

2. The method of claim 1, wherein the transmission of the signal on the RACH is performed on an unlicensed band.

3. The method of claim 1, wherein at least one of the SSB and the downlink signal is received on an unlicensed band.

4. The method of claim 1, wherein a transmission period of the SSB is determined by the base station.

5. The method of claim 1, wherein a transmission period of the SSB is the same as a measurement period related to cell measurement.

6. The method of claim 5, wherein the cell measurement is measurement of a serving cell or a neighboring cell.

7. The method of claim 1, wherein the uplink grant is UE-group common downlink control information.

8. A user equipment (UE), the UE comprising:
a transceiver configured to transmit and receive a radio signal; and
a processor operatively connected to the transceiver, wherein the processor is configured to:
receive a Synchronization Signal Block (SSB) and a paging-related signal from a base station;
receive a downlink signal including an uplink grant in a specific Fixed Frame Period (FFP) among a plurality of FFPs from the base station; and
transmit, to the base station, a signal on a Random Access Channel (RACH) based on the uplink grant after reception of the downlink signal is completed,
wherein the specific FFP comprises a channel occupancy time and an idle period,
wherein both the SSB and the paging-related signal are received periodically on every N-th FFP among the plurality of FFPs, wherein the N is an integer larger than or equal to 1,
wherein a reception start position of the SSB is a first time resource included in every N-th FFP, and
wherein the transmission of the signal on the RACH is performed only in the channel occupancy time of the specific FFP among the plurality of FFPs.

9. The UE of claim 8, wherein the UE communicates with at least one of a mobile terminal, a network, or a self-driving vehicle other than the UE.

* * * * *